(12) United States Patent
Abe et al.

(10) Patent No.: US 10,863,175 B2
(45) Date of Patent: Dec. 8, 2020

(54) ENCODER, AND DECODER, ENCODING METHOD, DECODING METHOD

(71) Applicant: Panasonic Intellectual Property Corporation of America, Torrance, CA (US)

(72) Inventors: Kiyofumi Abe, Osaka (JP); Takahiro Nishi, Nara (JP); Tadamasa Toma, Osaka (JP); Ryuichi Kanoh, Osaka (JP); Chong Soon Lim, Singapore (SG); Ru Ling Liao, Singapore (SG); Hai Wei Sun, Singapore (SG); Sughosh Pavan Shashidhar, Singapore (SG); Han Boon Teo, Singapore (SG); Jing Ya Li, Singapore (SG)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 16/287,252

(22) Filed: Feb. 27, 2019

(65) Prior Publication Data
US 2019/0273921 A1    Sep. 5, 2019

Related U.S. Application Data

(60) Provisional application No. 62/637,054, filed on Mar. 1, 2018, provisional application No. 62/637,039, filed on Mar. 1, 2018, provisional application No. 62/637,127, filed on Mar. 1, 2018, provisional application No. 62/637,139, filed on Mar. 1, 2018.

(51) Int. Cl.
*H04N 19/119* (2014.01)
*H04N 19/176* (2014.01)
*H04N 19/107* (2014.01)
*H04N 19/46* (2014.01)

(52) U.S. Cl.
CPC ......... *H04N 19/119* (2014.11); *H04N 19/107* (2014.11); *H04N 19/176* (2014.11); *H04N 19/46* (2014.11)

(58) Field of Classification Search
CPC .... H04N 19/119; H04N 19/46; H04N 19/107; H04N 19/176
See application file for complete search history.

(56) References Cited

U.S. PATENT DOCUMENTS

| 2011/0194613 A1* | 8/2011 | Chen | H04N 19/176 375/240.24 |
|---|---|---|---|
| 2017/0280162 A1* | 9/2017 | Zhao | H04N 19/159 |
| 2018/0324441 A1* | 11/2018 | Lim | H04N 19/46 |
| 2019/0335208 A1* | 10/2019 | Lim | H04N 19/96 |

OTHER PUBLICATIONS

H.265 (ISO/IEC 23008-2 High efficiency video coding (HEVC)), Dec. 1, 2013.

* cited by examiner

*Primary Examiner* — Tracy Y. Li
(74) *Attorney, Agent, or Firm* — Wenderoth, Lind & Ponack, L.L.P.

(57) ABSTRACT

An encoder includes circuitry and memory. The circuitry, using the memory: writes, into a bitstream, one or more parameters including a first parameter indicating that a first partition of an image is to be split into a plurality of partitions including at least a second partition which is a non-rectangular partition; splits the first partition, based on the first parameter; and encodes at least the second partition.

34 Claims, 65 Drawing Sheets

FIG. 3

| TRANSFORM TYPE | BASIS FUNCTION $T_i(j)$, $i, j = 0, 1, ..., N-1$ |
|---|---|
| DCT-II | $T_i(j) = \omega_0 \cdot \sqrt{\frac{2}{N}} \cdot \cos\left(\frac{\pi \cdot i \cdot (2j+1)}{2N}\right)$ <br> WHERE $\omega_0 = \begin{cases} \sqrt{\frac{2}{N}} & i = 0 \\ 1 & i \neq 0 \end{cases}$ |
| DCT-V | $T_i(j) = \omega_0 \cdot \omega_1 \cdot \sqrt{\frac{2}{2N-1}} \cdot \cos\left(\frac{2\pi \cdot i \cdot j}{2N-1}\right)$ <br> WHERE $\omega_0 = \begin{cases} \sqrt{\frac{2}{N}} & i = 0 \\ 1 & i \neq 0 \end{cases}$, $\omega_1 = \begin{cases} \sqrt{\frac{2}{N}} & j = 0 \\ 1 & j \neq 0 \end{cases}$ |
| DCT-VIII | $T_i(j) = \sqrt{\frac{4}{2N+1}} \cdot \cos\left(\frac{\pi \cdot (2i+1) \cdot (2j+1)}{4N+2}\right)$ |
| DST-I | $T_i(j) = \sqrt{\frac{2}{N+1}} \cdot \sin\left(\frac{\pi \cdot (i+1) \cdot (j+1)}{N+1}\right)$ |
| DST-VII | $T_i(j) = \sqrt{\frac{4}{2N+1}} \cdot \sin\left(\frac{\pi \cdot (2i+1) \cdot (j+1)}{2N+1}\right)$ |

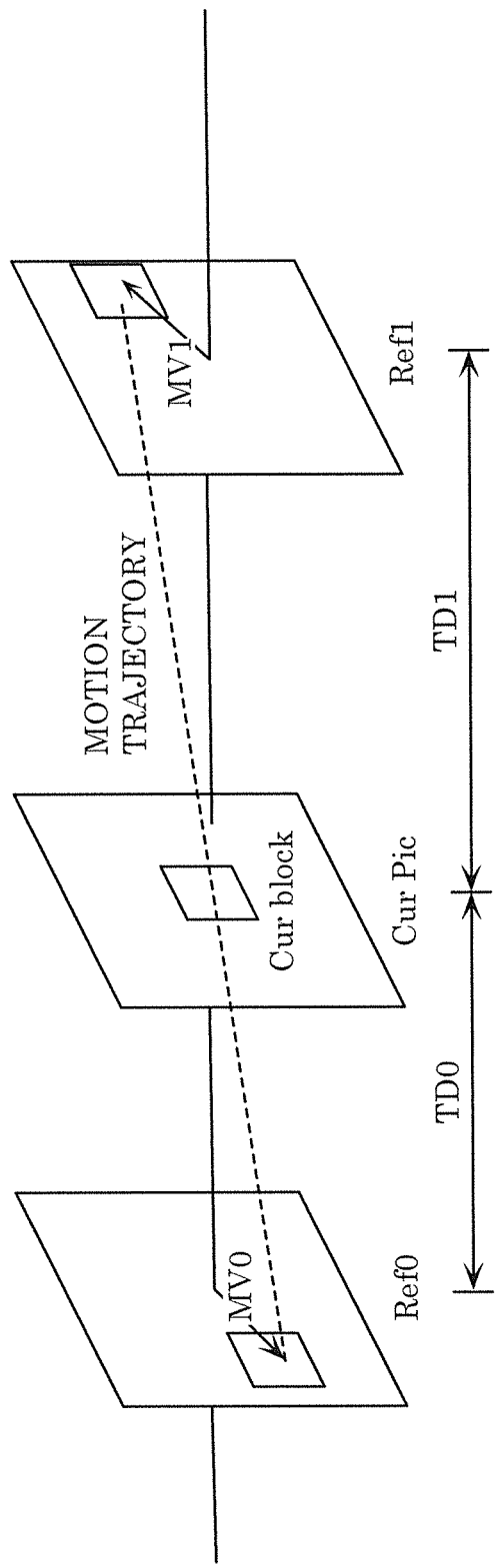

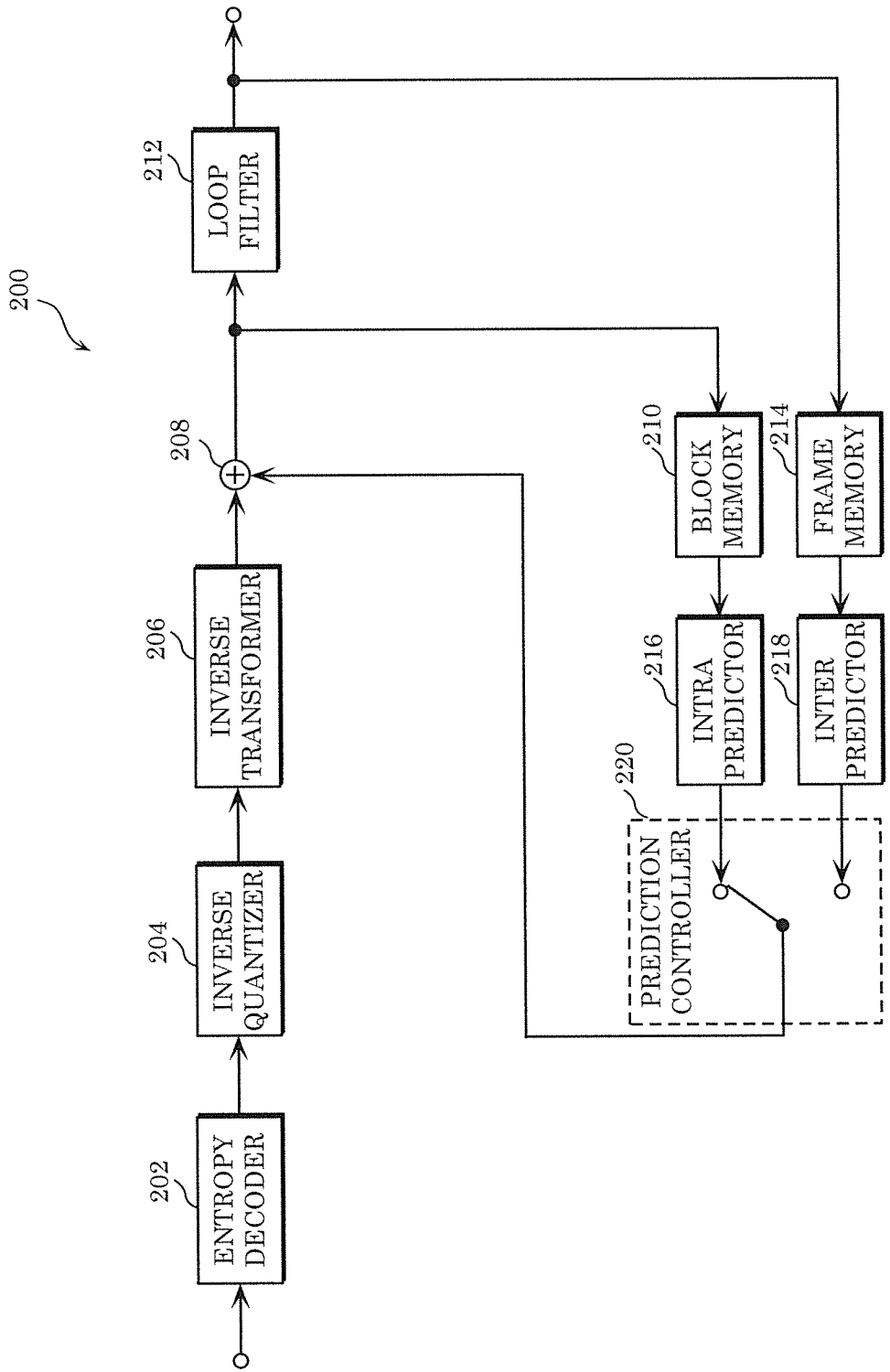

FILTERED SAMPLES

BLOCK (8 × 8) WITH TWO PARTITIONS

FILTERED SAMPLES

BLOCK (8 × 8) WITH TWO PARTITIONS

FILTERED SAMPLES

BLOCK (8 × 8) WITH TWO PARTITIONS

HORIZONTAL LONG BLOCK (8 × 4) WITH TWO PARTITIONS

VERTICAL LONG BLOCK (4 × 8) WITH TWO PARTITIONS

HORIZONTAL LONG BLOCK (16 × 4) WITH TWO PARTITIONS

VERTICAL LONG BLOCK (4 × 16) WITH TWO PARTITIONS

BLOCK (8 × 8)
WITH TWO PARTITIONS

BLOCK (8 × 8)
WITH TWO PARTITIONS

BLOCK (8 × 8)
WITH TWO PARTITIONS

BLOCK (8 × 8)
WITH TWO PARTITIONS

BLOCK (8 × 8)
WITH TWO PARTITIONS

BLOCK (8 × 8)
WITH TWO PARTITIONS

BLOCK (8 × 8)
WITH TWO PARTITIONS

BLOCK (8 × 8)
WITH TWO PARTITIONS

BLOCK (8 × 8)
WITH TWO PARTITIONS

BLOCK (8 × 8)
WITH TWO PARTITIONS

BLOCK (8 × 8)
WITH TWO PARTITIONS ex115

US 10,863,175 B2

ENCODER, AND DECODER, ENCODING METHOD, DECODING METHOD

CROSS REFERENCE TO RELATED APPLICATION

The present application claims the benefit of the following U.S. Provisional Patent Application No. 62/637,039 filed Mar. 1, 2018; No. 62/637,054 filed Mar. 1, 2018; No. 62/637,127 filed Mar. 1, 2018; and No. 62/637,139 filed Mar. 1, 2018. The entire disclosures of the above-identified applications, including the specifications, drawings and claims are incorporated herein by reference in their entirety.

FIELD

The present disclosure relates to, for example, an encoder which encodes video including a plurality of pictures.

BACKGROUND

As a standard for coding a moving picture, there has conventionally been H.265 that is also referred to as high efficiency video coding (HEVC).

CITATION LIST

Non Patent Literature

[NPL 1] H.265 (ISO/IEC 23008-2 HEVC)/HEVC (High Efficiency Video Coding)

SUMMARY

Technical Problem

However, the encoder, etc. cannot always perform prediction with high accuracy.

In view of this, the present disclosure provides a device, etc. capable of performing more appropriate processing.

Solution to Problem

An encoder according to an aspect of the present disclosure includes: circuitry; and memory, wherein the circuitry, using the memory: writes, into a bitstream, one or more parameters including a first parameter indicating that a first partition of an image is to be split into a plurality of partitions including at least a second partition which is a non-rectangular partition; splits the first partition, based on the first parameter; and encodes at least the second partition.

These general and specific aspects may be implemented using a system, a device, a method, an integrated circuit, a computer program, or a non-transitory computer-readable recording medium such as a CD-ROM, or any combination of systems, devices, methods, integrated circuits, computer programs, or computer-readable recording media.

Further benefits and advantageous effects provided by the disclosed embodiments are known from the Specification and the drawings. These benefits and advantageous effects may be provided by various embodiments and/or each of the features in the Specification and the drawings, and all of these benefits and advantageous effects do not always need to be provided.

Advantageous Effects

An encoder, etc. according to an aspect of the present disclosure is capable of commonly using information for splitting a block into triangular partitions in encoding and decoding. In this way, for example, the encoder, etc. according to the aspect of the present disclosure is capable of performing prediction using the triangular partitions. For this reason, the encoder, etc. according to the aspect of the present disclosure is capable of performing more appropriate prediction than prediction using rectangular partitions.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 3 is a chart indicating transform basis functions for each transform type.

FIG. 6 is for illustrating pattern matching (bilateral matching) between two blocks along a motion trajectory.

FIG. 10 is a block diagram illustrating a functional configuration of a decoder according to Embodiment 1.

DESCRIPTION OF EMBODIMENTS

Figure 1:
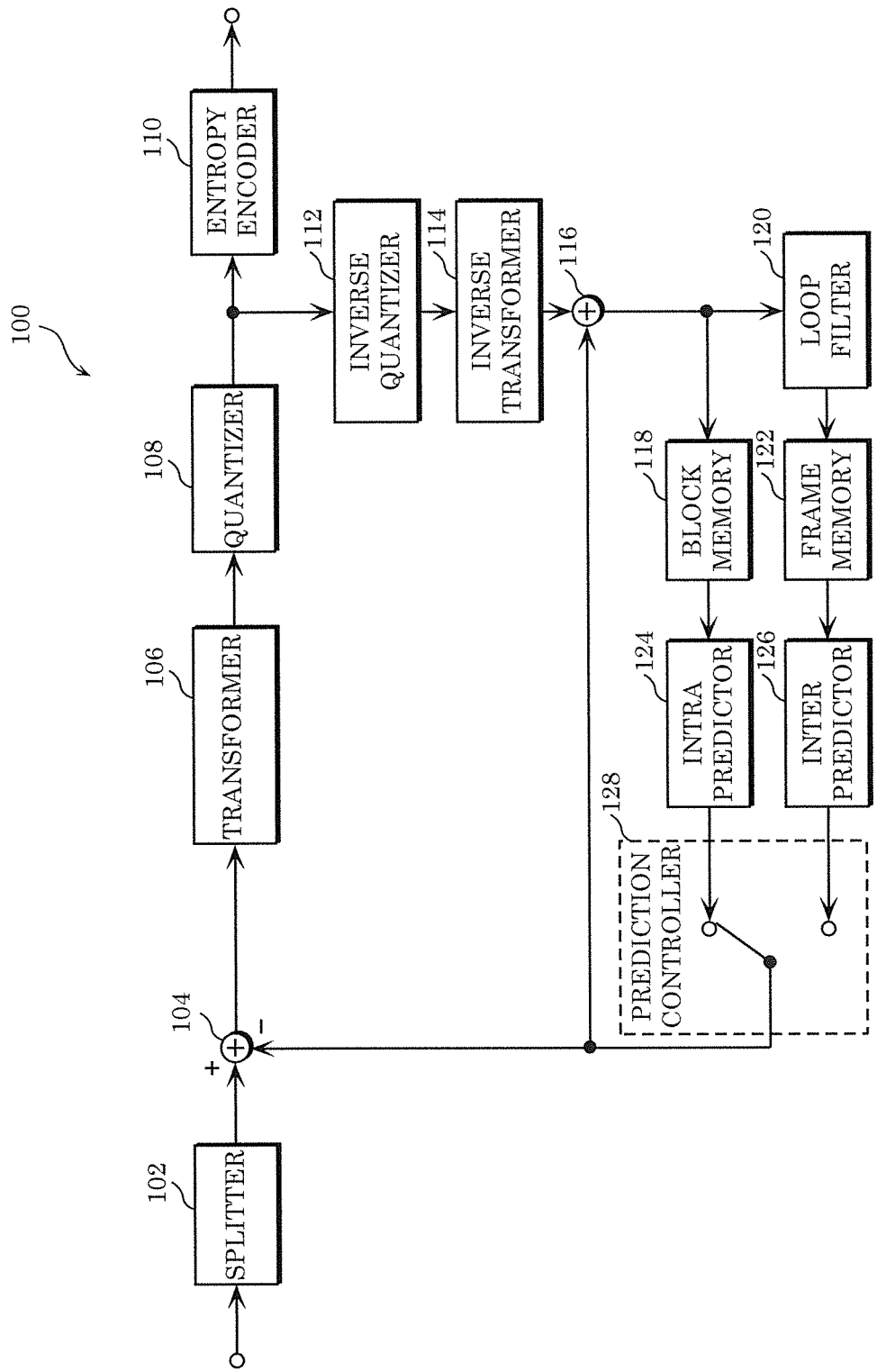
FIG. 1 is a block diagram illustrating a functional configuration of an encoder according to Embodiment 1.

For example, an encoder according to an aspect of the present disclosure includes: circuitry; and memory, wherein the circuitry, using the memory: writes, into a bitstream, one or more parameters including a first parameter indicating that a first partition of an image is to be split into a plurality of partitions including at least a second partition which is a non-rectangular partition; splits the first partition, based on the first parameter; and encodes at least the second partition.

In this way, for example, the encoder is capable of performing image prediction using the non-rectangular partition. Thus, the encoder is capable of performing image prediction with higher accuracy than in image prediction using a rectangular partition.

In addition, for example, the non-rectangular partition is a triangular partition.

In this way, the encoder is capable of performing image prediction using the triangular partition. Thus, the encoder is capable of performing image prediction with higher accuracy than in image prediction using a rectangular partition.

In addition, for example, the first partition is a rectangular partition.

In this way, the encoder is capable of splitting the rectangular partition included in the image into non-rectangular partitions. Thus, the encoder is capable of performing image prediction using the non-rectangular partition even when the rectangular partition is included in the image.

In addition, for example, the first partition is a non-rectangular partition.

In this way, the encoder is capable of further splitting the non-rectangular partition included in the image into non-rectangular partitions.

Thus, the encoder is capable of performing image prediction using the non-rectangular partition even when the non-rectangular partition is included in the image.

In addition, for example, the first partition is a triangular partition.

In this way, the encoder is capable of further splitting the triangular partition included in the image into non-rectangular partitions. Thus, the encoder is capable of performing image prediction using the non-rectangular partition even when the triangular partition is included in the image.

In addition, for example, the one or more parameters include a second parameter when the first partition is a rectangular partition, the second parameter indicating one direction selected from a plurality of directions in which the first partition can be split into at least the second partition.

In this way, for example, when the first partition is a rectangular partition, the encoder is capable of writing, into a bitstream, a plurality of parameters including the parameter indicating the direction in which the second partition is to be split.

In addition, for example, the first parameter and the second parameter are the same parameters indicating the non-rectangular partition and the one direction selected.

In this way, the encoder is capable of representing (i) the non-rectangular shapes of partitions obtainable by splitting an encoding target partition and (ii) the direction for use as a direction in which the encoding target partition is to be split, using the single parameter indicating the both (i) and (ii). Thus, the encoder is capable of reducing a coding amount when performing image prediction using the non-rectangular partitions.

In addition, for example, the first partition is split based on the first parameter and the second parameter, when the first partition is a rectangular partition.

In this way, when the first partition is a rectangular partition, the encoder is capable of splitting, in the selected direction, the encoding target partition into a plurality of partitions including the second partition which is a non-rectangular partition.

In addition, for example, the one or more parameters: include a parameter indicating a direction selected from a plurality of directions in which the first partition can be split into at least the second partition, when the first partition is a rectangular partition; and do not include a parameter indicating a direction in which the first partition is to be split into at least the second partition, when the first partition is a non-rectangular partition.

In this way, the encoder is capable of writing, into the bitstream, the parameter indicating the direction in which the first partition is to be split into the plurality of partitions including the second partition, when the encoding target partition is a rectangle, and skipping writing, into the bitstream, the parameter indicating the direction in which the first partition is to be split into the plurality of partitions including the second partition, when the encoding target partition is not a rectangle. Thus, the encoder is capable of reducing the coding amount when the encoding target partition is a rectangle.

In addition, for example, the circuitry determines whether a size of the first partition is larger than a first threshold value when writing the one or more parameters into the bitstream.

In this way, the encoder is capable of writing, into the bitstream, the one or more parameters according to the size of the first partition. Thus, the encoder is capable of reducing the coding amount when performing image prediction.

In addition, for example, the circuitry writes at least the first parameter into the bitstream when the circuitry determines that the size of the first partition is larger than the first threshold value.

In this way, the encoder is capable of determining whether to write, into the bitstream, the first parameter according to the size of the first partition. Thus, the encoder is capable of reducing the coding amount when performing image prediction.

In addition, the circuitry: writes, into the bitstream, the one or more parameters including at least the first parameter indicating that the first partition of the image is to be split into the plurality of partitions including the second partition which is the non-rectangular partition, when the circuitry determines that the size of the first partition is not larger than the first threshold value; splits the first partition, based on the first parameter, and does not write the first parameter into the bitstream and does not split the first partition into at least the second partition, when the circuitry determines that the size of the first partition is larger than the first threshold value.

In this way, the encoder is capable of determining whether to write, into the bitstream, the first parameter according to the size of the first partition, and whether to split the first partition. Thus, the encoder is capable of reducing the coding amount when performing image prediction. In addition, for example, the threshold value is larger than 0.

In this way, the encoder is capable of appropriately determining whether to perform writing, etc. or skip writing the first parameter into the bitstream by employing a positive value as a threshold value.

In addition, for example, the threshold value indicates a minimum size of the first partition for splitting the first partition into at least the second partition.

In this way, the encoder is capable of appropriately determining whether to perform writing, etc. or skip writing the first parameter into the bitstream by employing the minimum size of the first partition as a threshold value.

In addition, for example, the size of the first partition is represented as the number of samples in the first partition.

In this way, the encoder is capable of representing the size of the first partition using a positive integer by employing the number of samples in the first partition as the size of the first partition.

In addition, for example, the size of the first partition is represented as a width of the first partition, when the first partition is a rectangular partition.

In this way, the encoder is capable of representing the size of the first partition in a simple manner by employing the width of the first partition as the size of the first partition.

In addition, for example, the size of the first partition is represented as a height of the first partition, when the first partition is a rectangular partition.

In this way, the encoder is capable of representing the size of the first partition in a simple manner by employing the height of the first partition as the size of the first partition.

In addition, for example, the size of the first partition is represented as a ratio between a width and a height of the first partition, when the first partition is a rectangular partition.

In this way, the encoder is capable of representing the size of the first partition in a simple manner by employing the ratio between the width and height of the first partition as the size of the first partition.

In addition, for example, a decoder according to an aspect of the present disclosure includes: circuitry; and memory, wherein the circuitry, using the memory: writes, into a bitstream, one or more parameters including a first parameter indicating that a first partition of an image is to be split into a plurality of partitions including at least a second partition which is a non-rectangular partition; splits the first partition, based on the first parameter; and decodes at least the second partition.

In this way, for example, the decoder is capable of performing image prediction using the non-rectangular partition. Thus, the decoder is capable of performing image prediction with higher accuracy than in image prediction using a rectangular partition.

In addition, for example, the non-rectangular partition is a triangular partition.

In this way, the decoder is capable of performing image prediction using the triangular partition. Thus, the decoder is capable of performing image prediction with higher accuracy than in image prediction using a rectangular partition.

In addition, for example, the first partition is a rectangular partition.

In this way, the decoder is capable of splitting the rectangular partition included in the image into non-rectangular partitions. Thus, the decoder is capable of performing image prediction using the non-rectangular partition even when the rectangular partition is included in the image.

In addition, for example, the first partition is a non-rectangular partition.

In this way, the decoder is capable of further splitting the non-rectangular partition included in the image into non-rectangular partitions. Thus, the decoder is capable of performing image prediction using the non-rectangular partition even when the non-rectangular partition is included in the image.

In addition, for example, the first partition is a triangular partition.

In this way, the decoder is capable of further splitting the triangular partition included in the image into non-rectangular partitions. Thus, the decoder is capable of performing image prediction using the non-rectangular partition even when the triangular partition is included in the image.

In addition, for example, the one or more parameters include a second parameter when the first partition is a rectangular partition, the second parameter indicating one direction selected from a plurality of directions in which the first partition can be split into at least the second partition.

In this way, for example, when the first partition is a rectangular partition, the decoder is capable of writing, into a bitstream, a plurality of parameters including the parameter indicating the direction in which the second partition is to be split.

In addition, for example, the first parameter and the second parameter are the same parameters indicating the non-rectangular partition and the one direction selected.

In this way, the decoder is capable of representing (i) the non-rectangular shapes of partitions obtainable by splitting a decoding target partition and (ii) the direction for use as a direction in which the decoding target partition is to be split, using the single parameter indicating the both (i) and (ii). Thus, the decoder is capable of reducing a coding amount when performing image prediction using the non-rectangular partitions.

In addition, for example, the first partition is split based on the first parameter and the second parameter, when the first partition is a rectangular partition.

In this way, when the first partition is a rectangular partition, the decoder is capable of splitting, in the selected direction, the decoding target partition into a plurality of partitions including the second partition which is a non-rectangular partition.

In addition, for example, the one or more parameters: include a parameter indicating a direction selected from a plurality of directions in which the first partition can be split into at least the second partition, when the first partition is a rectangular partition; and do not include a parameter indicating a direction in which the first partition is to be split into at least the second partition, when the first partition is a non-rectangular partition.

In this way, the decoder is capable of writing, into the bitstream, the parameter indicating the direction in which the first partition is to be split into the plurality of partitions including the second partition, when the decoding target partition is a rectangle, and skipping writing, into the bitstream, the parameter indicating the direction in which the first partition is to be split into the plurality of partitions including the second partition, when the decoding target partition is not a rectangle. Thus, the decoder is capable of reducing the coding amount when the decoding target partition is a rectangle.

In addition, for example, the circuitry determines whether a size of the first partition is larger than a first threshold value when writing the one or more parameters into the bitstream.

In this way, the decoder is capable of writing, into the bitstream, the one or more parameters according to the size of the first partition. Thus, the decoder is capable of reducing the coding amount when performing image prediction.

In addition, for example, the circuitry writes at least the first parameter into the bitstream when the circuitry determines that the size of the first partition is larger than the first threshold value.

In this way, the decoder is capable of determining whether to write, into the bitstream, the first parameter according to the size of the first partition. Thus, the decoder is capable of reducing the coding amount when performing image prediction.

In addition, the circuitry: writes, into the bitstream, the one or more parameters including at least the first parameter indicating that the first partition of the image is to be split into the plurality of partitions including the second partition which is the non-rectangular partition, when the circuitry determines that the size of the first partition is not larger than the first threshold value; splits the first partition, based on the first parameter, and does not write the first parameter into the bitstream and does not split the first partition into at least the second partition, when the circuitry determines that the size of the first partition is larger than the first threshold value.

In this way, the decoder is capable of determining whether to write, into the bitstream, the first parameter according to the size of the first partition, and whether to split the first partition. Thus, the decoder is capable of reducing the coding amount when performing image prediction.

In addition, for example, the threshold value is larger than 0.

In this way, the decoder is capable of appropriately determining whether to perform writing, etc. or skip writing the first parameter into the bitstream by employing a positive value as a threshold value.

In addition, for example, the threshold value indicates a minimum size of the first partition for splitting the first partition into a plurality of partitions including at least the second partition.

In this way, the decoder is capable of appropriately determining whether to perform writing, etc. or skip writing the first parameter into the bitstream by employing the minimum size of the first partition as a threshold value.

In addition, for example, the size of the first partition is represented as the number of samples in the first partition.

In this way, the decoder is capable of representing the size of the first partition using a positive integer by employing the number of samples in the first partition as the size of the first partition.

In addition, for example, the size of the first partition is represented as a width of the first partition, when the first partition is a rectangular partition.

In this way, the decoder is capable of representing the size of the first partition in a simple manner by employing the width of the first partition as the size of the first partition.

In addition, for example, the size of the first partition is represented as a height of the first partition, when the first partition is a rectangular partition.

In this way, the decoder is capable of representing the size of the first partition in a simple manner by employing the height of the first partition as the size of the first partition.

In addition, for example, the size of the first partition is represented as a ratio between a width and a height of the first partition, when the first partition is a rectangular partition.

In this way, the decoder is capable of representing the size of the first partition in a simple manner by employing the ratio between the width and length of the first partition as the size of the first partition.

In addition, for example, an encoding method according to an aspect of the present disclosure includes: writing, into a bitstream, one or more parameters including a first parameter indicating that a first partition of an image is to be split into a plurality of partitions including at least a second partition which is a non-rectangular partition; splitting the first partition, based on the first parameter; and encoding at least the second partition.

In this way, for example, the encoding method enables image prediction using the non-rectangular partition. Thus, the encoding method enables image prediction with higher accuracy than in image prediction using a rectangular partition.

In addition, for example, a decoding method according to an aspect of the present disclosure includes: writing, into a bitstream, one or more parameters including a first parameter indicating that a first partition of an image is to be split into a plurality of partitions including at least a second partition which is a non-rectangular partition; splitting the first partition, based on the first parameter; and decoding at least the second partition.

In this way, for example, the decoding method enables image prediction using the non-rectangular partition. Thus, the decoding method enables image prediction with higher accuracy than in image prediction using a rectangular partition.

In addition, for example, the encoder according to an aspect of the present disclosure may include: a splitter; an intra predictor: an inter predictor; a loop filter; a transformer; a quantizer; and an entropy encoder.

The splitter may split a picture into a plurality of blocks. The intra predictor may perform intra prediction on a block included in the plurality of blocks. The inter predictor may perform inter prediction on the block. The transformer may transform prediction errors between a prediction image obtained by the intra prediction or the inter prediction and an original image, to generate transform coefficients. The quantizer may quantize the transform coefficients to generate quantized coefficients. The entropy encoder may encode the quantized coefficients to generate an encoded bitstream. The loop filter may apply a filter to a reconstructed image of the block.

In addition, for example, the encoder may be an encoder which encodes a video including a plurality of pictures.

The intra predictor includes circuitry and memory. Using the memory, the circuitry may write, into a bitstream, one or more parameters including a first parameter indicating that a first partition of an image is to be split into a plurality of partitions including at least one second partition which is a non-rectangular partition, split the first partition, and encode the at least one second partition.

In addition, for example, the decoder according to an aspect of the present disclosure includes: an entropy decoder; an inverse quantizer; an inverse transformer; an intra predictor; an inter predictor; and a loop filter.

The entropy decoder may decode quantized coefficients of a block in a picture, from the encoded bitstream. The inverse quantizer may inverse-quantizes the quantized coefficients to obtain transform coefficients. The inverse transformer may inverse-transform the transform coefficients to obtain prediction errors. The intra predictor may perform intra prediction on the block. The inter predictor may perform inter prediction on the block. The filter may apply a filter to a reconstructed image generated using the prediction image obtained through the intra prediction or the inter prediction and the prediction error.

In addition, for example, the decoder may be a decoder which decodes a video including a plurality of pictures.

The intra predictor includes circuitry and memory. Using the memory, the circuitry may write, into a bitstream, one or more parameters including a first parameter indicating that a first partition of an image is to be split into a plurality of partitions including at least one second partition which is a non-rectangular partition, split the first partition, and decode the at least one second partition.

Furthermore, these general and specific aspects may be implemented using a system, a device, a method, an integrated circuit, a computer program, or a non-transitory computer-readable recording medium such as a CD-ROM, or any combination of systems, devices, methods, integrated circuits, computer programs, or computer-readable recording media.

Hereinafter, embodiments will be described with reference to the drawings. Note that the embodiments described below each show a general or specific example. The numerical values, shapes, materials, components, the arrangement and connection of the components, steps, order of the steps, etc., indicated in the following embodiments are mere examples, and therefore are not intended to limit the scope of the claims. Therefore, among the components in the following embodiments, those not recited in any of the independent claims defining the broadest inventive concepts are described as optional components.

Embodiment 1

First, an outline of Embodiment 1 will be presented. Embodiment 1 is one example of an encoder and a decoder to which the processes and/or configurations presented in subsequent description of aspects of the present disclosure are applicable. Note that Embodiment 1 is merely one example of an encoder and a decoder to which the processes and/or configurations presented in the description of aspects of the present disclosure are applicable. The processes and/or configurations presented in the description of aspects of the present disclosure can also be implemented in an encoder and a decoder different from those according to Embodiment 1.

When the processes and/or configurations presented in the description of aspects of the present disclosure are applied to Embodiment 1, for example, any of the following may be performed.

(1) regarding the encoder or the decoder according to Embodiment 1, among components included in the encoder or the decoder according to Embodiment 1, substituting a component corresponding to a component presented in the description of aspects of the present disclosure with a component presented in the description of aspects of the present disclosure;

(2) regarding the encoder or the decoder according to Embodiment 1, implementing discretionary changes to functions or implemented processes performed by one or more components included in the encoder or the decoder according to Embodiment 1, such as addition, substitution, or removal, etc., of such functions or implemented processes, then substituting a component corresponding to a component presented in the description of aspects of the present disclosure with a component presented in the description of aspects of the present disclosure;

(3) regarding the method implemented by the encoder or the decoder according to Embodiment 1, implementing discretionary changes such as addition of processes and/or substitution, removal of one or more of the processes included in the method, and then substituting a processes corresponding to a process presented in the description of aspects of the present disclosure with a process presented in the description of aspects of the present disclosure;

(4) combining one or more components included in the encoder or the decoder according to Embodiment 1 with a component presented in the description of aspects of the present disclosure, a component including one or more functions included in a component presented in the description of aspects of the present disclosure, or a component that implements one or more processes implemented by a component presented in the description of aspects of the present disclosure;

(5) combining a component including one or more functions included in one or more components included in the encoder or the decoder according to Embodiment 1, or a component that implements one or more processes implemented by one or more components included in the encoder or the decoder according to Embodiment 1 with a component presented in the description of aspects of the present disclosure, a component including one or more functions included in a component presented in the description of aspects of the present disclosure, or a component that implements one or more processes implemented by a component presented in the description of aspects of the present disclosure;

(6) regarding the method implemented by the encoder or the decoder according to Embodiment 1, among processes included in the method, substituting a process corresponding to a process presented in the description of aspects of the present disclosure with a process presented in the description of aspects of the present disclosure; and (7) combining one or more processes included in the method implemented by the encoder or the decoder according to Embodiment 1 with a process presented in the description of aspects of the present disclosure.

Note that the implementation of the processes and/or configurations presented in the description of aspects of the present disclosure is not limited to the above examples. For example, the processes and/or configurations presented in the description of aspects of the present disclosure may be implemented in a device used for a purpose different from the moving picture/picture encoder or the moving picture/picture decoder disclosed in Embodiment 1. Moreover, the processes and/or configurations presented in the description of aspects of the present disclosure may be independently implemented. Moreover, processes and/or configurations described in different aspects may be combined.

[Encoder Outline]

First, the encoder according to Embodiment 1 will be outlined. FIG. 1 is a block diagram illustrating a functional configuration of encoder 100 according to Embodiment 1. Encoder 100 is a moving picture/picture encoder that encodes a moving picture/picture block by block.

As illustrated in FIG. 1, encoder 100 is a device that encodes a picture block by block, and includes splitter 102, subtractor 104, transformer 106, quantizer 108, entropy encoder 110, inverse quantizer 112, inverse transformer 114, adder 116, block memory 118, loop filter 120, frame memory 122, intra predictor 124, inter predictor 126, and prediction controller 128.

Encoder 100 is realized as, for example, a generic processor and memory. In this case, when a software program stored in the memory is executed by the processor, the processor functions as splitter 102, subtractor 104, transformer 106, quantizer 108, entropy encoder 110, inverse quantizer 112, inverse transformer 114, adder 116, loop filter 120, intra predictor 124, inter predictor 126, and prediction controller 128. Alternatively, encoder 100 may be realized as one or more dedicated electronic circuits corresponding to splitter 102, subtractor 104, transformer 106, quantizer 108, entropy encoder 110, inverse quantizer 112, inverse transformer 114, adder 116, loop filter 120, intra predictor 124, inter predictor 126, and prediction controller 128.

Hereinafter, each component included in encoder 100 will be described.

[Splitter]

Splitter 102 splits each picture included in an input moving picture into blocks, and outputs each block to subtractor 104. For example, splitter 102 first splits a picture into blocks of a fixed size (for example, 128×128). The fixed size block is also referred to as coding tree unit (CTU). Splitter 102 then splits each fixed size block into blocks of variable sizes (for example, 64×64 or smaller), based on recursive quadtree and/or binary tree block splitting. The variable size block is also referred to as a coding unit (CU), a prediction unit (PU), or a transform unit (TU). Note that in this embodiment, there is no need to differentiate between CU, PU, and TU; all or some of the blocks in a picture may be processed per CU, PU, or TU.

Figure 2:
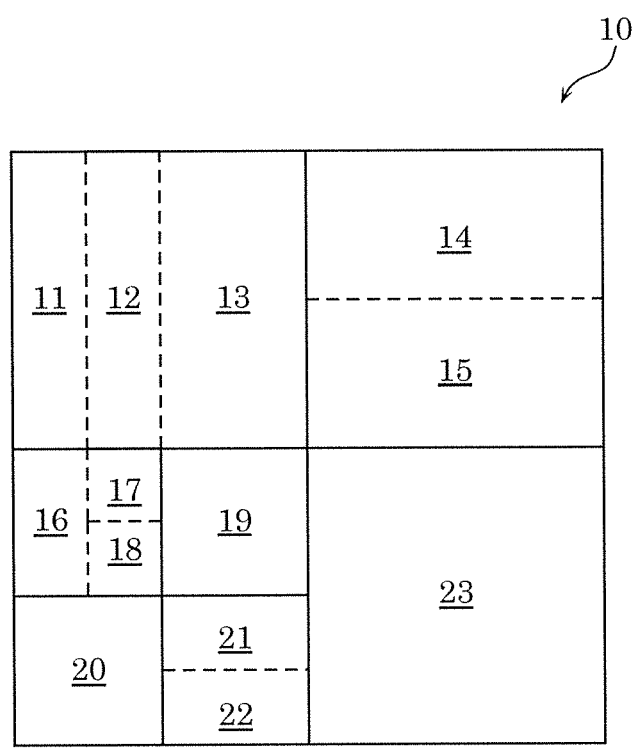
FIG. 2 illustrates one example of block splitting according to Embodiment 1.

FIG. 2 illustrates one example of block splitting according to Embodiment 1. In FIG. 2, the solid lines represent block boundaries of blocks split by quadtree block splitting, and the dashed lines represent block boundaries of blocks split by binary tree block splitting.

Here, block 10 is a square 128×128 pixel block (128×128 block). This 128×128 block 10 is first split into four square 64×64 blocks (quadtree block splitting).

The top left 64×64 block is further vertically split into two rectangle 32×64 blocks, and the left 32×64 block is further vertically split into two rectangle 16×64 blocks (binary tree block splitting). As a result, the top left 64×64 block is split into two 16×64 blocks 11 and 12 and one 32×64 block 13.

The top right 64×64 block is horizontally split into two rectangle 64×32 blocks 14 and 15 (binary tree block splitting).

The bottom left 64×64 block is first split into four square 32×32 blocks (quadtree block splitting). The top left block and the bottom right block among the four 32×32 blocks are further split. The top left 32×32 block is vertically split into two rectangle 16×32 blocks, and the right 16×32 block is further horizontally split into two 16×16 blocks (binary tree block splitting). The bottom right 32×32 block is horizontally split into two 32×16 blocks (binary tree block splitting). As a result, the bottom left 64×64 block is split into 16×32 block 16, two 16×16 blocks 17 and 18, two 32×32 blocks 19 and 20, and two 32×16 blocks 21 and 22.

The bottom right 64×64 block 23 is not split.

As described above, in FIG. 2, block 10 is split into 13 variable size blocks 11 through 23 based on recursive quadtree and binary tree block splitting. This type of splitting is also referred to as quadtree plus binary tree (QTBT) splitting.

Note that in FIG. 2, one block is split into four or two blocks (quadtree or binary tree block splitting), but splitting is not limited to this example. For example, one block may be split into three blocks (ternary block splitting). Splitting including such ternary block splitting is also referred to as multi-type tree (MBT) splitting.

[Subtractor]

Subtractor 104 subtracts a prediction signal (prediction sample) from an original signal (original sample) per block split by splitter 102. In other words, subtractor 104 calculates prediction errors (also referred to as residuals) of a block to be encoded (hereinafter referred to as a current block). Subtractor 104 then outputs the calculated prediction errors to transformer 106.

The original signal is a signal input into encoder 100, and is a signal representing an image for each picture included in a moving picture (for example, a luma signal and two chroma signals). Hereinafter, a signal representing an image is also referred to as a sample.

[Transformer]

Transformer 106 transforms spatial domain prediction errors into frequency domain transform coefficients, and outputs the transform coefficients to quantizer 108. More specifically, transformer 106 applies, for example, a predefined discrete cosine transform (DCT) or discrete sine transform (DST) to spatial domain prediction errors.

Note that transformer 106 may adaptively select a transform type from among a plurality of transform types, and transform prediction errors into transform coefficients by using a transform basis function corresponding to the selected transform type. This sort of transform is also referred to as explicit multiple core transform (EMT) or adaptive multiple transform (AMT).

The transform types include, for example, DCT-II, DCT-V, DCT-VIII, DST-I, and DST-VII. FIG. 3 is a chart indicating transform basis functions for each transform type. In FIG. 3, N indicates the number of input pixels. For example, selection of a transform type from among the plurality of transform types may depend on the prediction type (intra prediction and inter prediction), and may depend on intra prediction mode.

Information indicating whether to apply such EMT or AMT (referred to as, for example, an AMT flag) and information indicating the selected transform type is signalled at the CU level. Note that the signaling of such information need not be performed at the CU level, and may be performed at another level (for example, at the sequence level, picture level, slice level, tile level, or CTU level).

Moreover, transformer 106 may apply a secondary transform to the transform coefficients (transform result). Such a secondary transform is also referred to as adaptive secondary transform (AST) or non-separable secondary transform (NSST). For example, transformer 106 applies a secondary transform to each sub-block (for example, each 4×4 sub-block) included in the block of the transform coefficients corresponding to the intra prediction errors. Information indicating whether to apply NSST and information related to the transform matrix used in NSST are signalled at the CU level. Note that the signaling of such information need not be performed at the CU level, and may be performed at another level (for example, at the sequence level, picture level, slice level, tile level, or CTU level).

Here, a separable transform is a method in which a transform is performed a plurality of times by separately performing a transform for each direction according to the number of dimensions input. A non-separable transform is a method of performing a collective transform in which two or more dimensions in a multidimensional input are collectively regarded as a single dimension.

In one example of a non-separable transform, when the input is a 4×4 block, the 4×4 block is regarded as a single array including 16 components, and the transform applies a 16×16 transform matrix to the array.

Moreover, similar to above, after an input 4×4 block is regarded as a single array including 16 components, a transform that performs a plurality of Givens rotations on the array (i.e., a Hypercube-Givens Transform) is also one example of a non-separable transform.

[Quantizer]

Quantizer 108 quantizes the transform coefficients output from transformer 106. More specifically, quantizer 108 scans, in a predetermined scanning order, the transform coefficients of the current block, and quantizes the scanned transform coefficients based on quantization parameters (QP) corresponding to the transform coefficients. Quantizer 108 then outputs the quantized transform coefficients (hereinafter referred to as quantized coefficients) of the current block to entropy encoder 110 and inverse quantizer 112.

A predetermined order is an order for quantizing/inverse quantizing transform coefficients. For example, a predetermined scanning order is defined as ascending order of frequency (from low to high frequency) or descending order of frequency (from high to low frequency).

A quantization parameter is a parameter defining a quantization step size (quantization width). For example, if the value of the quantization parameter increases, the quantization step size also increases. In other words, if the value of the quantization parameter increases, the quantization error increases.

[Entropy Encoder]

Entropy encoder 110 generates an encoded signal (encoded bitstream) by variable length encoding quantized coefficients, which are inputs from quantizer 108. More specifically, entropy encoder 110, for example, binarizes quantized coefficients and arithmetic encodes the binary signal.

[Inverse Quantizer]

Inverse quantizer 112 inverse quantizes quantized coefficients, which are inputs from quantizer 108. More specifically, inverse quantizer 112 inverse quantizes, in a predetermined scanning order, quantized coefficients of the current block. Inverse quantizer 112 then outputs the inverse quantized transform coefficients of the current block to inverse transformer 114.

[Inverse Transformer]

Inverse transformer 114 restores prediction errors by inverse transforming transform coefficients, which are inputs from inverse quantizer 112. More specifically, inverse transformer 114 restores the prediction errors of the current block by applying an inverse transform corresponding to the transform applied by transformer 106 on the transform coefficients. Inverse transformer 114 then outputs the restored prediction errors to adder 116.

Note that since information is lost in quantization, the restored prediction errors do not match the prediction errors calculated by subtractor 104. In other words, the restored prediction errors include quantization errors.

[Adder]

Adder 116 reconstructs the current block by summing prediction errors, which are inputs from inverse transformer 114, and prediction samples, which are inputs from prediction controller 128. Adder 116 then outputs the reconstructed block to block memory 118 and loop filter 120. A reconstructed block is also referred to as a local decoded block.

[Block Memory]

Block memory 118 is storage for storing blocks in a picture to be encoded (hereinafter referred to as a current picture) for reference in intra prediction. More specifically, block memory 118 stores reconstructed blocks output from adder 116.

[Loop Filter]

Loop filter 120 applies a loop filter to blocks reconstructed by adder 116, and outputs the filtered reconstructed blocks to frame memory 122. A loop filter is a filter used in an encoding loop (in-loop filter), and includes, for example, a deblocking filter (DF), a sample adaptive offset (SAO), and an adaptive loop filter (ALF).

In ALF, a least square error filter for removing compression artifacts is applied. For example, one filter from among a plurality of filters is selected for each 2×2 sub-block in the current block based on direction and activity of local gradients, and is applied.

More specifically, first, each sub-block (for example, each 2×2 sub-block) is categorized into one out of a plurality of classes (for example, 15 or 25 classes). The classification of the sub-block is based on gradient directionality and activity. For example, classification index C is derived based on gradient directionality D (for example, 0 to 2 or 0 to 4) and gradient activity A (for example, 0 to 4) (for example, C=5D+A). Then, based on classification index C, each sub-block is categorized into one out of a plurality of classes (for example, 15 or 25 classes).

For example, gradient directionality D is calculated by comparing gradients of a plurality of directions (for example, the horizontal, vertical, and two diagonal directions). Moreover, for example, gradient activity A is calculated by summing gradients of a plurality of directions and quantizing the sum.

The filter to be used for each sub-block is determined from among the plurality of filters based on the result of such categorization.

Figure 4A:
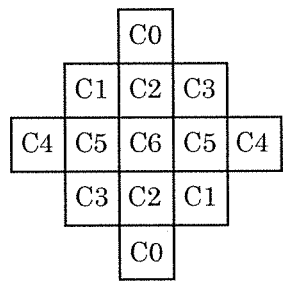
FIG. 4A illustrates one example of a filter shape used in ALF.
Figure 4B:
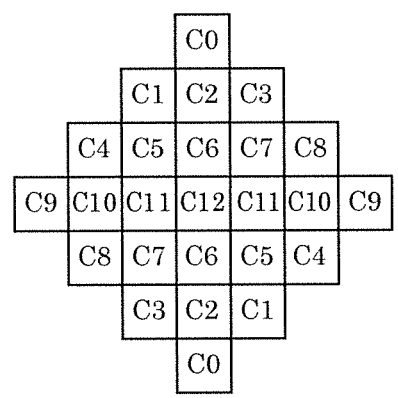
FIG. 4B illustrates another example of a filter shape used in ALF.
Figure 4C:
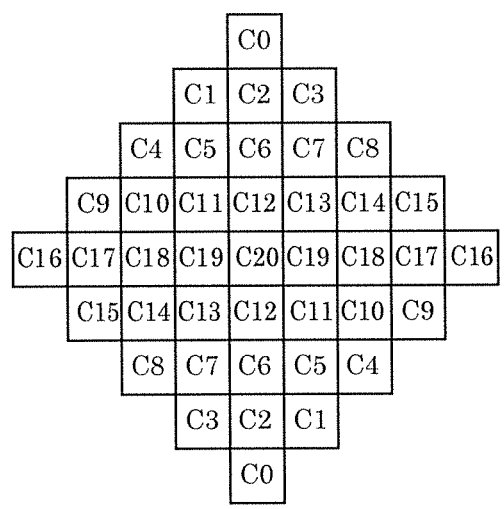
FIG. 4C illustrates another example of a filter shape used in ALF.

The filter shape to be used in ALF is, for example, a circular symmetric filter shape. FIG. 4A through FIG. 4C illustrate examples of filter shapes used in ALF. FIG. 4A illustrates a 5×5 diamond shape filter, FIG. 4B illustrates a 7×7 diamond shape filter, and FIG. 4C illustrates a 9×9 diamond shape filter. Information indicating the filter shape is signalled at the picture level. Note that the signaling of information indicating the filter shape need not be performed at the picture level, and may be performed at another level (for example, at the sequence level, slice level, tile level, CTU level, or CU level).

The enabling or disabling of ALF is determined at the picture level or CU level. For example, for luma, the decision to apply ALF or not is done at the CU level, and for chroma, the decision to apply ALF or not is done at the picture level. Information indicating whether ALF is enabled or disabled is signalled at the picture level or CU level. Note that the signaling of information indicating whether ALF is enabled or disabled need not be performed at the picture level or CU level, and may be performed at another level (for example, at the sequence level, slice level, tile level, or CTU level).

The coefficients set for the plurality of selectable filters (for example, 15 or 25 filters) is signalled at the picture level. Note that the signaling of the coefficients set need not be performed at the picture level, and may be performed at another level (for example, at the sequence level, slice level, tile level, CTU level, CU level, or sub-block level).

[Frame Memory]

Frame memory 122 is storage for storing reference pictures used in inter prediction, and is also referred to as a frame buffer. More specifically, frame memory 122 stores reconstructed blocks filtered by loop filter 120.

[Intra Predictor]

Intra predictor 124 generates a prediction signal (intra prediction signal) by intra predicting the current block with reference to a block or blocks in the current picture and stored in block memory 118 (also referred to as intra frame prediction). More specifically, intra predictor 124 generates an intra prediction signal by intra prediction with reference to samples (for example, luma and/or chroma values) of a block or blocks neighboring the current block, and then outputs the intra prediction signal to prediction controller 128.

For example, intra predictor 124 performs intra prediction by using one mode from among a plurality of predefined intra prediction modes. The intra prediction modes include one or more non-directional prediction modes and a plurality of directional prediction modes.

The one or more non-directional prediction modes include, for example, planar prediction mode and DC prediction mode defined in the H.265/high-efficiency video coding (HEVC) standard (see NPTL 1).

Figure 5A:
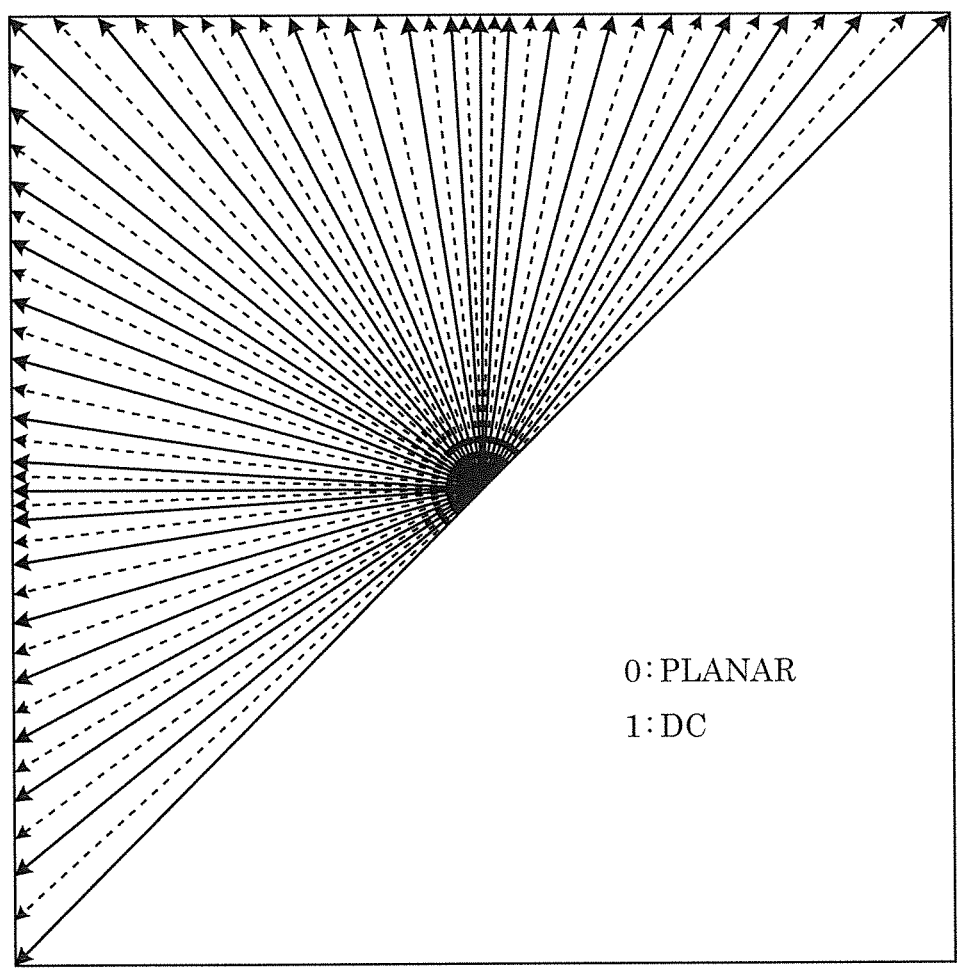
FIG. 5A illustrates 67 intra prediction modes used in intra prediction.

The plurality of directional prediction modes include, for example, the 33 directional prediction modes defined in the H.265/HEVC standard. Note that the plurality of directional prediction modes may further include 32 directional prediction modes in addition to the 33 directional prediction modes (for a total of 65 directional prediction modes). FIG. 5A illustrates 67 intra prediction modes used in intra prediction (two non-directional prediction modes and 65 directional prediction modes). The solid arrows represent the 33 directions defined in the H.265/HEVC standard, and the dashed arrows represent the additional 32 directions.

Note that a luma block may be referenced in chroma block intra prediction. In other words, a chroma component of the current block may be predicted based on a luma component of the current block. Such intra prediction is also referred to as cross-component linear model (CCLM) prediction. Such a chroma block intra prediction mode that references a luma block (referred to as, for example, CCLM mode) may be added as one of the chroma block intra prediction modes.

Intra predictor 124 may correct post-intra-prediction pixel values based on horizontal/vertical reference pixel gradients. Intra prediction accompanied by this sort of correcting is also referred to as position dependent intra prediction combination (PDPC). Information indicating whether to apply PDPC or not (referred to as, for example, a PDPC flag) is, for example, signalled at the CU level. Note that the signaling of this information need not be performed at the CU level, and may be performed at another level (for example, on the sequence level, picture level, slice level, tile level, or CTU level).

[Inter Predictor]

Inter predictor 126 generates a prediction signal (inter prediction signal) by inter predicting the current block with reference to a block or blocks in a reference picture, which is different from the current picture and is stored in frame memory 122 (also referred to as inter frame prediction). Inter prediction is performed per current block or per sub-block (for example, per 4×4 block) in the current block. For example, inter predictor 126 performs motion estimation in a reference picture for the current block or sub-block. Inter predictor 126 then generates an inter prediction signal of the current block or sub-block by motion compensation by using motion information (for example, a motion vector) obtained from motion estimation. Inter predictor 126 then outputs the generated inter prediction signal to prediction controller 128.

The motion information used in motion compensation is signalled. A motion vector predictor may be used for the signaling of the motion vector. In other words, the difference between the motion vector and the motion vector predictor may be signalled.

Note that the inter prediction signal may be generated using motion information for a neighboring block in addition to motion information for the current block obtained from motion estimation. More specifically, the inter prediction signal may be generated per sub-block in the current block by calculating a weighted sum of a prediction signal based on motion information obtained from motion estimation and a prediction signal based on motion information for a neighboring block. Such inter prediction (motion compensation) is also referred to as overlapped block motion compensation (OBMC).

In such an OBMC mode, information indicating sub-block size for OBMC (referred to as, for example, OBMC block size) is signalled at the sequence level. Moreover, information indicating whether to apply the OBMC mode or not (referred to as, for example, an OBMC flag) is signalled at the CU level. Note that the signaling of such information need not be performed at the sequence level and CU level, and may be performed at another level (for example, at the picture level, slice level, tile level, CTU level, or sub-block level).

Figure 5B:
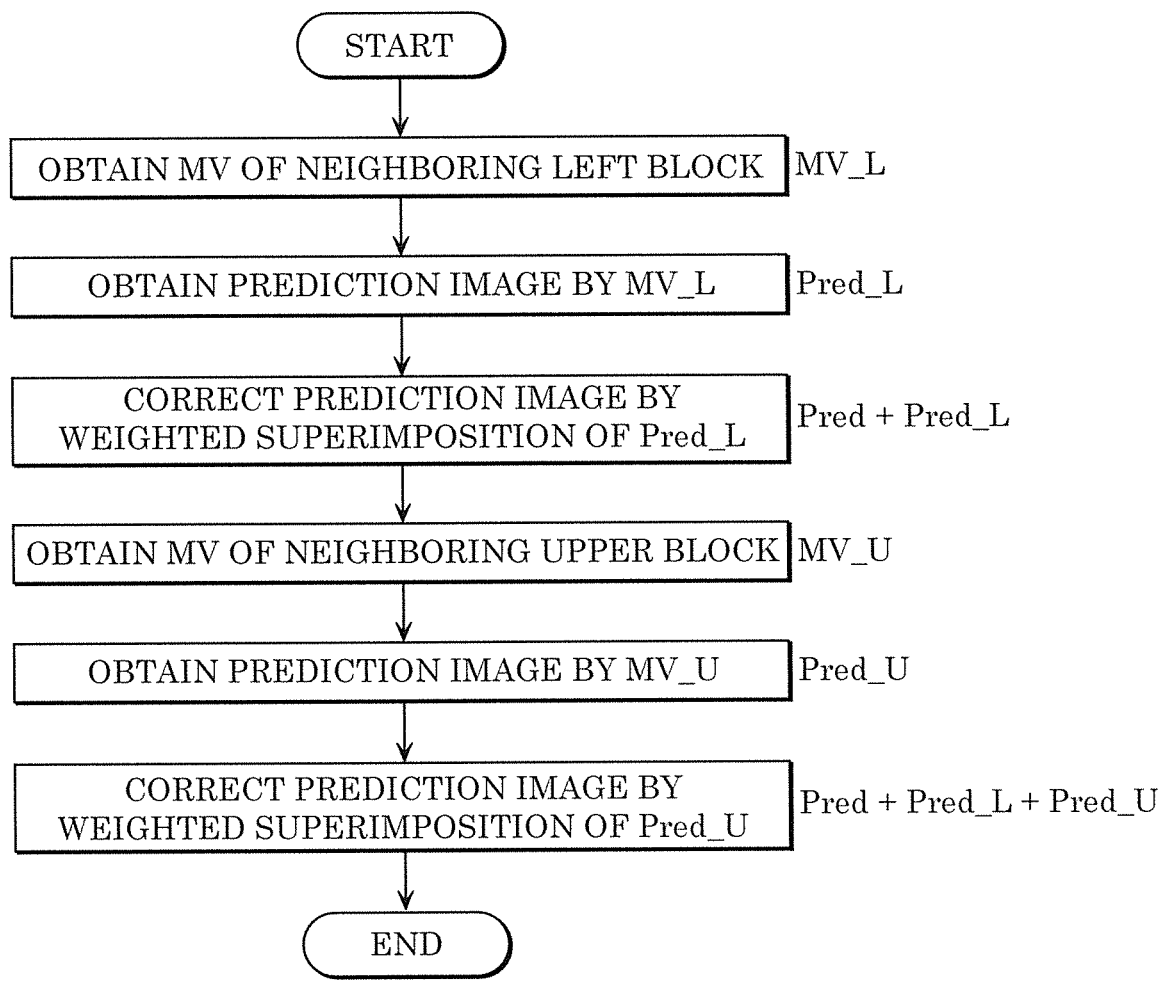
FIG. 5B is a flow chart for illustrating an outline of a prediction image correction process performed via OBMC processing.
Figure 5C:
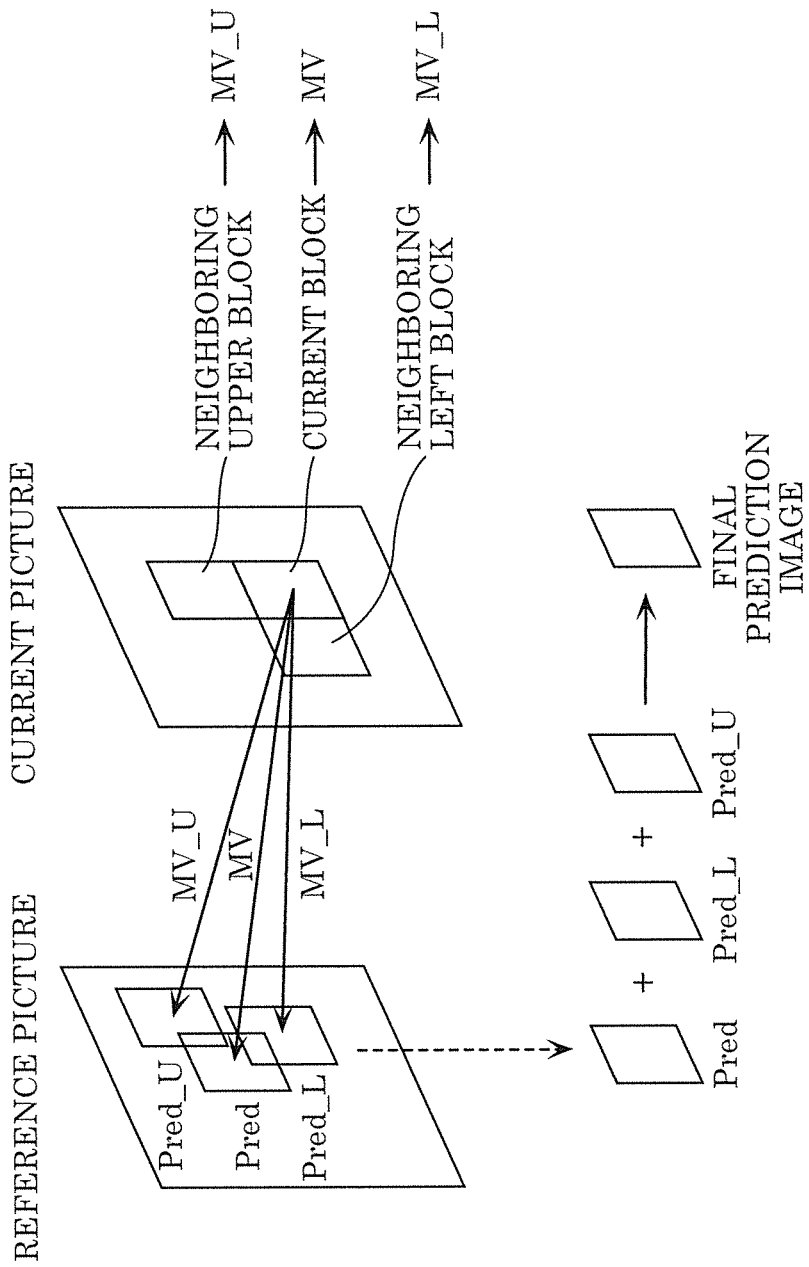
FIG. 5C is a conceptual diagram for illustrating an outline of a prediction image correction process performed via OBMC processing.

Hereinafter, the OBMC mode will be described in further detail. FIG. 5B is a flowchart and FIG. 5C is a conceptual diagram for illustrating an outline of a prediction image correction process performed via OBMC processing.

First, a prediction image (Pred) is obtained through typical motion compensation using a motion vector (MV) assigned to the current block.

Next, a prediction image (Pred_L) is obtained by applying a motion vector (MV_L) of the encoded neighboring left block to the current block, and a first pass of the correction of the prediction image is made by superimposing the prediction image and Pred_L.

Similarly, a prediction image (Pred_U) is obtained by applying a motion vector (MV_U) of the encoded neighboring upper block to the current block, and a second pass of the correction of the prediction image is made by superimposing the prediction image resulting from the first pass and Pred_U. The result of the second pass is the final prediction image.

Note that the above example is of a two-pass correction method using the neighboring left and upper blocks, but the method may be a three-pass or higher correction method that also uses the neighboring right and/or lower block.

Note that the region subject to superimposition may be the entire pixel region of the block, and, alternatively, may be a partial block boundary region.

Note that here, the prediction image correction process is described as being based on a single reference picture, but the same applies when a prediction image is corrected based on a plurality of reference pictures. In such a case, after corrected prediction images resulting from performing correction based on each of the reference pictures are obtained, the obtained corrected prediction images are further superimposed to obtain the final prediction image.

Note that the unit of the current block may be a prediction block and, alternatively, may be a sub-block obtained by further dividing the prediction block.

One example of a method for determining whether to implement OBMC processing is by using an obmc_flag, which is a signal that indicates whether to implement OBMC processing. As one specific example, the encoder determines whether the current block belongs to a region including complicated motion. The encoder sets the obmc_flag to a value of "1" when the block belongs to a region including complicated motion and implements OBMC processing when encoding, and sets the obmc_flag to a value of "0" when the block does not belong to a region including complication motion and encodes without implementing OBMC processing. The decoder switches between implementing OBMC processing or not by decoding the obmc_flag written in the stream and performing the decoding in accordance with the flag value.

Note that the motion information may be derived on the decoder side without being signalled. For example, a merge mode defined in the H.265/HEVC standard may be used. Moreover, for example, the motion information may be derived by performing motion estimation on the decoder side. In this case, motion estimation is performed without using the pixel values of the current block.

Here, a mode for performing motion estimation on the decoder side will be described. A mode for performing motion estimation on the decoder side is also referred to as pattern matched motion vector derivation (PMMVD) mode or frame rate up-conversion (FRUC) mode.

Figure 5D:
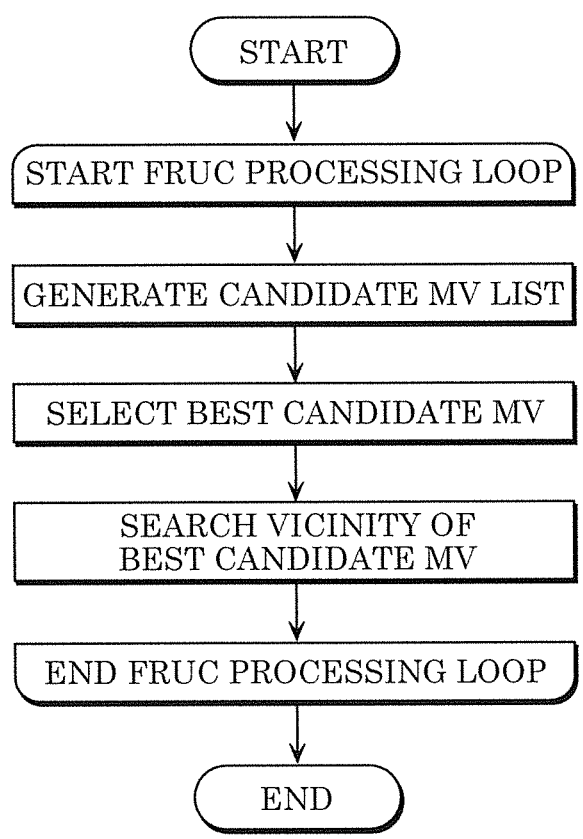
FIG. 5D illustrates one example of FRUC.

One example of FRUC processing is illustrated in FIG. 5D. First, a candidate list (a candidate list may be a merge list) of candidates each including a motion vector predictor is generated with reference to motion vectors of encoded blocks that spatially or temporally neighbor the current block. Next, the best candidate MV is selected from among a plurality of candidate MVs registered in the candidate list. For example, evaluation values for the candidates included in the candidate list are calculated and one candidate is selected based on the calculated evaluation values.

Next, a motion vector for the current block is derived from the motion vector of the selected candidate. More specifically, for example, the motion vector for the current block is calculated as the motion vector of the selected candidate (best candidate MV), as-is. Alternatively, the motion vector for the current block may be derived by pattern matching performed in the vicinity of a position in a reference picture corresponding to the motion vector of the selected candidate. In other words, when the vicinity of the best candidate MV is searched via the same method and an MV having a better evaluation value is found, the best candidate MV may be updated to the MV having the better evaluation value, and the MV having the better evaluation value may be used as the final MV for the current block. Note that a configuration in which this processing is not implemented is also acceptable.

The same processes may be performed in cases in which the processing is performed in units of sub-blocks.

Note that an evaluation value is calculated by calculating the difference in the reconstructed image by pattern matching performed between a region in a reference picture corresponding to a motion vector and a predetermined region. Note that the evaluation value may be calculated by using some other information in addition to the difference.

The pattern matching used is either first pattern matching or second pattern matching. First pattern matching and second pattern matching are also referred to as bilateral matching and template matching, respectively.

In the first pattern matching, pattern matching is performed between two blocks along the motion trajectory of the current block in two different reference pictures. Therefore, in the first pattern matching, a region in another reference picture conforming to the motion trajectory of the current block is used as the predetermined region for the above-described calculation of the candidate evaluation value.

FIG. 6 is for illustrating one example of pattern matching (bilateral matching) between two blocks along a motion trajectory. As illustrated in FIG. 6, in the first pattern matching, two motion vectors (MV0, MV1) are derived by finding the best match between two blocks along the motion trajectory of the current block (Cur block) in two different reference pictures (Ref0, Ref1). More specifically, a difference between (i) a reconstructed image in a specified position in a first encoded reference picture (Ref0) specified by a candidate MV and (ii) a reconstructed picture in a specified position in a second encoded reference picture (Ref1) specified by a symmetrical MV scaled at a display time interval of the candidate MV may be derived, and the evaluation value for the current block may be calculated by using the derived difference. The candidate MV having the best evaluation value among the plurality of candidate MVs may be selected as the final MV.

Under the assumption of continuous motion trajectory, the motion vectors (MV0, MV1) pointing to the two reference blocks shall be proportional to the temporal distances (TD0, TD1) between the current picture (Cur Pic) and the two reference pictures (Ref0, Ref1). For example, when the current picture is temporally between the two reference pictures and the temporal distance from the current picture to the two reference pictures is the same, the first pattern matching derives a mirror based bi-directional motion vector.

In the second pattern matching, pattern matching is performed between a template in the current picture (blocks neighboring the current block in the current picture (for example, the top and/or left neighboring blocks)) and a block in a reference picture. Therefore, in the second pattern matching, a block neighboring the current block in the current picture is used as the predetermined region for the above-described calculation of the candidate evaluation value.

Figure 7:
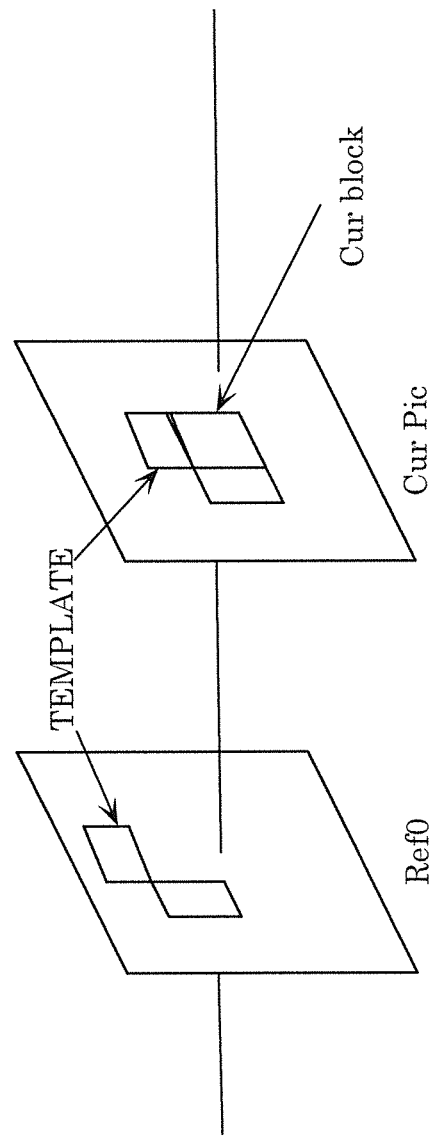
FIG. 7 is for illustrating pattern matching (template matching) between a template in the current picture and a block in a reference picture.

FIG. 7 is for illustrating one example of pattern matching (template matching) between a template in the current picture and a block in a reference picture. As illustrated in FIG. 7, in the second pattern matching, a motion vector of the current block is derived by searching a reference picture (Ref0) to find the block that best matches neighboring blocks of the current block (Cur block) in the current picture (Cur Pic). More specifically, a difference between (i) a reconstructed image of an encoded region that is both or one of the neighboring left and neighboring upper region and (ii) a reconstructed picture in the same position in an encoded reference picture (Ref0) specified by a candidate MV may be derived, and the evaluation value for the current block may be calculated by using the derived difference. The candidate MV having the best evaluation value among the plurality of candidate MVs may be selected as the best candidate MV.

Information indicating whether to apply the FRUC mode or not (referred to as, for example, a FRUC flag) is signalled at the CU level. Moreover, when the FRUC mode is applied (for example, when the FRUC flag is set to true), information indicating the pattern matching method (first pattern matching or second pattern matching) is signalled at the CU level. Note that the signaling of such information need not be performed at the CU level, and may be performed at another level (for example, at the sequence level, picture level, slice level, tile level, CTU level, or sub-block level).

Here, a mode for deriving a motion vector based on a model assuming uniform linear motion will be described. This mode is also referred to as a bi-directional optical flow (BIO) mode.

Figure 8:
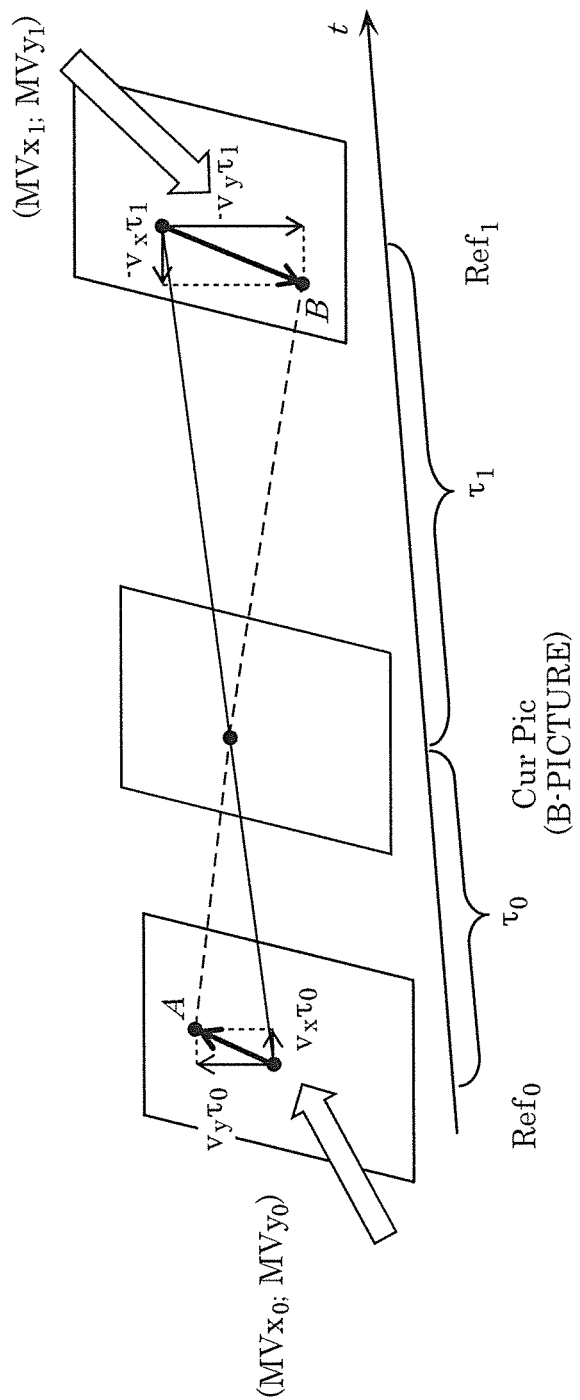
FIG. 8 is for illustrating a model assuming uniform linear motion.

FIG. 8 is for illustrating a model assuming uniform linear motion. In FIG. 8, $(v_x, v_y)$ denotes a velocity vector, and $\tau_0$ and $\tau_1$ denote temporal distances between the current picture (Cur Pic) and two reference pictures (Ref$_0$, Ref$_1$). (MVx$_0$, MVy$_0$) denotes a motion vector corresponding to reference picture Ref$_0$, and (MVx$_1$, MVy$_1$) denotes a motion vector corresponding to reference picture Ref$_1$.

Here, under the assumption of uniform linear motion exhibited by velocity vector $(v_x, v_y)$, (MVx$_0$, MVy$_0$) and (MVx$_1$, MVy$_1$) are represented as $(v_x\tau_0, v_y\tau_0)$ and $(-v_x\tau_1, -v_y\tau_1)$, respectively, and the following optical flow equation is given.

MATH. 1

$$\partial I^{(k)}/\partial t + v_x \partial I^{(k)}/\partial x + v_y \partial I^{(k)}/\partial y = 0. \qquad (1)$$

Here, $I^{(k)}$ denotes a luma value from reference picture k (k=0, 1) after motion compensation. This optical flow equation shows that the sum of (i) the time derivative of the luma value, (ii) the product of the horizontal velocity and the horizontal component of the spatial gradient of a reference picture, and (iii) the product of the vertical velocity and the vertical component of the spatial gradient of a reference picture is equal to zero. A motion vector of each block obtained from, for example, a merge list is corrected pixel by pixel based on a combination of the optical flow equation and Hermite interpolation.

Note that a motion vector may be derived on the decoder side using a method other than deriving a motion vector based on a model assuming uniform linear motion. For example, a motion vector may be derived for each sub-block based on motion vectors of neighboring blocks.

Here, a mode in which a motion vector is derived for each sub-block based on motion vectors of neighboring blocks will be described. This mode is also referred to as affine motion compensation prediction mode.

Figure 9A:
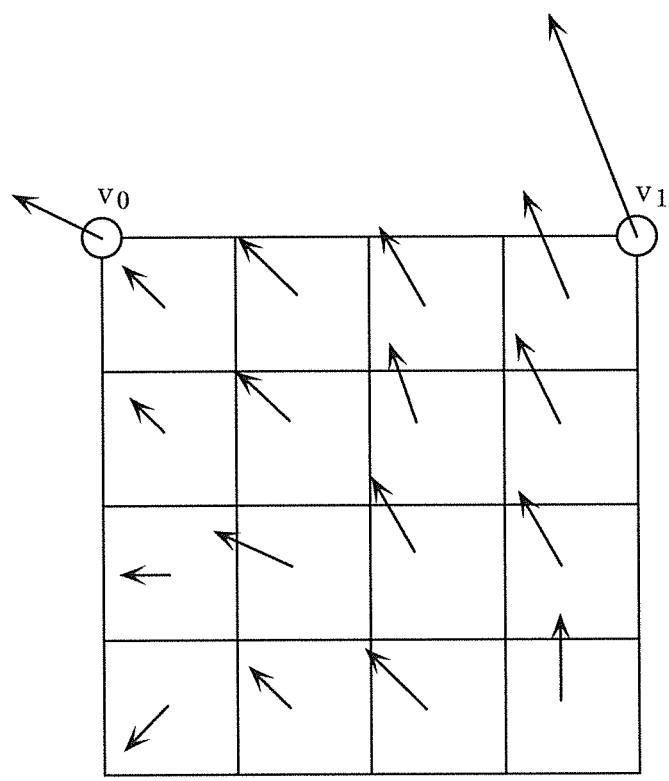
FIG. 9A is for illustrating deriving a motion vector of each sub-block based on motion vectors of neighboring blocks.

FIG. 9A is for illustrating deriving a motion vector of each sub-block based on motion vectors of neighboring blocks. In FIG. 9A, the current block includes 16 4×4 sub-blocks. Here, motion vector $v_0$ of the top left corner control point in the current block is derived based on motion vectors of neighboring sub-blocks, and motion vector $v_1$ of the top right corner control point in the current block is derived based on motion vectors of neighboring blocks. Then, using the two motion vectors $v_0$ and $v_1$, the motion vector $(v_x, v_y)$ of each sub-block in the current block is derived using Equation 2 below.

MATH. 2

$$\begin{cases} v_x = \dfrac{(v_{1x} - v_{0x})}{w}x - \dfrac{(v_{1y} - v_{0y})}{w}y + v_{0x} \\ v_y = \dfrac{(v_{1y} - v_{0y})}{w}x + \dfrac{(v_{1x} - v_{0x})}{w}y + v_{0y} \end{cases} \qquad (2)$$

Here, x and y are the horizontal and vertical positions of the sub-block, respectively, and w is a predetermined weighted coefficient.

Such an affine motion compensation prediction mode may include a number of modes of different methods of deriving the motion vectors of the top left and top right corner control points. Information indicating such an affine motion compensation prediction mode (referred to as, for example, an affine flag) is signalled at the CU level. Note that the signaling of information indicating the affine motion compensation prediction mode need not be performed at the CU level, and may be performed at another level (for example, at the sequence level, picture level, slice level, tile level, CTU level, or sub-block level).

[Prediction Controller]

Prediction controller 128 selects either the intra prediction signal or the inter prediction signal, and outputs the selected prediction signal to subtractor 104 and adder 116.

Figure 9B:
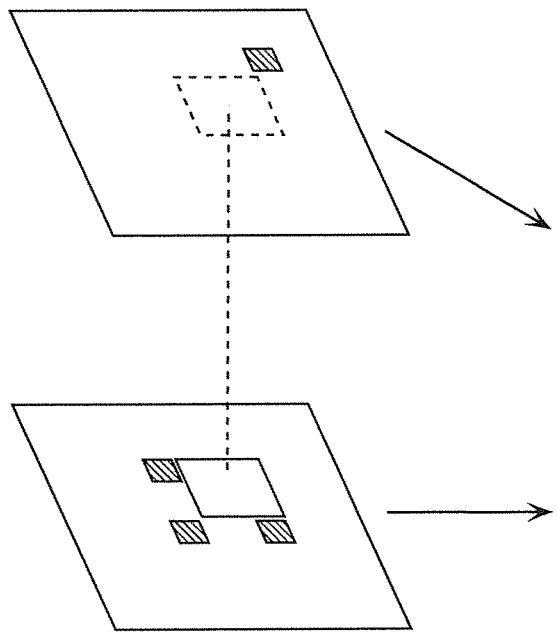
FIG. 9B is for illustrating an outline of a process for deriving a motion vector via merge mode.

Here, an example of deriving a motion vector via merge mode in a current picture will be given. FIG. 9B is for illustrating an outline of a process for deriving a motion vector via merge mode.

First, an MV predictor list in which candidate MV predictors are registered is generated. Examples of candidate MV predictors include: spatially neighboring MV predictors, which are MVs of encoded blocks positioned in the spatial vicinity of the current block; a temporally neighboring MV predictor, which is an MV of a block in an encoded reference picture that neighbors a block in the same location as the current block; a combined MV predictor, which is an MV generated by combining the MV values of the spatially neighboring MV predictor and the temporally neighboring MV predictor; and a zero MV predictor, which is an MV whose value is zero.

Next, the MV of the current block is determined by selecting one MV predictor from among the plurality of MV predictors registered in the MV predictor list.

Furthermore, in the variable-length encoder, a merge_idx, which is a signal indicating which MV predictor is selected, is written and encoded into the stream.

Note that the MV predictors registered in the MV predictor list illustrated in FIG. 9B constitute one example. The number of MV predictors registered in the MV predictor list may be different from the number illustrated in FIG. 9B, the MV predictors registered in the MV predictor list may omit one or more of the types of MV predictors given in the example in FIG. 9B, and the MV predictors registered in the MV predictor list may include one or more types of MV predictors in addition to and different from the types given in the example in FIG. 9B.

Note that the final MV may be determined by performing DMVR processing (to be described later) by using the MV of the current block derived via merge mode.

Here, an example of determining an MV by using DMVR processing will be given.

Figure 9C:
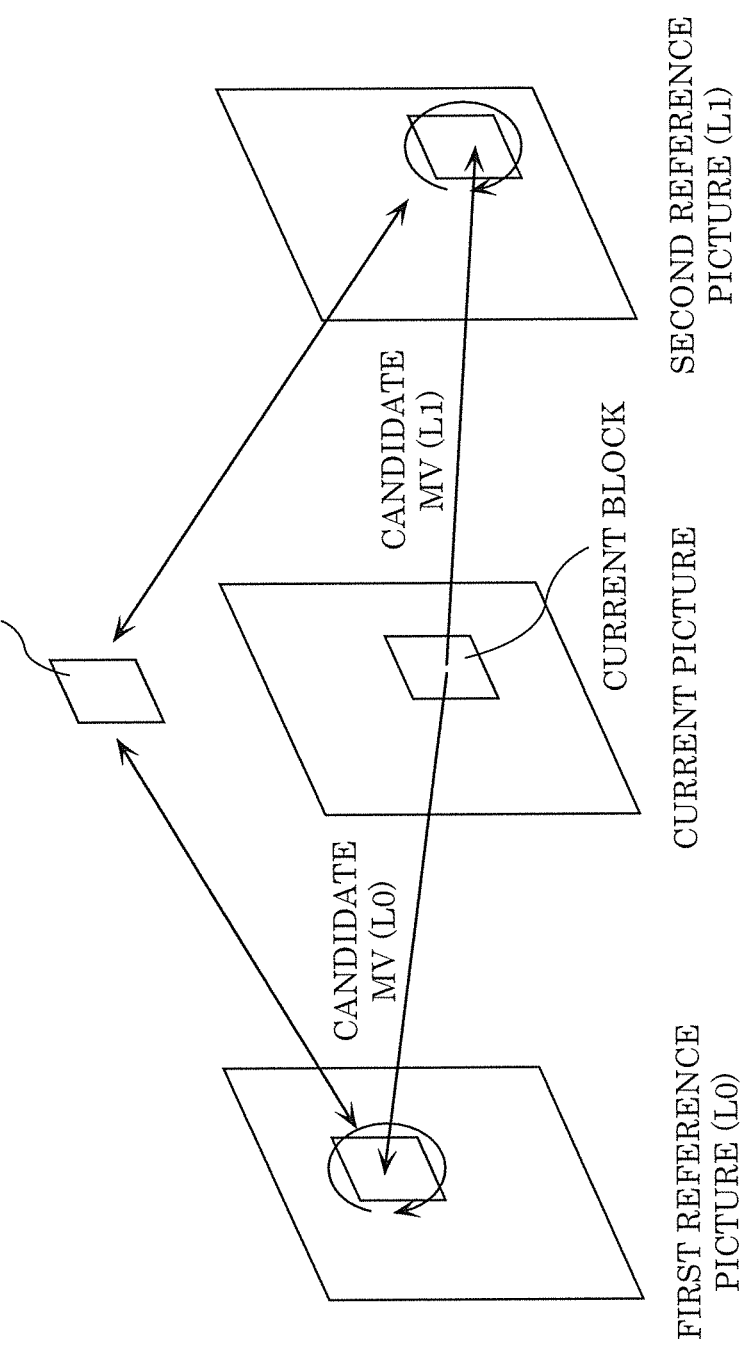
FIG. 9C is a conceptual diagram for illustrating an outline of DMVR processing.

FIG. 9C is a conceptual diagram for illustrating an outline of DMVR processing.

First, the most appropriate MVP set for the current block is considered to be the candidate MV, reference pixels are obtained from a first reference picture, which is a picture processed in the L0 direction in accordance with the candidate MV, and a second reference picture, which is a picture processed in the L1 direction in accordance with the candidate MV, and a template is generated by calculating the average of the reference pixels.

Next, using the template, the surrounding regions of the candidate MVs of the first and second reference pictures are searched, and the MV with the lowest cost is determined to be the final MV. Note that the cost value is calculated using, for example, the difference between each pixel value in the template and each pixel value in the regions searched, as well as the MV value.

Note that the outlines of the processes described here are fundamentally the same in both the encoder and the decoder.

Note that processing other than the processing exactly as described above may be used, so long as the processing is capable of deriving the final MV by searching the surroundings of the candidate MV.

Here, an example of a mode that generates a prediction image by using LIC processing will be given.

Figure 9D:
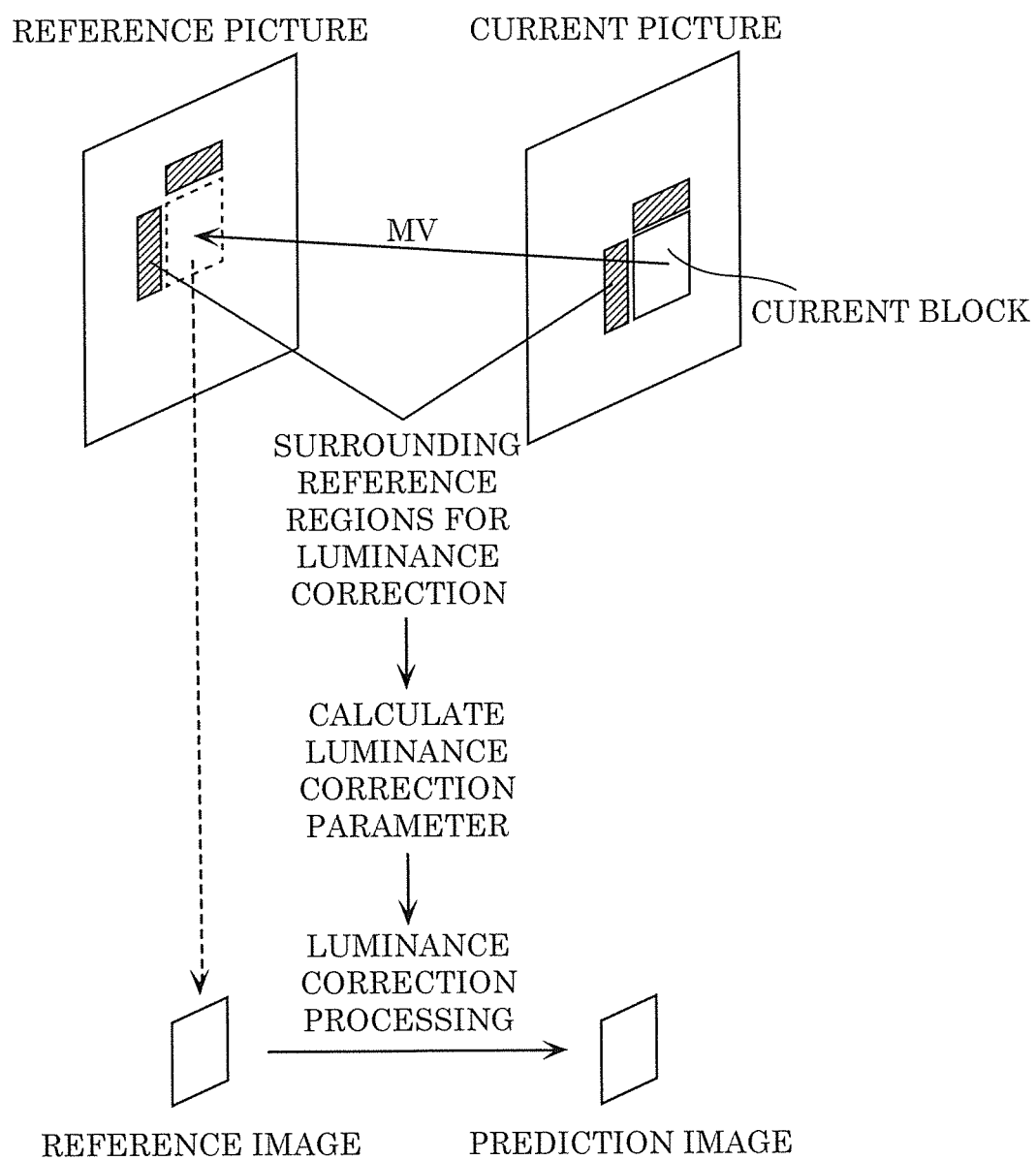
FIG. 9D is for illustrating an outline of a prediction image generation method using a luminance correction process performed via LIC processing.

FIG. 9D is for illustrating an outline of a prediction image generation method using a luminance correction process performed via LIC processing.

First, an MV is extracted for obtaining, from an encoded reference picture, a reference image corresponding to the current block.

Next, information indicating how the luminance value changed between the reference picture and the current picture is extracted and a luminance correction parameter is calculated by using the luminance pixel values for the encoded left neighboring reference region and the encoded upper neighboring reference region, and the luminance pixel value in the same location in the reference picture specified by the MV.

The prediction image for the current block is generated by performing a luminance correction process by using the luminance correction parameter on the reference image in the reference picture specified by the MV.

Note that the shape of the surrounding reference region illustrated in FIG. 9D is just one example; the surrounding reference region may have a different shape.

Moreover, although a prediction image is generated from a single reference picture in this example, in cases in which a prediction image is generated from a plurality of reference pictures as well, the prediction image is generated after performing a luminance correction process, via the same method, on the reference images obtained from the reference pictures.

One example of a method for determining whether to implement LIC processing is by using an lic_flag, which is a signal that indicates whether to implement LIC processing. As one specific example, the encoder determines whether the current block belongs to a region of luminance change. The encoder sets the lic_flag to a value of "1" when the block belongs to a region of luminance change and implements LIC processing when encoding, and sets the lic_flag to a value of "0" when the block does not belong to a region of luminance change and encodes without implementing LIC processing. The decoder switches between implementing LIC processing or not by decoding the lic_flag written in the stream and performing the decoding in accordance with the flag value.

One example of a different method of determining whether to implement LIC processing is determining so in accordance with whether LIC processing was determined to be implemented for a surrounding block. In one specific example, when merge mode is used on the current block, whether LIC processing was applied in the encoding of the surrounding encoded block selected upon deriving the MV in the merge mode processing may be determined, and whether to implement LIC processing or not can be switched based on the result of the determination. Note that in this example, the same applies to the processing performed on the decoder side.

[Decoder Outline]

Next, a decoder capable of decoding an encoded signal (encoded bitstream) output from encoder 100 will be described. FIG. 10 is a block diagram illustrating a functional configuration of decoder 200 according to Embodiment 1. Decoder 200 is a moving picture/picture decoder that decodes a moving picture/picture block by block.

As illustrated in FIG. 10, decoder 200 includes entropy decoder 202, inverse quantizer 204, inverse transformer 206, adder 208, block memory 210, loop filter 212, frame memory 214, intra predictor 216, inter predictor 218, and prediction controller 220.

Decoder 200 is realized as, for example, a generic processor and memory. In this case, when a software program stored in the memory is executed by the processor, the processor functions as entropy decoder 202, inverse quantizer 204, inverse transformer 206, adder 208, loop filter 212, intra predictor 216, inter predictor 218, and prediction controller 220. Alternatively, decoder 200 may be realized as one or more dedicated electronic circuits corresponding to entropy decoder 202, inverse quantizer 204, inverse transformer 206, adder 208, loop filter 212, intra predictor 216, inter predictor 218, and prediction controller 220.

Hereinafter, each component included in decoder 200 will be described.

[Entropy Decoder]

Entropy decoder 202 entropy decodes an encoded bitstream. More specifically, for example, entropy decoder 202 arithmetic decodes an encoded bitstream into a binary signal. Entropy decoder 202 then debinarizes the binary signal. With this, entropy decoder 202 outputs quantized coefficients of each block to inverse quantizer 204.

[Inverse Quantizer]

Inverse quantizer 204 inverse quantizes quantized coefficients of a block to be decoded (hereinafter referred to as a current block), which are inputs from entropy decoder 202. More specifically, inverse quantizer 204 inverse quantizes quantized coefficients of the current block based on quantization parameters corresponding to the quantized coefficients. Inverse quantizer 204 then outputs the inverse quantized coefficients (i.e., transform coefficients) of the current block to inverse transformer 206.

[Inverse Transformer]

Inverse transformer 206 restores prediction errors by inverse transforming transform coefficients, which are inputs from inverse quantizer 204.

For example, when information parsed from an encoded bitstream indicates application of EMT or AMT (for example, when the AMT flag is set to true), inverse transformer 206 inverse transforms the transform coefficients of the current block based on information indicating the parsed transform type.

Moreover, for example, when information parsed from an encoded bitstream indicates application of NSST, inverse transformer 206 applies a secondary inverse transform to the transform coefficients.

[Adder]

Adder 208 reconstructs the current block by summing prediction errors, which are inputs from inverse transformer 206, and prediction samples, which is an input from prediction controller 220. Adder 208 then outputs the reconstructed block to block memory 210 and loop filter 212.

[Block Memory]

Block memory 210 is storage for storing blocks in a picture to be decoded (hereinafter referred to as a current picture) for reference in intra prediction. More specifically, block memory 210 stores reconstructed blocks output from adder 208.

[Loop Filter]

Loop filter 212 applies a loop filter to blocks reconstructed by adder 208, and outputs the filtered reconstructed blocks to frame memory 214 and, for example, a display device.

When information indicating the enabling or disabling of ALF parsed from an encoded bitstream indicates enabled, one filter from among a plurality of filters is selected based on direction and activity of local gradients, and the selected filter is applied to the reconstructed block.

[Frame Memory]

Frame memory 214 is storage for storing reference pictures used in inter prediction, and is also referred to as a frame buffer. More specifically, frame memory 214 stores reconstructed blocks filtered by loop filter 212.

[Intra Predictor]

Intra predictor 216 generates a prediction signal (intra prediction signal) by intra prediction with reference to a block or blocks in the current picture and stored in block memory 210. More specifically, intra predictor 216 generates an intra prediction signal by intra prediction with reference to samples (for example, luma and/or chroma values) of a block or blocks neighboring the current block, and then outputs the intra prediction signal to prediction controller 220.

Note that when an intra prediction mode in which a chroma block is intra predicted from a luma block is selected, intra predictor 216 may predict the chroma component of the current block based on the luma component of the current block.

Moreover, when information indicating the application of PDPC is parsed from an encoded bitstream, intra predictor 216 corrects post-intra-prediction pixel values based on horizontal/vertical reference pixel gradients.

[Inter Predictor]

Inter predictor 218 predicts the current block with reference to a reference picture stored in frame memory 214. Inter prediction is performed per current block or per sub-block (for example, per 4×4 block) in the current block. For example, inter predictor 218 generates an inter prediction signal of the current block or sub-block by motion compensation by using motion information (for example, a motion vector) parsed from an encoded bitstream, and outputs the inter prediction signal to prediction controller 220.

Note that when the information parsed from the encoded bitstream indicates application of OBMC mode, inter predictor 218 generates the inter prediction signal using motion information for a neighboring block in addition to motion information for the current block obtained from motion estimation.

Moreover, when the information parsed from the encoded bitstream indicates application of FRUC mode, inter predictor 218 derives motion information by performing motion estimation in accordance with the pattern matching method (bilateral matching or template matching) parsed from the encoded bitstream. Inter predictor 218 then performs motion compensation using the derived motion information.

Moreover, when BIO mode is to be applied, inter predictor 218 derives a motion vector based on a model assuming uniform linear motion. Moreover, when the information parsed from the encoded bitstream indicates that affine motion compensation prediction mode is to be applied, inter predictor 218 derives a motion vector of each sub-block based on motion vectors of neighboring blocks.

[Prediction Controller]

Prediction controller 220 selects either the intra prediction signal or the inter prediction signal, and outputs the selected prediction signal to adder 208.

SPECIFIC EXAMPLES

Figure 11:
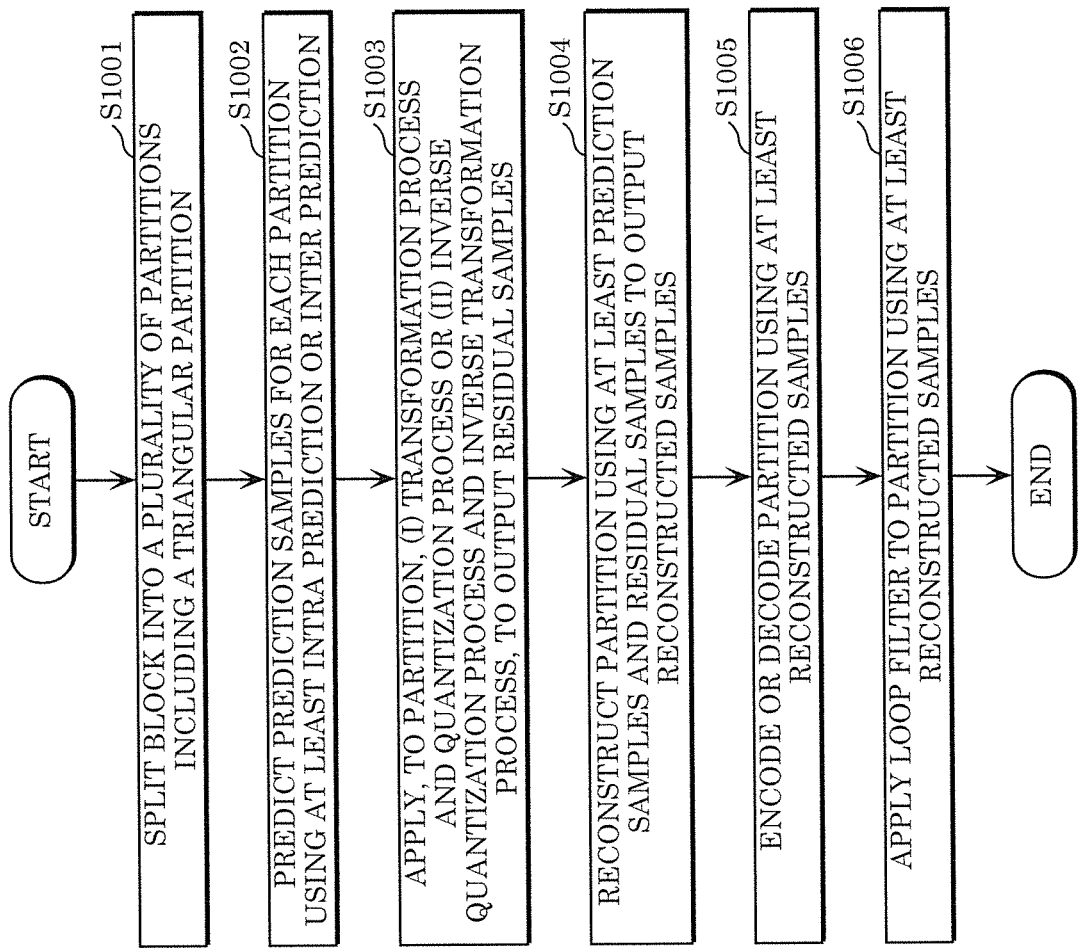
FIG. 11 is a diagram indicating an encoding method and an encoding procedure performed by an image encoder according to the present disclosure.

FIG. 11 is a diagram indicating an encoding method and an encoding procedure performed by an encoder according to the present disclosure.

The decoding method and the decoding procedure performed by decoder 200 are the same as the encoding method and the encoding procedure performed by encoder 100.

First, encoder 100 splits a block in a current picture into a plurality of partitions including a triangular partition (Step S1001).

Next, encoder 100 predicts prediction samples for the partition using intra prediction or inter prediction (Step S1002).

Encoder 100 then applies, to the partition, either (i) a transformation process and a quantization process or (ii) an inverse quantization process and an inverse transformation process, to output residual samples (Step S1003).

Encoder 100 then reconstructs a partition by using at least the prediction samples and residual samples in order to output reconstructed samples (Step S1004).

Next, encoder 100 encodes the partition using the reconstructed samples (Step S1005).

Next, encoder 100 applies a loop filter to the partition using the reconstructed samples (Step S1006). Encoder 100 performs the loop filtering in order for the partition for which the reconstructed samples are to be used.

Figure 12:
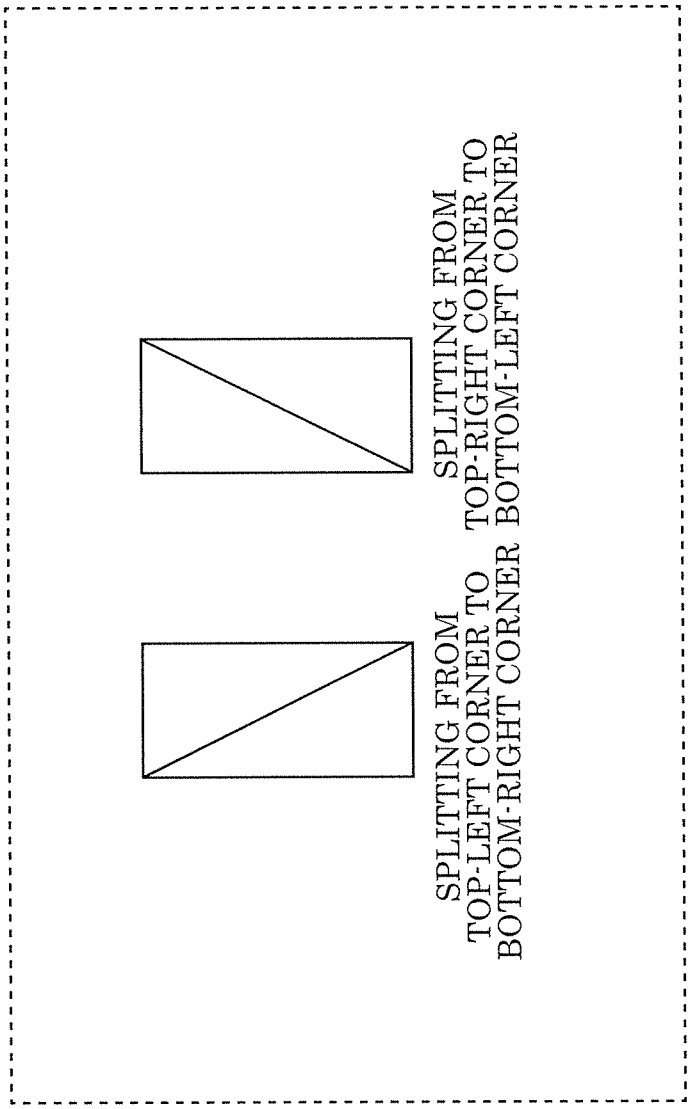
FIG. 12 is a diagram indicating examples in each of which a block is split diagonally.

FIG. 12 is a diagram indicating examples in each of which a block is split diagonally. For example, as illustrated in FIG. 12, blocks are split into two triangular partitions. One of the blocks is split from the top-left corner to the bottom-right corner of the block, and the other block is split from the top-right corner to the bottom-left corner of the block.

Figure 13:
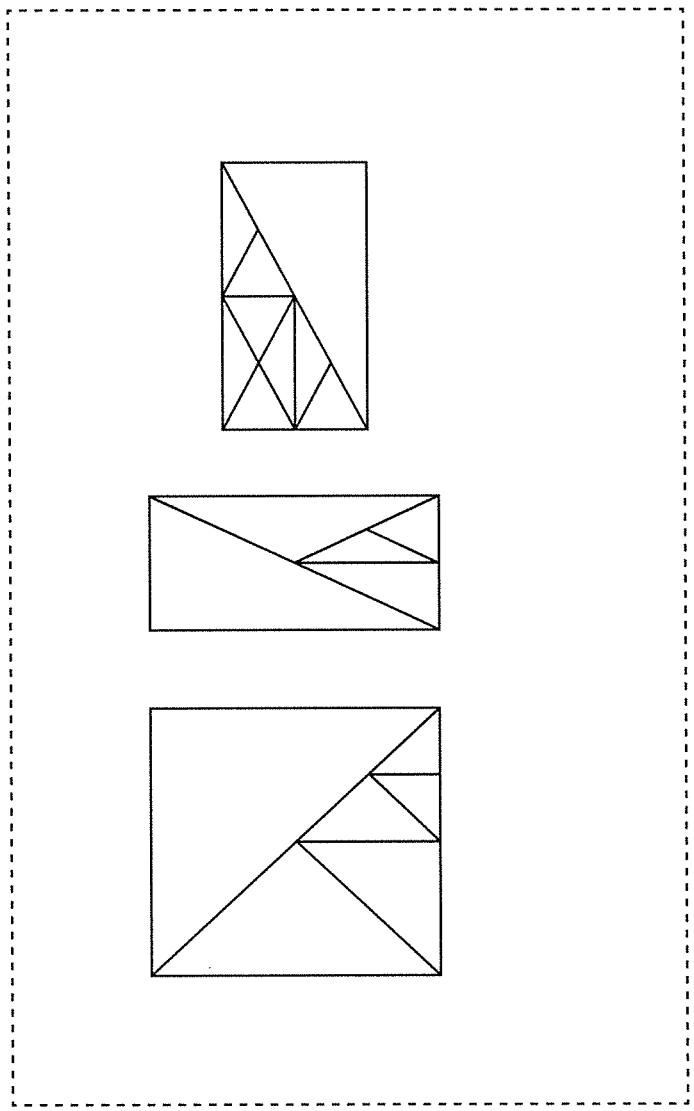
FIG. 13 is a diagram indicating examples in each of which a block is split into a plurality of triangular partitions.

FIG. 13 is a diagram indicating examples in each of which a block is split into a plurality of triangular partitions. As illustrated in FIG. 13, one example in which a block is split is that a block is split into a plurality of triangular partitions. For example, the number of specimen samples of each of the triangular partitions may be a multiple of 16.

Figure 14:
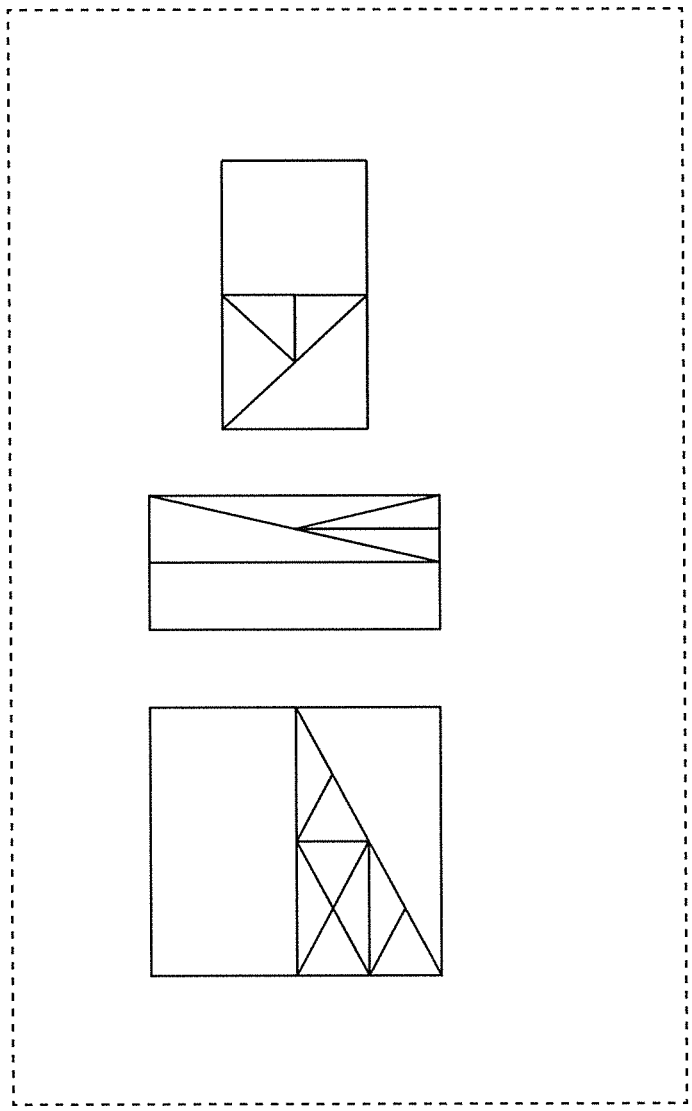
FIG. 14 is a diagram indicating examples in each of which a block is split into a plurality of partitions including at least one triangular partition and a rectangular partition.

FIG. 14 is a diagram indicating examples in each of which a block is split into a plurality of partitions including at least one triangular partition and a rectangular partition. As illustrated in FIG. 14, when a block is split, a block is split into a plurality of partitions including at least one triangular partition and a rectangular partition.

Figure 15:
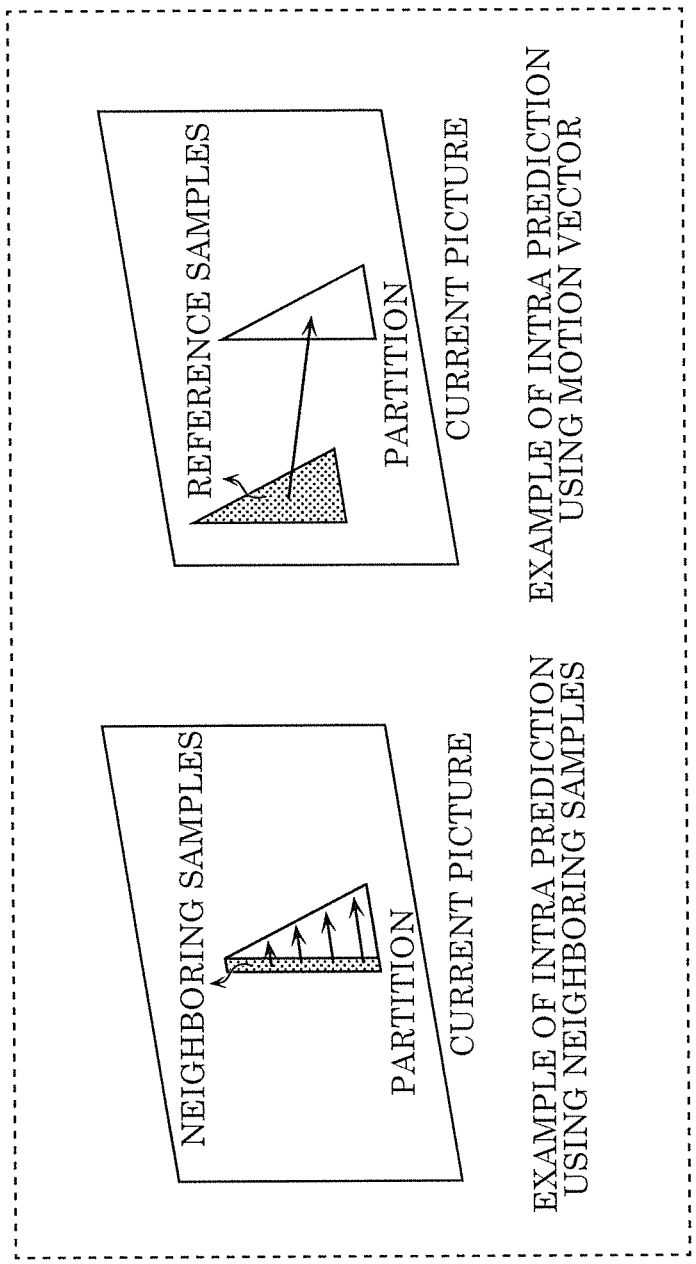
FIG. 15 is a diagram indicating an example of intra prediction using neighboring samples and an example of intra prediction using a motion vector.

FIG. 15 is a diagram indicating an example of intra prediction using neighboring samples and an example of intra prediction using a motion vector. As illustrated in FIG. 15, for example, encoder 100 predicts a plurality of samples through intra prediction using the neighboring samples for a target partition. In the other example, encoder 100 predicts a plurality of samples by using intra prediction and a motion vector from a current picture.

Figure 16:
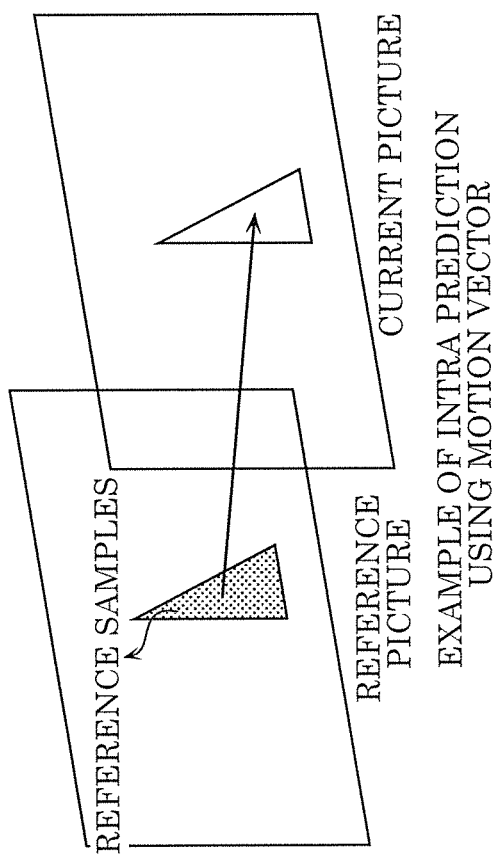
FIG. 16 is a diagram indicating an example of inter prediction using a motion vector.

FIG. 16 is a diagram indicating an example of inter prediction using a motion vector. As illustrated in FIG. 16, encoder 100 predicts a plurality of samples by using a motion vector from a picture different from a current picture in inter prediction.

Figure 17:
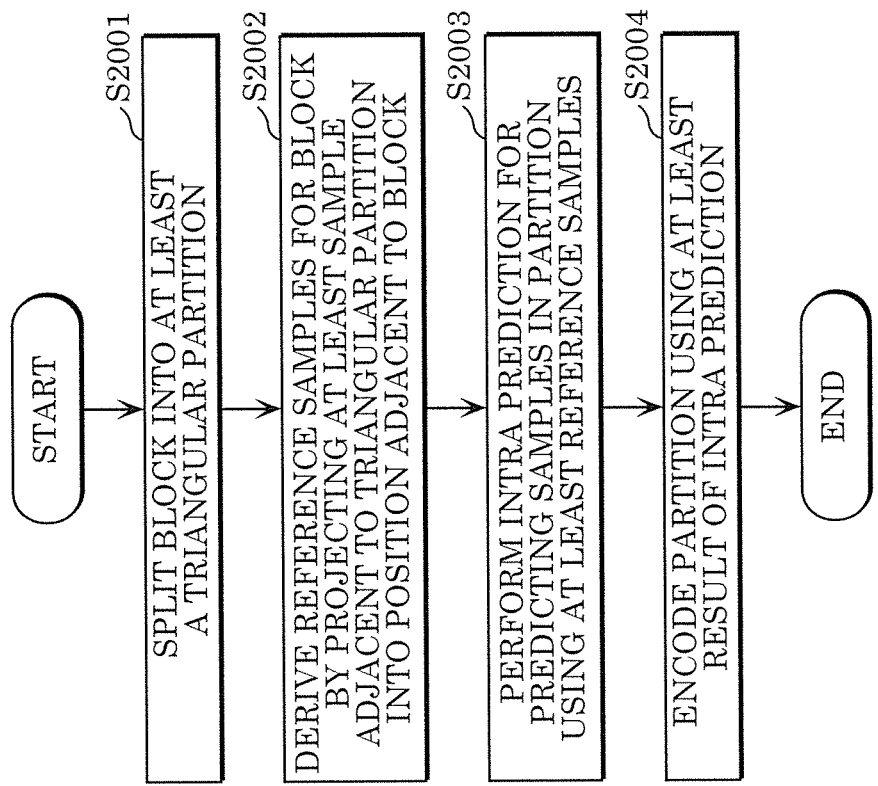
FIG. 17 is a diagram indicating an encoding method and an encoding procedure performed by an encoder in intra prediction.

FIG. 17 is a diagram indicating an encoding method and an encoding procedure performed by an encoder in intra prediction. The decoding method and the decoding procedure performed by decoder 200 are the same as the encoding method and the encoding procedure performed by encoder 100.

First, encoder 100 splits a block, etc. into at least one triangular partition (Step S2001).

Encoder 100 then derives reference samples for the block by projecting neighboring samples adjacent to the triangular partition at positions adjacent to the block (Step S2002).

Encoder 100 then performs intra prediction for predicting samples for the partition, using the reference samples (Step S2003).

Encoder 100 then encodes the partition using at least the result of intra prediction (Step S2004).

Figure 18:
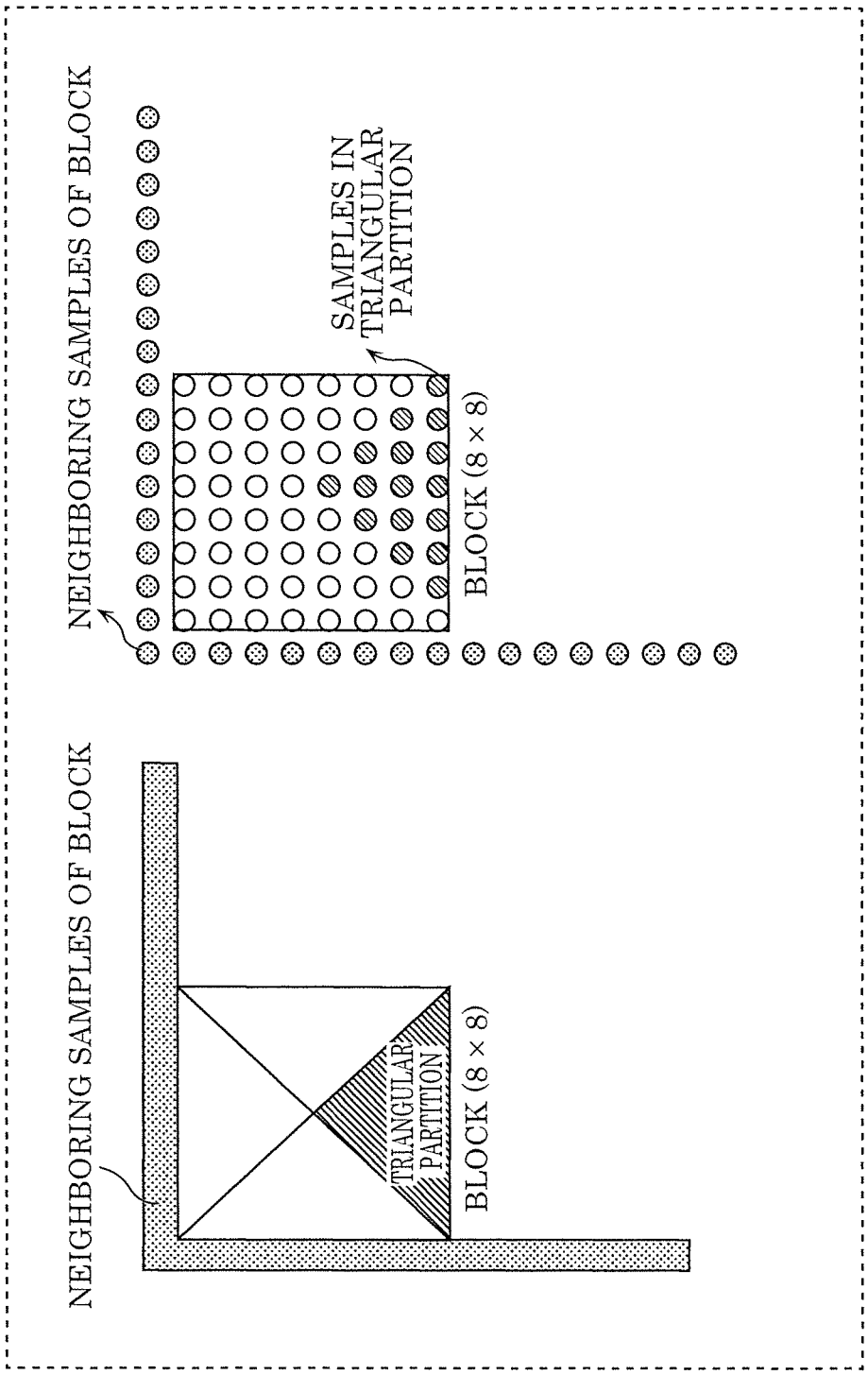
FIG. 18 is a diagram indicating examples of deriving reference samples.

FIG. 18 is a diagram indicating examples of deriving reference samples. The reference samples for the block are derived from a plurality of samples adjacent to the left or above the block by encoder 100. The derivation procedure is the same as the procedure used in a block which is encoded in DC mode, planar mode, or angular mode.

Figure 19:
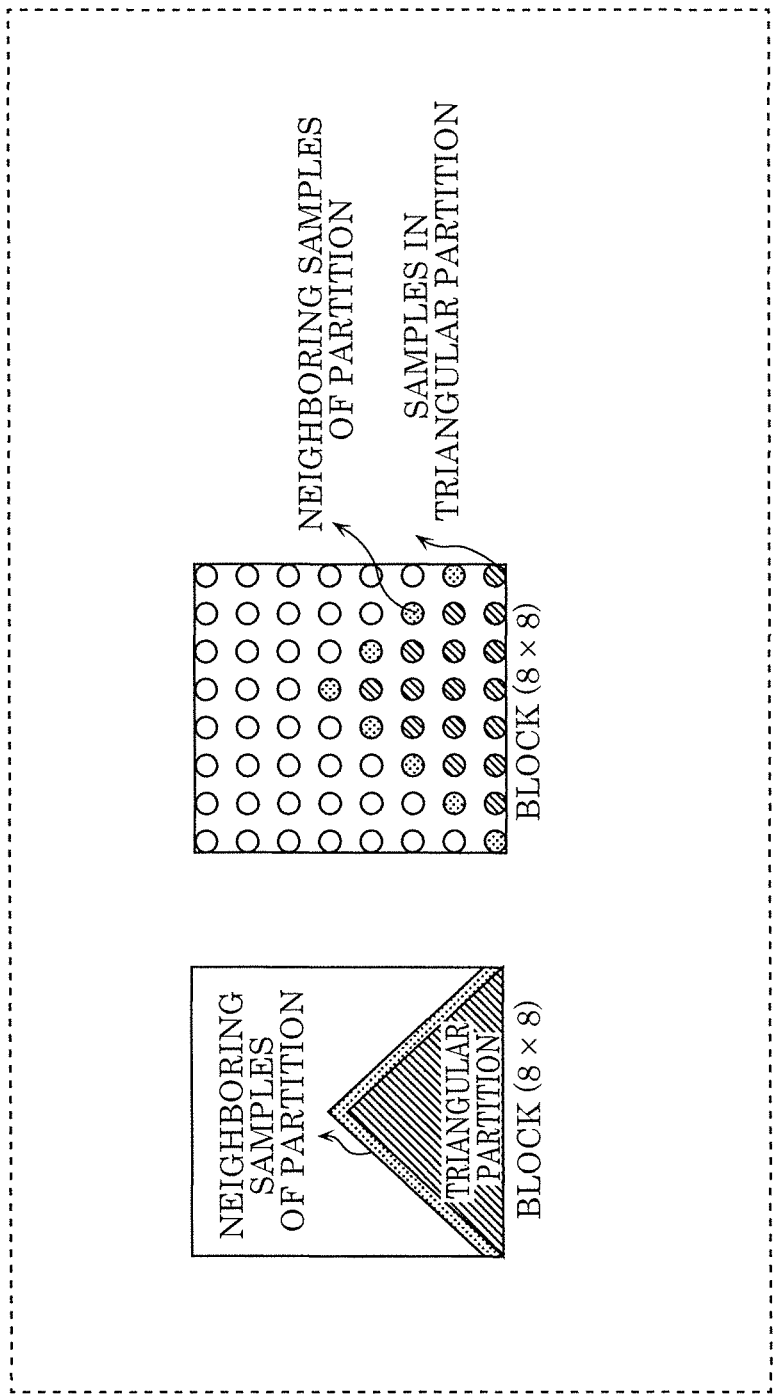
FIG. 19 is a diagram indicating an example of reference samples derived, for a block, from neighboring samples adjacent to a partition.

FIG. 19 is a diagram indicating an example of reference samples derived, for a block, from neighboring samples adjacent to a partition. The reference samples for the block are derived from the neighboring samples adjacent to the partition and the neighboring samples adjacent to the block. The reference samples are samples in which one or more reference samples are projected from neighboring samples.

Figure 20:
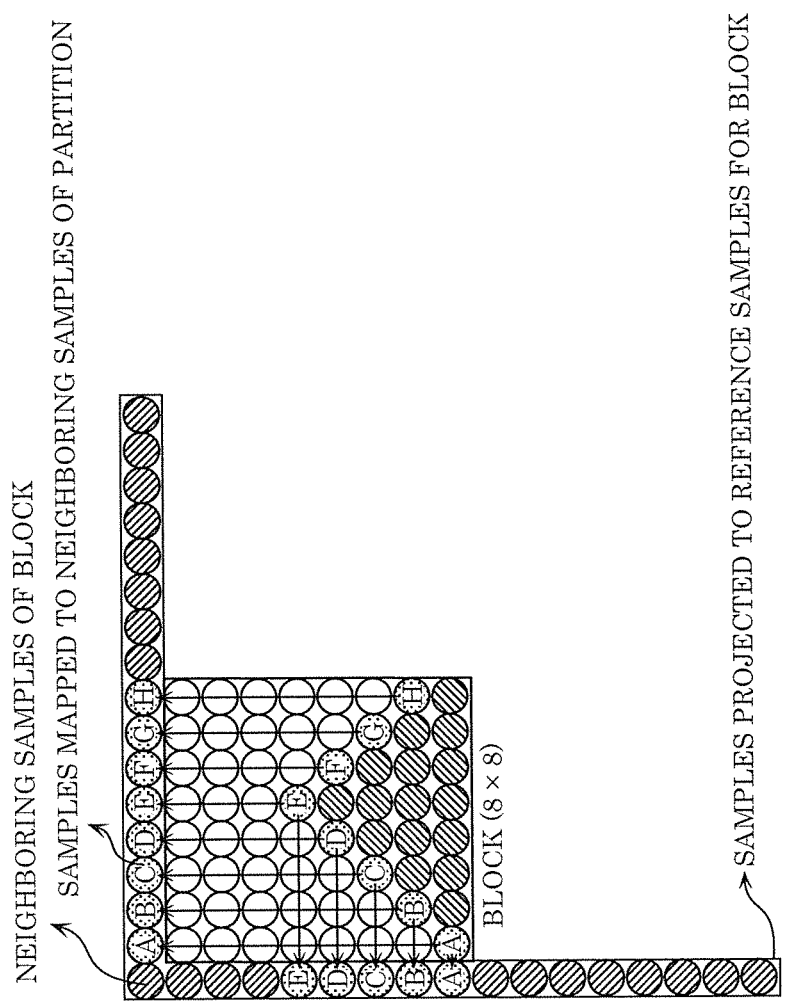
FIG. 20 is a diagram indicating an example of a method for projecting reference samples for a block, from neighboring samples adjacent to a partition.

FIG. 20 is a diagram indicating an example of a method for projecting reference samples for a block, from neighboring samples adjacent to a partition. Each of the neighboring samples adjacent to the partition is first mapped to a neighboring sample of the block by encoder 100, based on the position of the neighboring sample of the partition. The reference sample is derived from mapped samples by encoder 100.

Figure 21A:
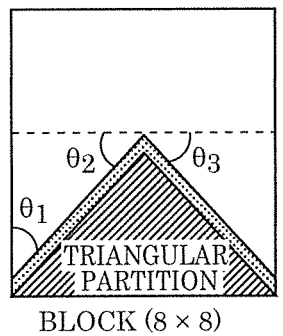
FIG. 21A is a diagram indicating examples of angles in the method for projecting reference samples for a block, from samples in a neighboring partition.
Figure 21B:
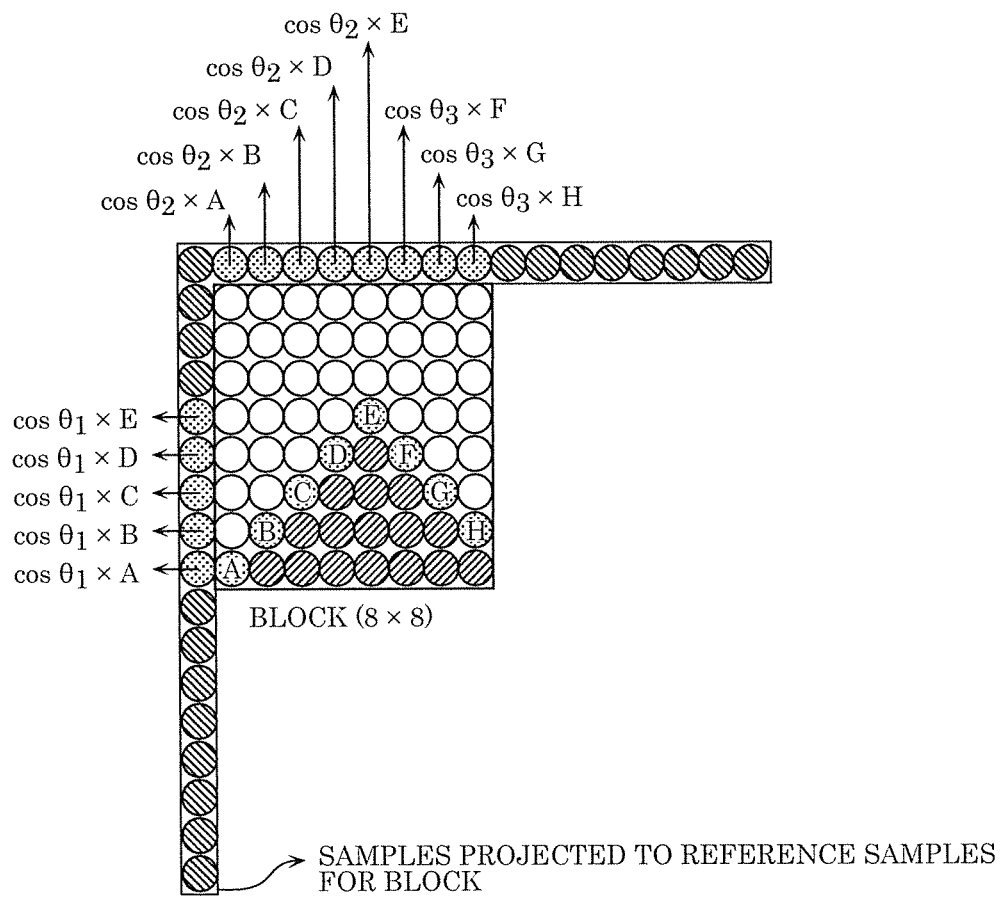
FIG. 21B is a diagram indicating an example of a method for projecting reference samples for a block, from samples in a neighboring partition.

FIG. 21A is a diagram indicating examples of angles in the method for projecting reference samples for a block, from samples in a neighboring partition. FIG. 21B is a diagram indicating an example of a method for projecting reference samples for a block, from samples in a neighboring partition. Each of the neighboring samples adjacent to the partition is first mapped to a neighboring sample of the block by encoder 100, based on a formula. The formula may be a cosine function, sine function, trigonometric function, or a polynomial function. The reference sample is derived from mapped samples by encoder 100.

Figure 22A:
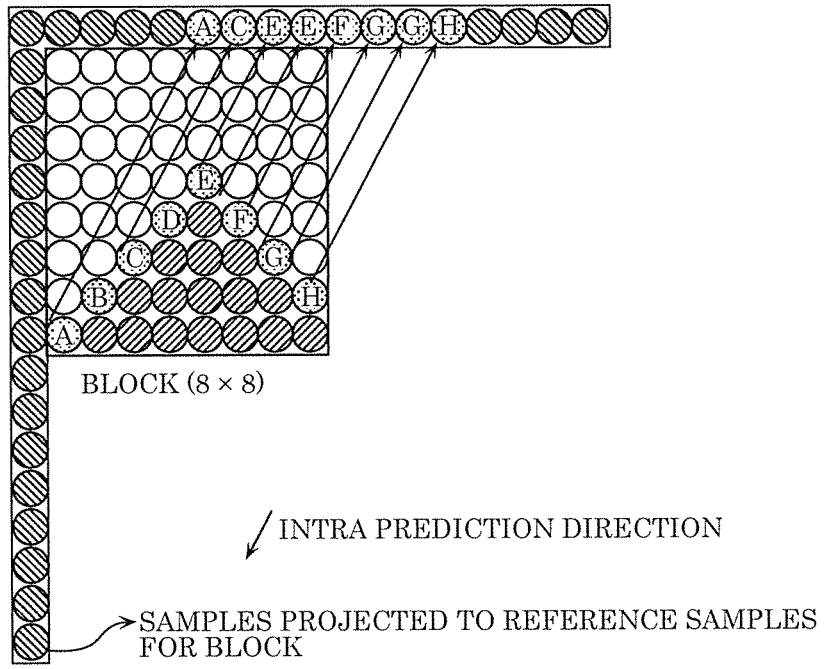
FIG. 22A is a diagram indicating an example (intra prediction from top right to bottom left) of a method for projecting reference samples for a block, from samples in a neighboring partition.
Figure 22B:
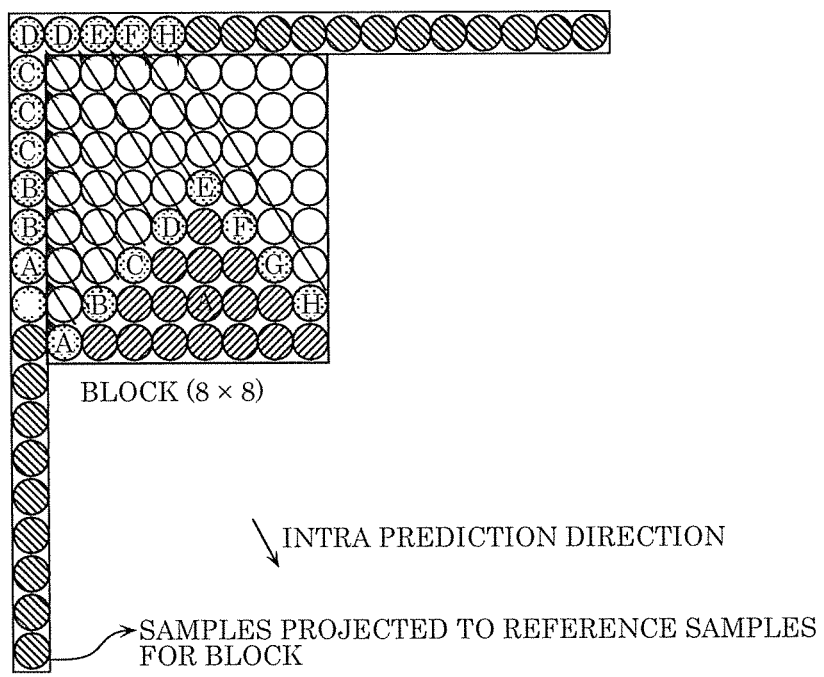
FIG. 22B is a diagram indicating an example (intra prediction from top left to bottom right) of a method for projecting reference samples for a block, from samples in a neighboring partition.

FIG. 22A is a diagram indicating an example (intra prediction from top right to bottom left) of a method for projecting reference samples for a block, from samples in a neighboring partition. FIG. 22B is a diagram indicating an example (intra prediction from top left to bottom right) of a method for projecting reference samples for a block, from samples in a neighboring partition. Each of the samples in the neighboring partitions is first mapped to a sample of a neighboring block, in the direction determined based on the sample of the partition to be predicted using the intra prediction direction and the inter prediction direction. The reference sample is then derived from the mapped sample.

Figure 23:
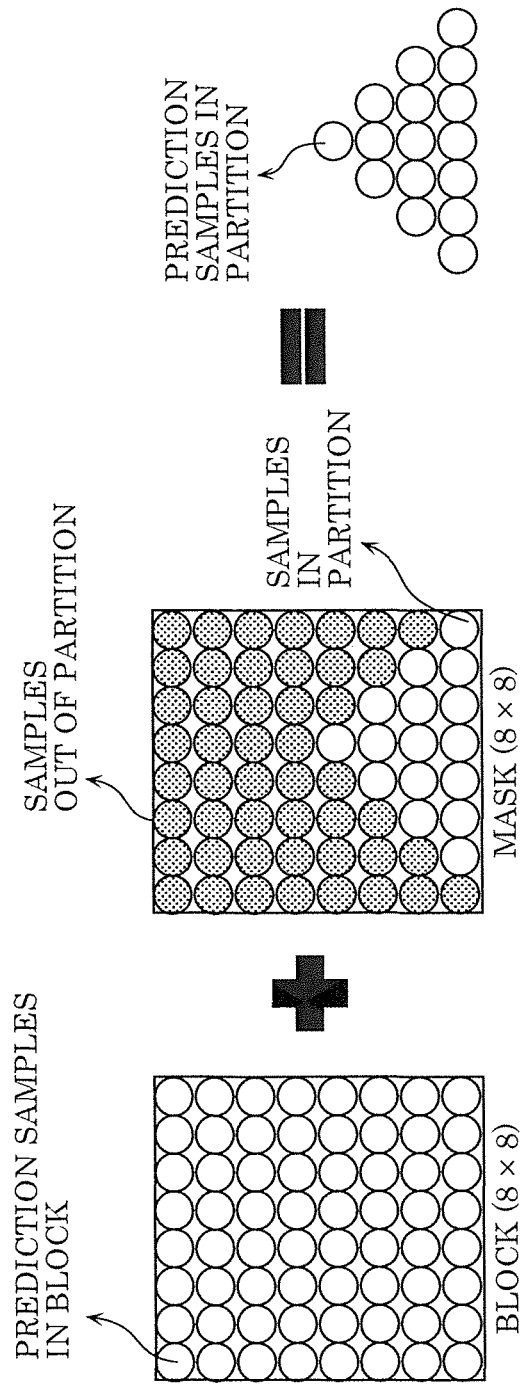
FIG. 23 is a diagram indicating sample prediction in a target partition performed by the encoder.

FIG. 23 is a diagram indicating sample prediction in a target partition performed by the encoder. As illustrated in FIG. 23, for example, the sample prediction in the partition by encoder 100 may include the sample prediction in the block and a mask indicating, for the block, whether a prediction sample is present in the partition.

As an example, only the sample in a target partition may be predicted by encoder 100. The prediction of the samples located at the respective positions in the target partition may be the same as in the intra prediction for predicting the co-located samples with the samples located at the respective positions in the target partition.

Figure 24:
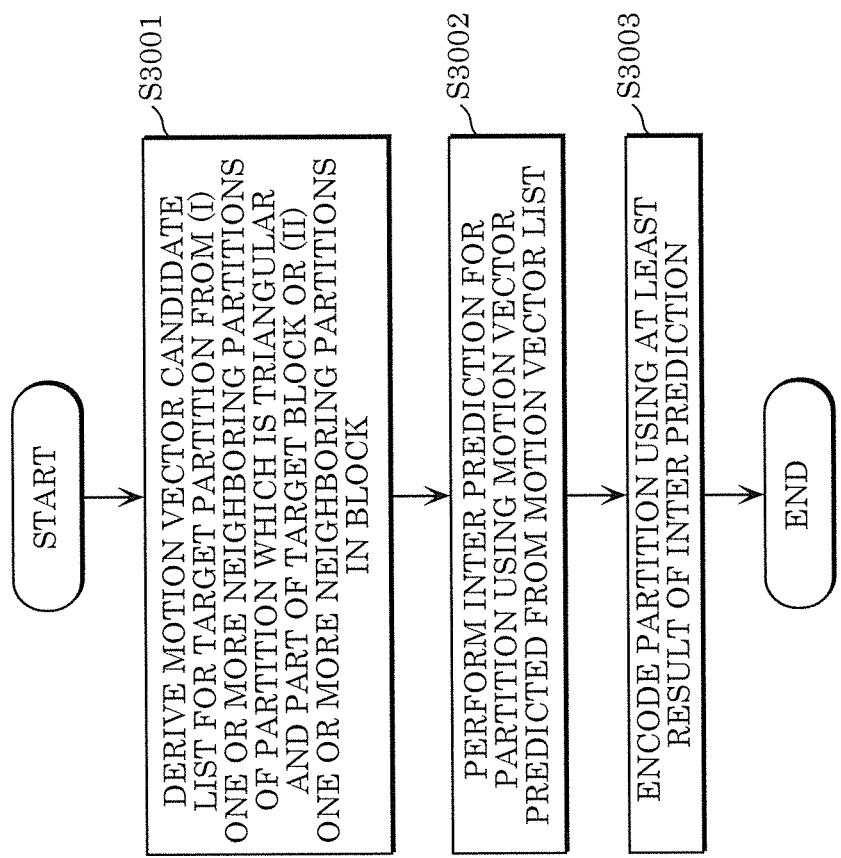
FIG. 24 is a diagram indicating an encoding method and an encoding procedure performed by the encoder according to inter prediction.

FIG. 24 is a diagram indicating an encoding method and an encoding procedure performed by the encoder according to inter prediction. The decoding method and the decoding procedure performed by decoder 200 are the same as the encoding method and the encoding procedure performed by encoder 100.

Encoder 100 derives a motion vector predictor candidate list for a target partition, from (i) one or more neighboring partitions of a partition which is triangular and part of a target block or (ii) one or more neighboring partitions in the block (Step S3001). A neighboring partition is either a spatially neighboring partition or a temporally neighboring partition. The procedure for deriving the motion vector candidate list may be the same as the procedure used in the block encoded in skip mode, merge mode, or inter mode.

Encoder 100 performs inter prediction for prediction of a partition having a motion vector predicted from the motion vector candidate list (Step S3002). The inter prediction may include prediction of samples for a target block and application of a mask indicating whether samples are present in the target partition to the target block. The inter prediction which is performed on the target partition may be the same as the inter prediction performed in the block encoded in skip mode, merge mode, or inter mode.

Encoder 100 encodes the target partition using the result of the inter prediction (Step S3003). In Step S3003, (i) a transformation process and a quantization process or (ii) inverse transformation process and an inverse quantization process may be applied, to output residual samples.

Figure 25:
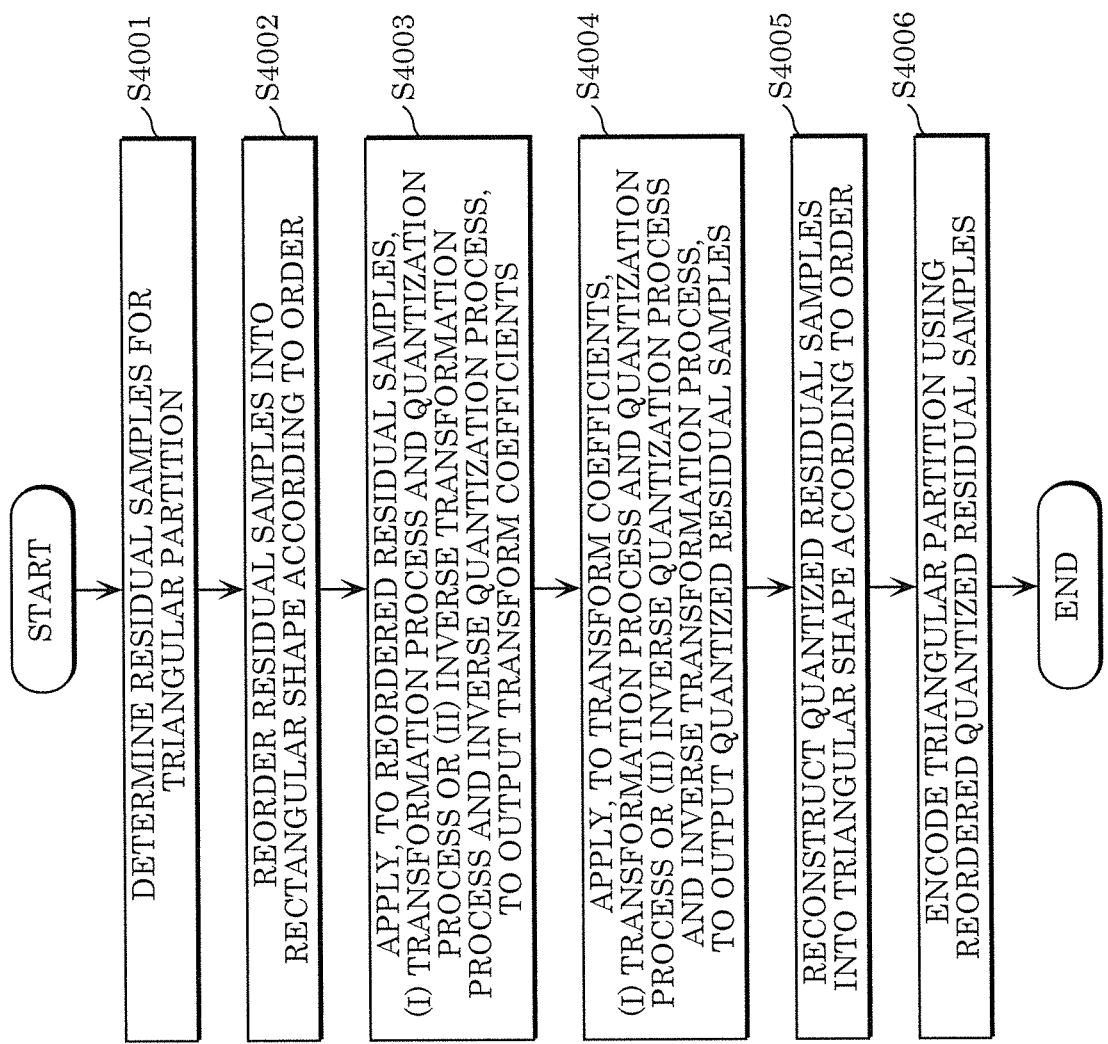
FIG. 25 is a diagram indicating examples of an encoding method and an encoding procedure performed by the encoder, according to a transformation process and a quantization process for a triangular partition.

FIG. 25 is a diagram indicating examples of an encoding method and an encoding procedure performed by the encoder, according to a transformation process and a quantization process for a triangular partition.

Encoder 100 may determine residual samples for a triangular partition (Step S4001). Each residual sample for the triangular partition may be calculated by subtracting an initial value of the sample from the sample predicted in Step S1002.

Next, encoder 100 reorders the residual samples in a rectangular shape according to an order (Step S4002).

Encoder 100 then applies, to the reordered residual samples, (i) a transformation process and a quantization process, or (ii) inverse transformation process and an inverse quantization process, to output transform coefficients (Step S4003). The rectangular transformation process and the quantization process may be the same as the transformation process and the quantization process applied to the block. The rectangular transformation process may include: an Explicit Multiple core Transform (EMT) process, an Adaptive Multiple Transform (AMT) process, an Adaptive Secondary Transform (AST) process, and a Non-separable Secondary Transform (NSST) process. EMT and AMT may be referred to as Multiple Transform Selection (MTS).

Next, encoder 100 applies, to the transform coefficients, (i) a transformation process and a quantization process, or (ii) inverse transformation process and an inverse quantization process, to output quantized residual samples (Step S4004). The inverse quantization process and the rectangular transformation process which are applied to the transform coefficients may be the same as the inverse quantization process and the rectangular transformation process which are applied to the block.

Next, the quantized residual samples are reordered into triangular shape according to the order and reconstructed (Step S4005).

Encoder 100 then encodes the triangular partition using the reordered quantized residual samples (Step S4006).

For example, the residual samples are stored in a triangular shape having the same number of samples as the number of samples in a rectangular shape, prior to reordering into a rectangular shape.

As another example, the residual samples are stored one-dimensionally, prior to reordering into a rectangular shape.

Figure 26:
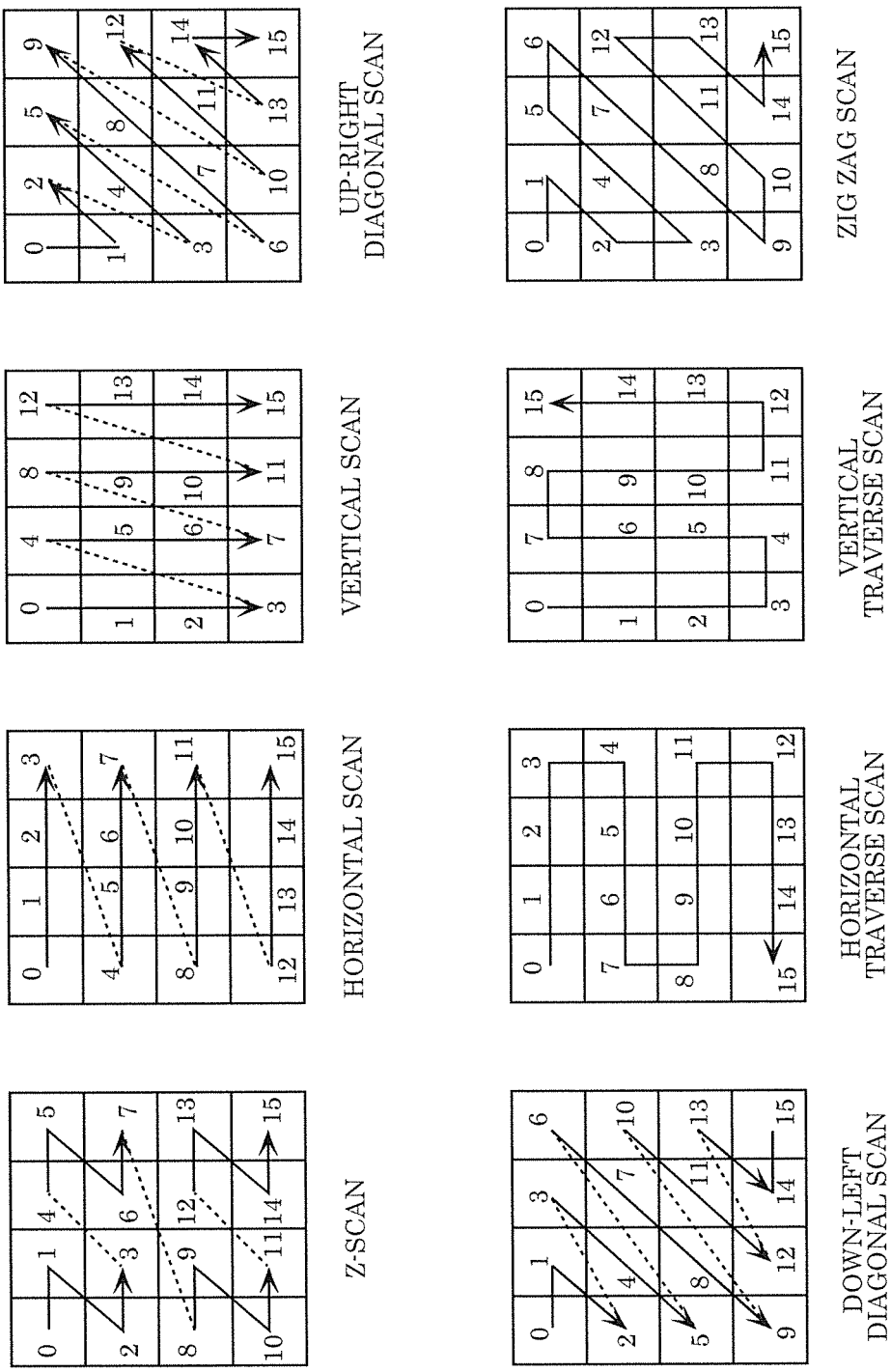
FIG. 26 is a diagram indicating examples of scan orders.

FIG. 26 is a diagram indicating examples of scan orders. The order may be a z-scan order, a horizontal scan order, a vertical scan order, an up-right diagonal scan order, a down-left diagonal scan order, a horizontal traverse scan order, a vertical traverse scan order, or a zig zag scan order. Possible orders are not limited to the orders indicated in FIG. 26.

Figure 27:
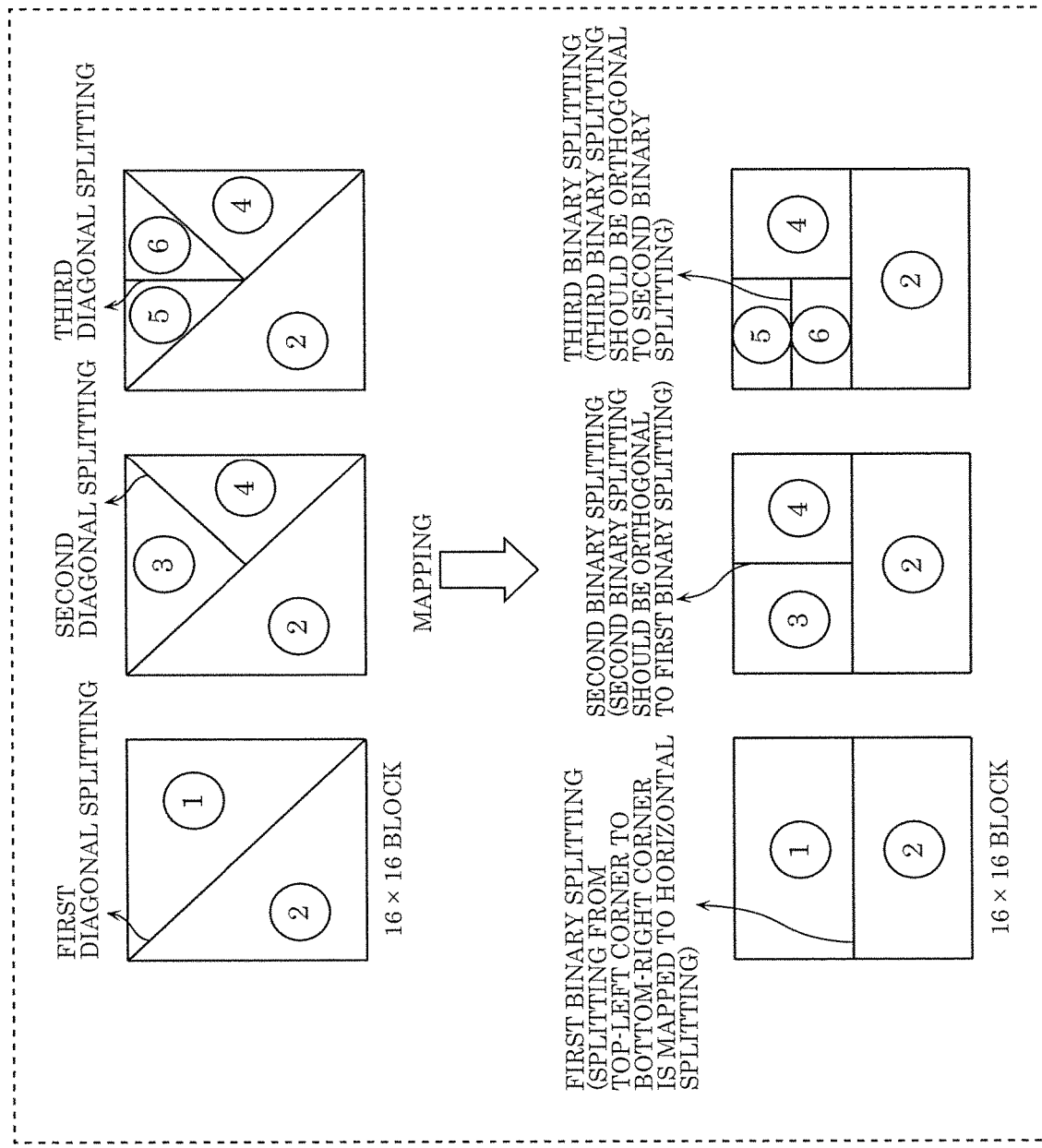
FIG. 27 is a diagram indicating examples of mapping diagonal splitting on rectangular partitions to horizontal splitting and vertical splitting.

FIG. 27 is a diagram indicating examples of mapping diagonal splitting on rectangular partitions to horizontal splitting and vertical splitting. For example, reordering of the residual samples into the rectangular shape may include determination of the width and height of the rectangular shape. As illustrated in FIG. 27, the width and height of the rectangular shape are determined based on mapping each diagonal splitting into horizontal splitting or vertical splitting.

The first diagonal splitting is mapped to either the horizontal splitting or the vertical splitting, based on the direction in which the block is split into two triangles. When encoder 100 determines that the target block is split from the top-left corner to the bottom-right corner thereof into two triangles, the diagonal splitting is mapped into horizontal binary splitting. When encoder 100 determines that the target block is split from the top-right corner to the bottom-left corner thereof into two triangles, the diagonal splitting is mapped into vertical binary splitting. In FIG. 27, the first diagonal splitting, which splits a 16×16 block from the top-left corner to the bottom-right corner thereof into a first triangle and a second triangle, is mapped to first binary splitting which is horizontal binary splitting.

The second diagonal splitting, which splits the first triangle into a third triangle and a fourth triangle, is mapped to second binary splitting in the direction orthogonal to the first binary splitting. In FIG. 27, the second binary splitting is vertical binary splitting.

The third diagonal splitting, which splits the third triangle into a fifth triangle and a sixth triangle, is mapped to third binary splitting in the direction orthogonal to the second binary splitting. In FIG. 27, the third binary splitting is horizontal binary splitting.

In FIG. 27, residual samples in the fifth triangle are reordered in an 8×4 rectangle. Residual samples in the sixth triangle are reordered in an 8×4 rectangle. Residual samples in the fourth triangle are reordered in an 8×8 square. Residual samples in the second triangle are reordered in a 16×8 rectangle.

Figure 28:
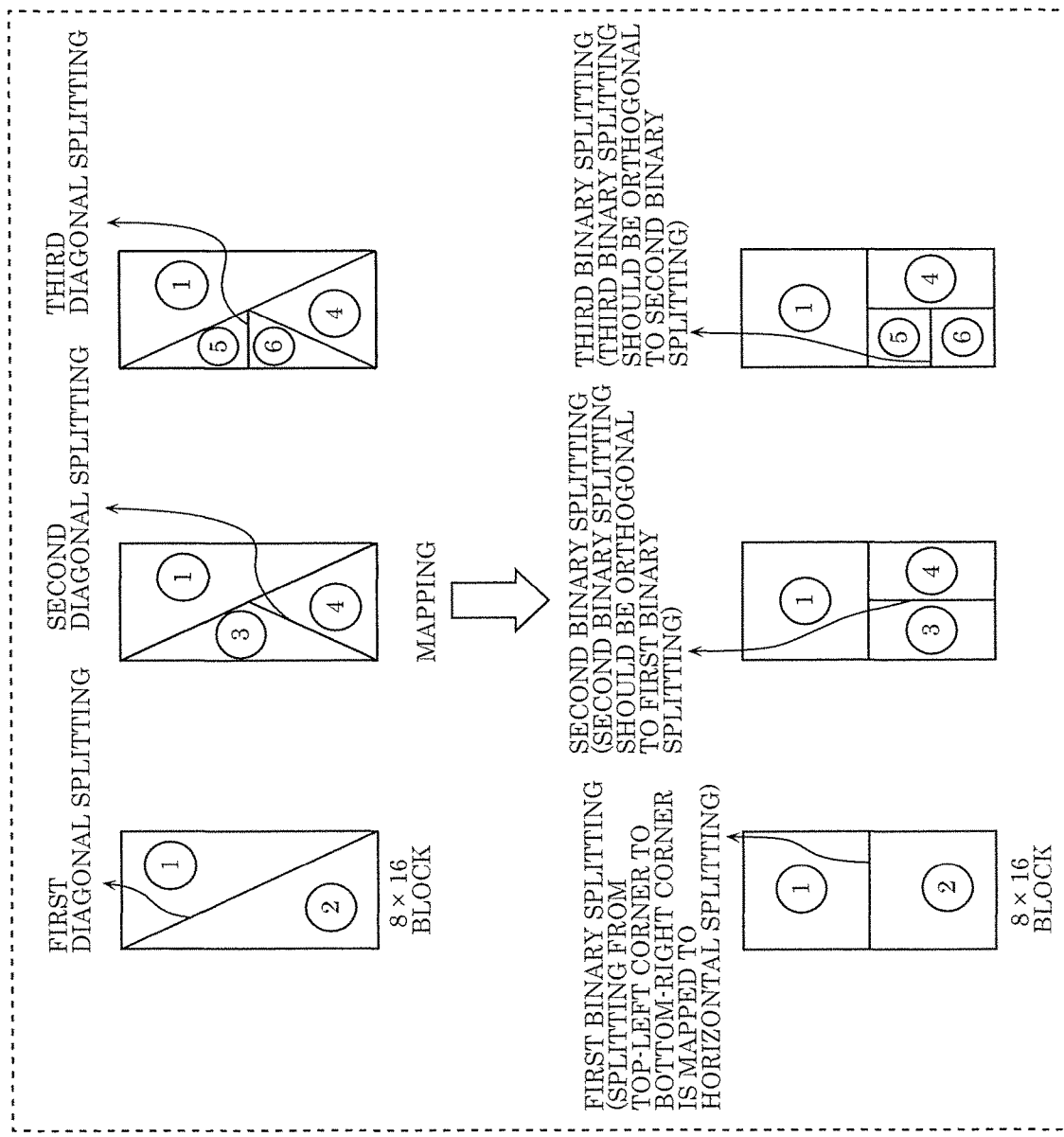
FIG. 28 is a diagram indicating a first example of determining the widths and heights of rectangular and triangular shapes.

FIG. 28 is a diagram indicating a first example of determining the width and height of a rectangular shape. Mapping is the same as described in FIG. 27. Residual samples in the first triangular shape are reordered in an 8×8 rectangular shape. Residual samples in the fifth triangular shape are reordered in a 4×4 square shape. Residual samples in the sixth triangular shape are reordered in a 4×4 square shape. Residual samples in the fourth triangular shape are reordered in a 4×8 rectangular shape.

Figure 29:
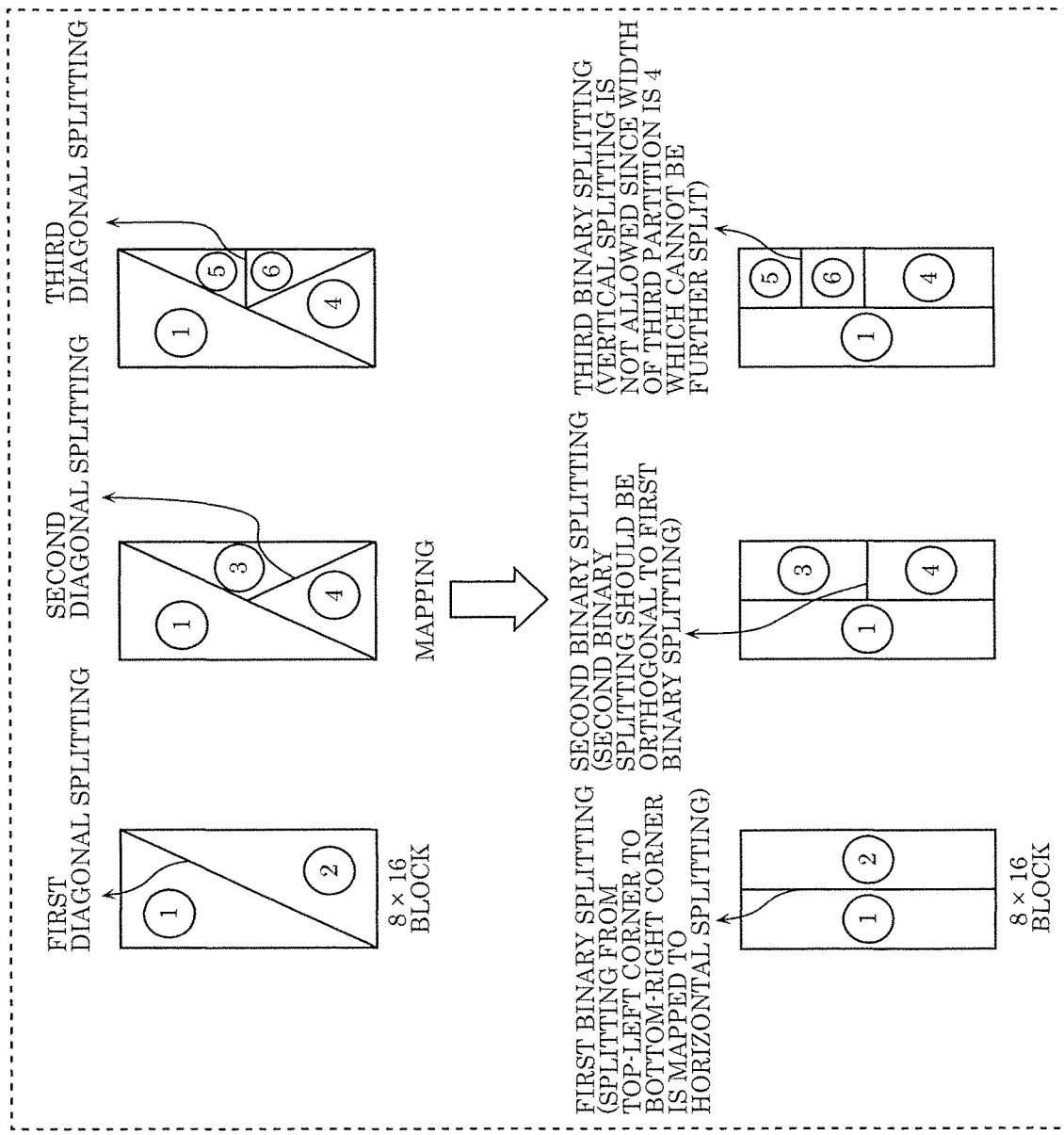
FIG. 29 is a diagram indicating a second example of determining the widths and heights of rectangular and triangular shapes.

FIG. 29 is a diagram indicating a second example of determining the width and height of a rectangular shape. The first diagonal splitting is mapped into the first binary splitting which is vertical binary splitting. The second diagonal splitting is horizontal binary splitting, and is mapped to the second binary splitting orthogonal to the first binary splitting. The third diagonal splitting is mapped into the third binary splitting which is horizontal binary splitting. In the third binary splitting, the vertical binary splitting is not allowed in a third partition. In view of this, since the width of the third partition is 4 which is the minimum transformation size, the third binary splitting is not vertical binary splitting but horizontal binary splitting.

Next, reordering of residual samples in a triangular partition is described. Residual samples in a first triangle are reordered in a 4×16 rectangle. Residual samples in the fifth triangle are reordered in a 4×4 square. Residual samples in the sixth triangle are reordered in a 4×4 square. Residual samples in the fourth triangle are reordered in a 4×8 rectangle.

Figure 30:
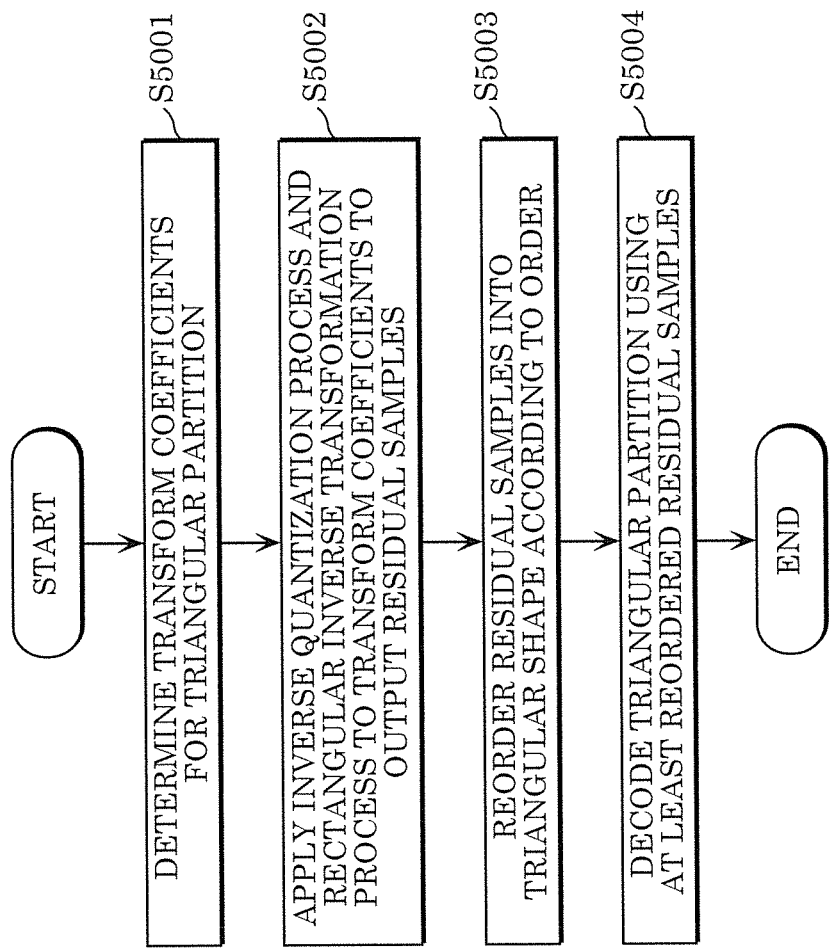
FIG. 30 is a diagram indicating an example of a decoding method and a decoding process performed by a decoder according to an inverse quantization process and an inverse transformation process on a triangular partition.

FIG. 30 is a diagram indicating an example of a decoding method and a decoding process performed by a decoder according to an inverse quantization process and an inverse transformation process on a triangular partition.

Decoder 200 may determine transform coefficients for a triangular partition (Step S5001). The transform coefficients are analyzed by decoder 200 from a bitstream.

Next, decoder 200 applies an inverse quantization process and a rectangular inverse transformation process to the transform coefficients, to output residual samples (Step S5002).

Decoder 200 then reorders the residual samples into a triangular shape according to an order (Step S5003).

Decoder 200 then decodes the triangular partition using the reordered residual samples (Step S5004).

Step S5002 and Step S5003 in FIG. 30 performed by encoder 100 are the same as Step S4004 and Step S4005 in FIG. 15 performed by decoder 200.

Figure 31:
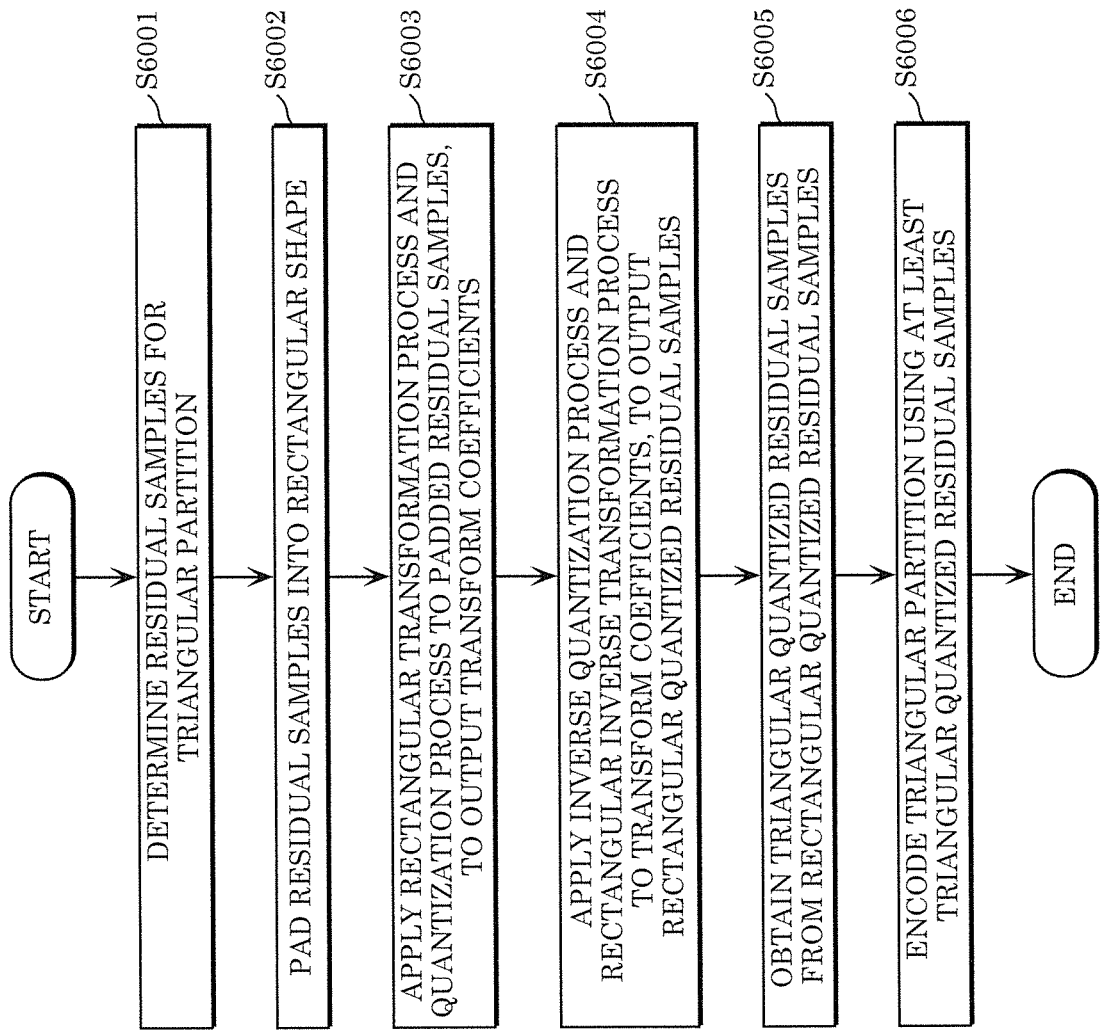
FIG. 31 is a diagram indicating an example of an encoding method and an encoding process performed by an encoder according to an inverse quantization process and an inverse transformation process on a triangular partition.

FIG. 31 is a diagram indicating an example of an encoding method and an encoding process performed by the encoder according to an inverse quantization process and an inverse transformation process on a triangular partition.

First, encoder 100 may determine residual samples for a triangular partition (Step S6001).

Next, encoder 100 pads a plurality of samples into a rectangular partition (Step S6002). In Step S6002, the padding of the residual samples into the rectangular partition may be replaced by an up-sampling process. In addition, the residual samples in the rectangular shape are obtained by applying an up-sampling filter to the residual samples for the triangular partition.

Encoder 100 then applies a rectangular transformation process and a quantization process to the padded residual samples, to output transform coefficients (Step S6003).

Encoder 100 then applies an inverse quantization process and a rectangular inverse transformation process on the transform coefficients, to output quantized residual samples of the rectangular shape (Step S6004).

Encoder 100 then obtains quantized residual samples of a triangular partition from the quantized residual samples of the rectangular partition (Step S6005). Obtaining the quantized residual samples of the triangular partition may include applying a mask indicating whether quantized residual samples are present in the triangular shape to the quantized residual samples of the rectangular shape.

Encoder 100 then encodes the triangular partition using the quantized residual samples of the triangular partition (Step S6006). In Step S6006, the triangular partition is encoded using the quantized residual samples of the triangular shape.

Step S6001 in FIG. 31 is the same as Step 4001 in FIG. 15. In addition, Step S6003 and Step S6004 in FIG. 31 may be the same as Step S4003 and Step S4004 in FIG. 25.

In Step S6002, the residual samples are padded into the rectangular partition.

Figure 32:
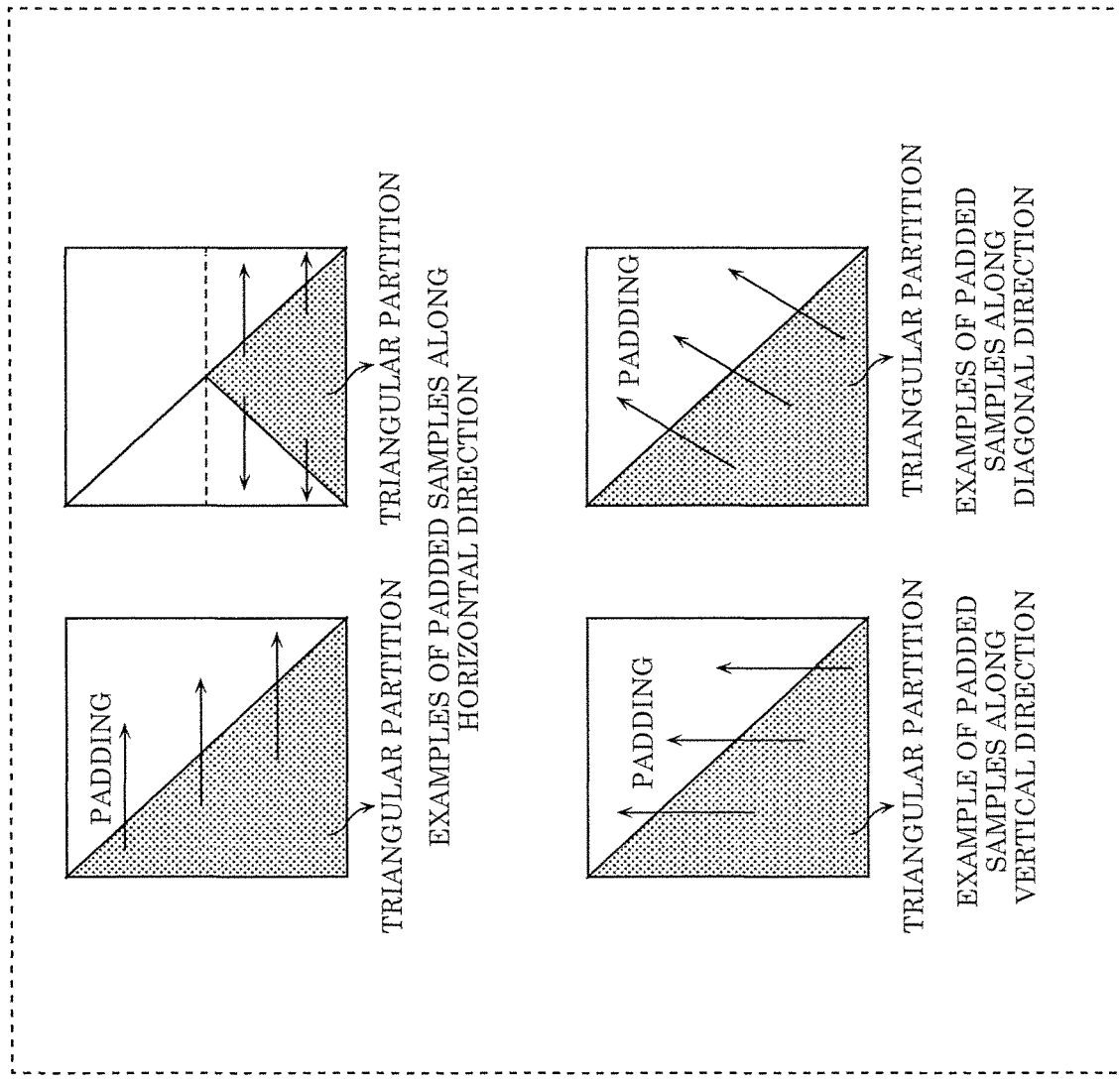
FIG. 32 is a diagram indicating examples of padded samples in target partitions.

FIG. 32 is a diagram indicating examples of padded samples in target partitions. For example, as in FIG. 32, padding of residual samples into a rectangular partition may stretch the triangular partition in a horizontal direction. In another example, as in FIG. 32, padding of residual samples into a rectangular partition may stretch the triangular partition in a vertical direction or in a diagonal direction.

Figure 33:
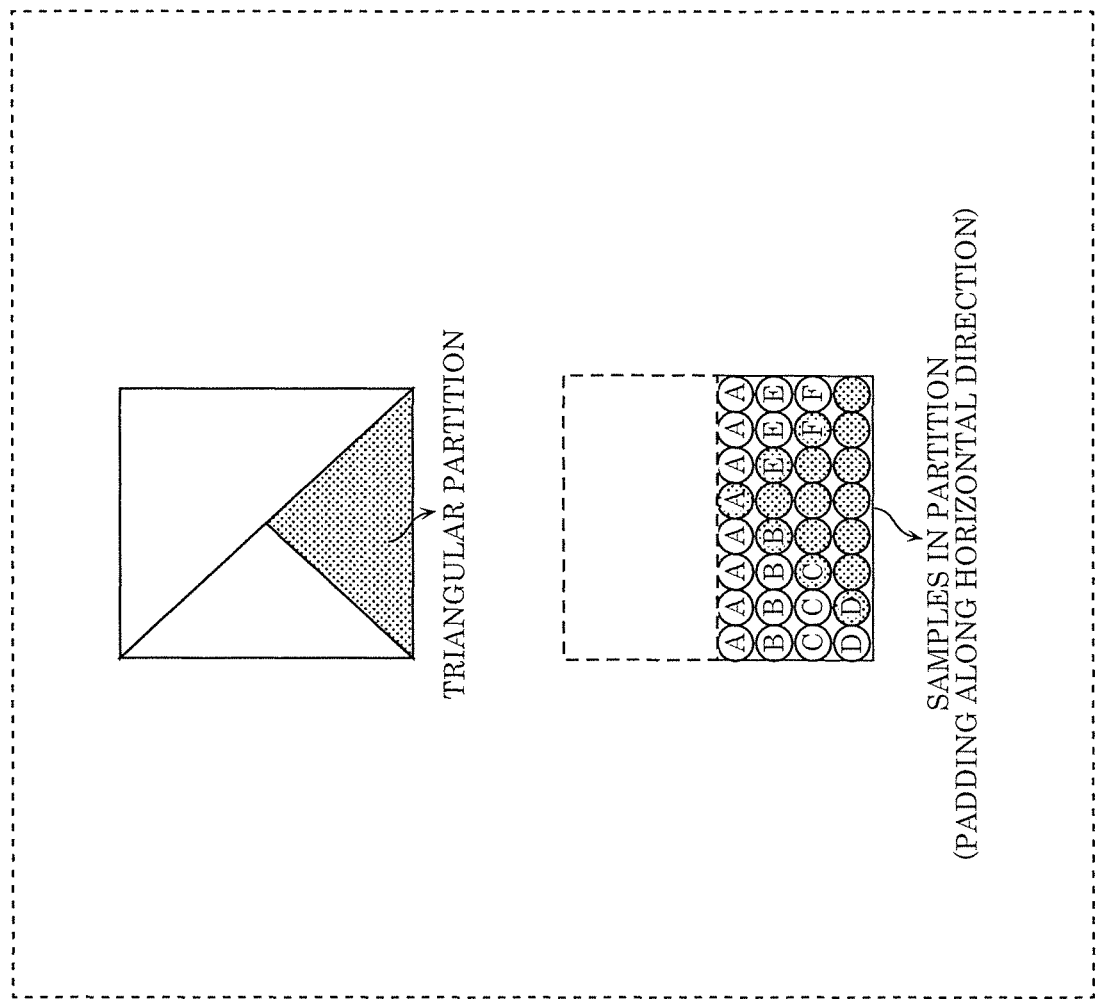
FIG. 33 is a diagram indicating a first example of padding using samples in a triangular partition.

FIG. 33 is a diagram indicating a first example of padding using samples in a triangular partition. For example, as in FIG. 33, padding may include duplicating residual samples adjacent to the diagonal edge of the triangular partition.

Figure 34:
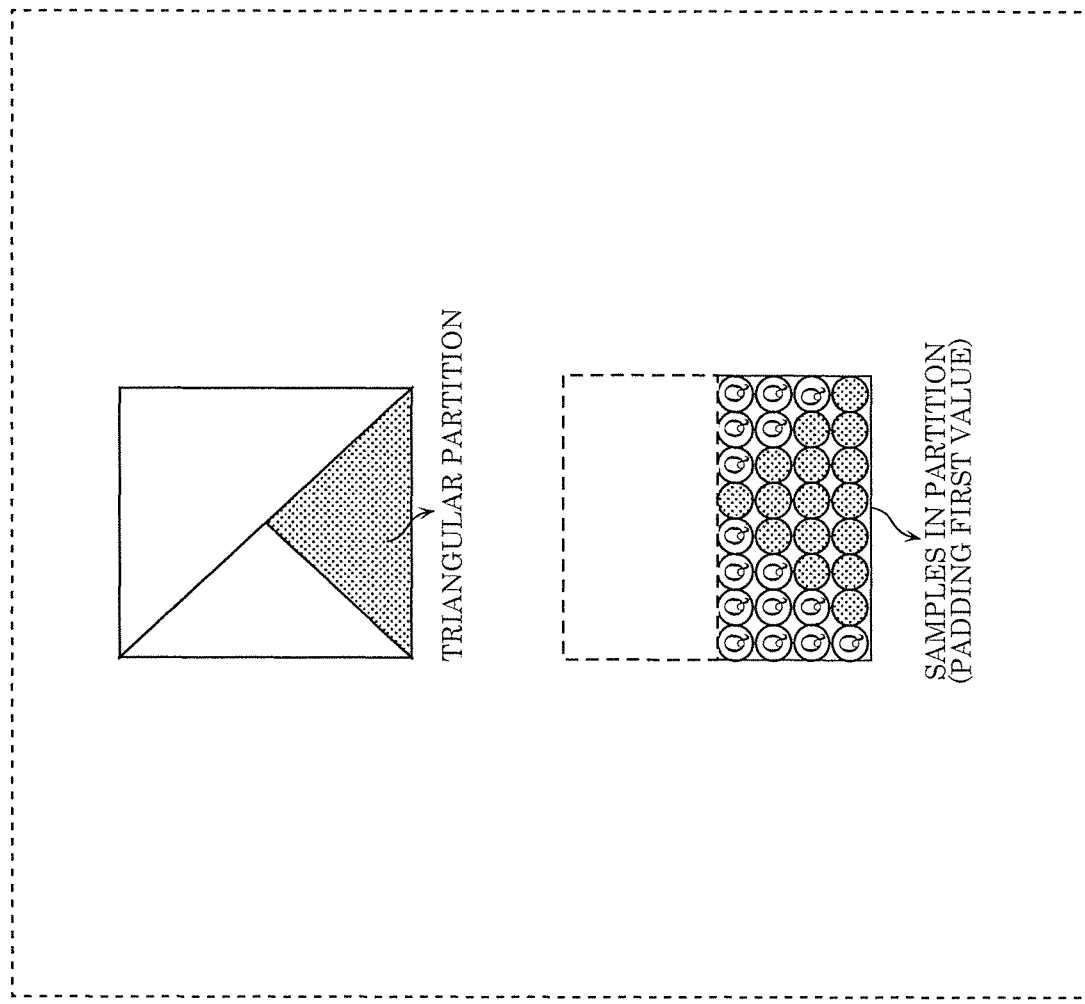
FIG. 34 is a diagram indicating a second example of padding using samples in a triangular partition.

FIG. 34 is a diagram indicating a second example of padding using samples in a triangular partition. For example, as in FIG. 34, padding may include padding of a first value which is at least one of 0, 128, 512, a positive integer, and the mean value of the residual samples. As another example, padding may include mirroring of the residual samples of the triangular partition. As still another example, padding may include performing a given function to the residual samples. Examples of functions may include a filter, a polynomial function, an exponential function, and a clipping function. In addition, for example, padding may include any combination of mirroring, padding a first value, and performing a function to the prediction samples.

Figure 35:
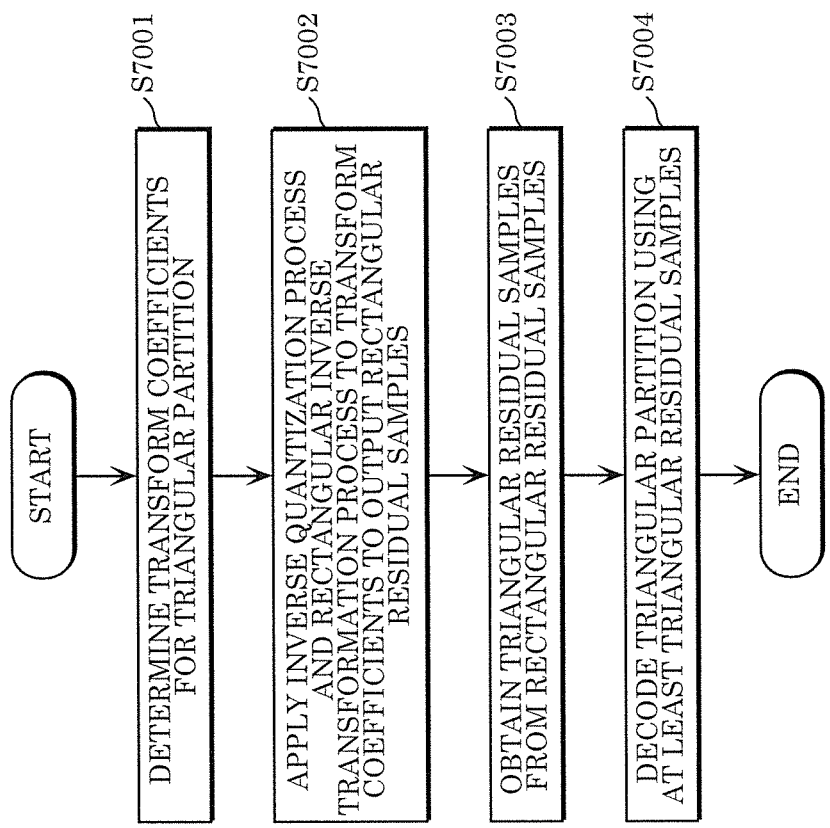
FIG. 35 is a diagram indicating an example of a decoding method and a decoding process performed by a decoder according to an inverse quantization process and an inverse transformation process on a triangular partition.

FIG. 35 is a diagram indicating another example of a decoding method and a decoding process performed by a decoder according to an inverse quantization process and an inverse transformation process on a triangular partition.

First, decoder 200 may determine transform coefficients for a triangular partition (Step S7001).

Next, decoder 200 applies an inverse quantization process and a rectangular inverse transformation process to the transform coefficients, to output the residual samples of the rectangular shape (Step S7002).

Decoder 200 then obtains residual samples of a triangular partition from the residual samples of the rectangular partition (Step S7003).

Decoder 200 then decodes the triangular partition using the residual samples of the triangular partition (Step S7004).

Step S7001 is the same as Step S001 in FIG. 20. In addition, Step S7002 and Step S7003 are the same as Step S6004 and Step S6005 in FIG. 21.

Figure 36:
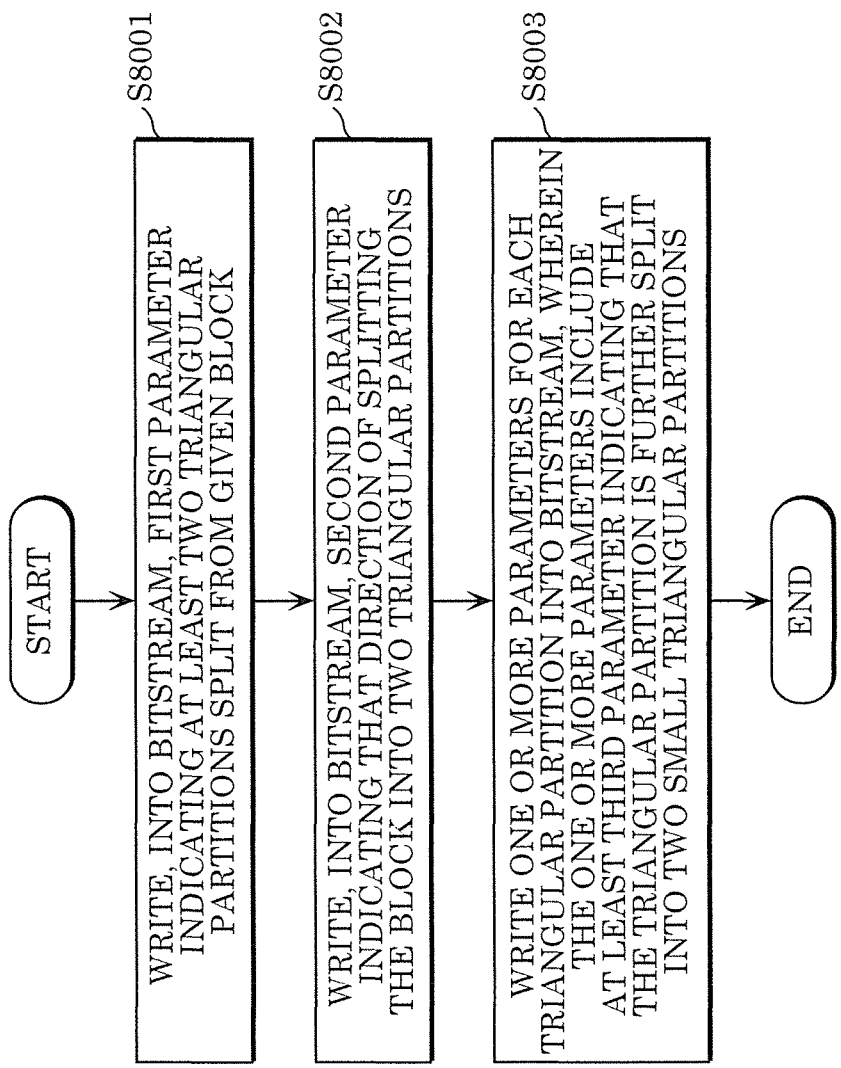
FIG. 36 is a diagram indicating examples of an encoding method and an encoding procedure performed by an encoder according to encoding of a partition.

FIG. 36 is a diagram indicating examples of an encoding method and an encoding procedure performed by the encoder according to encoding of a partition. The decoding method and the decoding procedure performed by decoder 200 are the same as the encoding method and the encoding procedure performed by encoder 100.

Encoder 100 writes, into a bitstream, a first parameter indicating two triangular partitions obtained by splitting a block (Step S8001).

For example, the first parameter is a flag. When the value of the flag equals to 0, the block is not split into two triangular partitions. When the value of the flag equals to 1, the block is split into two triangular partitions.

Decoder 200 writes, into a bitstream, a second parameter indicating two triangular partitions obtained by splitting a block (Step S8002).

For example, the second parameter is a flag. When the value of the flag equals to 0, 0 indicates that the block is split from top-left corner to bottom-right corner into two triangular partitions. When the value of the flag equals to 1, 1 indicates that the block is split from top-right corner to bottom-left corner into two triangular partitions.

In addition, for example, the first parameter and the second parameter are the same. When the value of the first parameter and the value of the second parameter equal 0, the block is not split into two triangular partitions. When the value of the first parameter and the value of the second parameter equal 1, the block is split from top-left corner to bottom-right corner into two triangular partitions. When both the values of the parameters equal 2, the block is split from top-right corner to bottom-left corner into two triangular partitions.

Decoder 200 writes at least one parameter for each triangular partition into a bitstream (Step S8003). The at least one parameter includes a third parameter indicating that the triangular partition is further to be split into two small triangular partitions.

For example, the third parameter is a flag. When the value of the flag equals 0, 0 indicates that the triangular partition is not further to be split into two small triangular partitions. When the value of the flag equals 1, 1 indicates that the triangular partition is further to be split into two small triangular partitions.

In addition, for example, at least one parameter does not include a parameter indicating the direction in which the triangular partition is to be split into two small triangular partitions.

Figure 37:
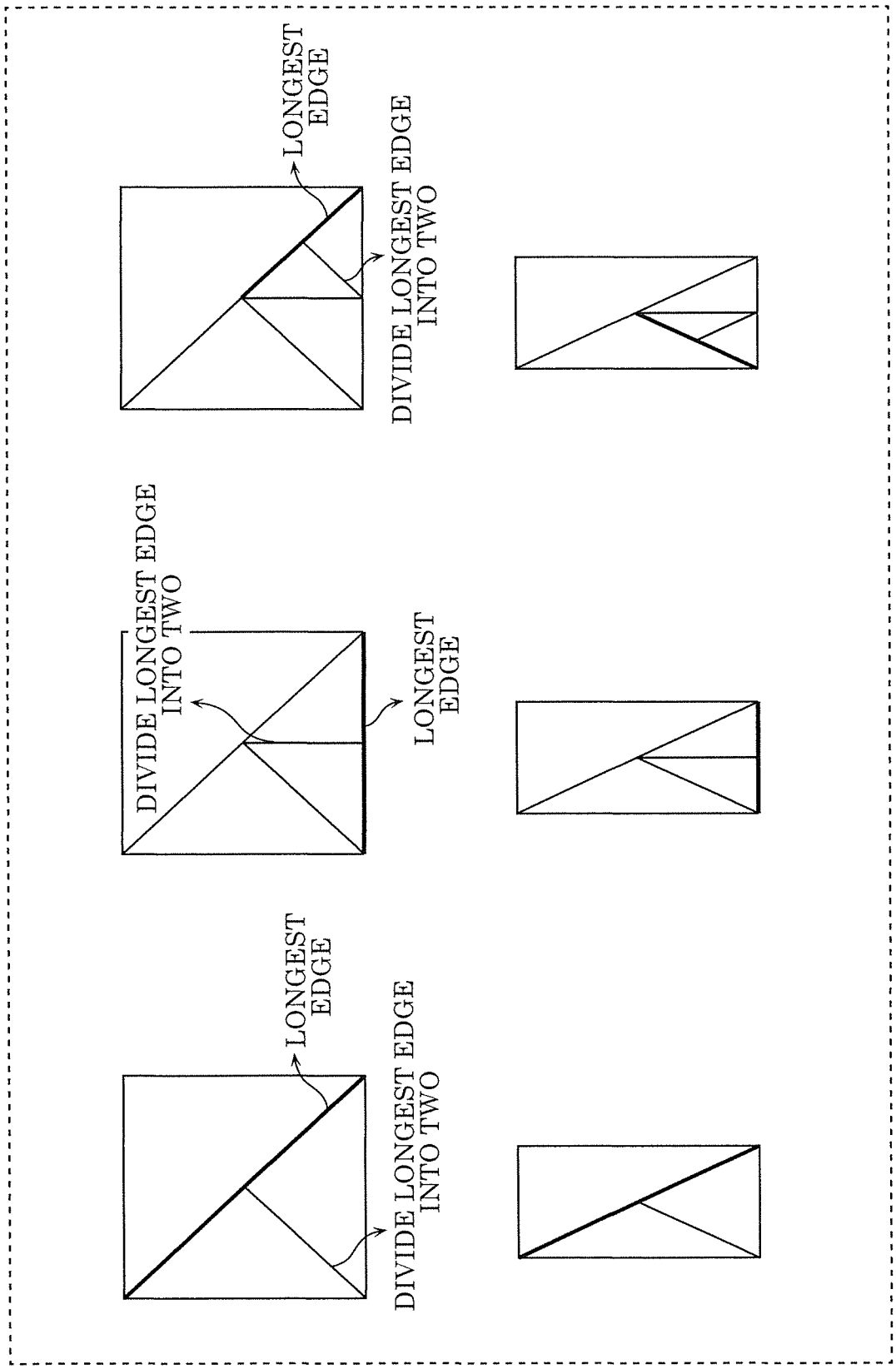
FIG. 37 is a diagram indicating examples of binary splitting of the longest edges in triangular partitions.

FIG. 37 is a diagram indicating examples of binary splitting of the longest edges in triangular partitions. As illustrated in FIG. 37, splitting a triangular partition into two small triangular partitions may always divide the longest edge into two.

Figure 38:
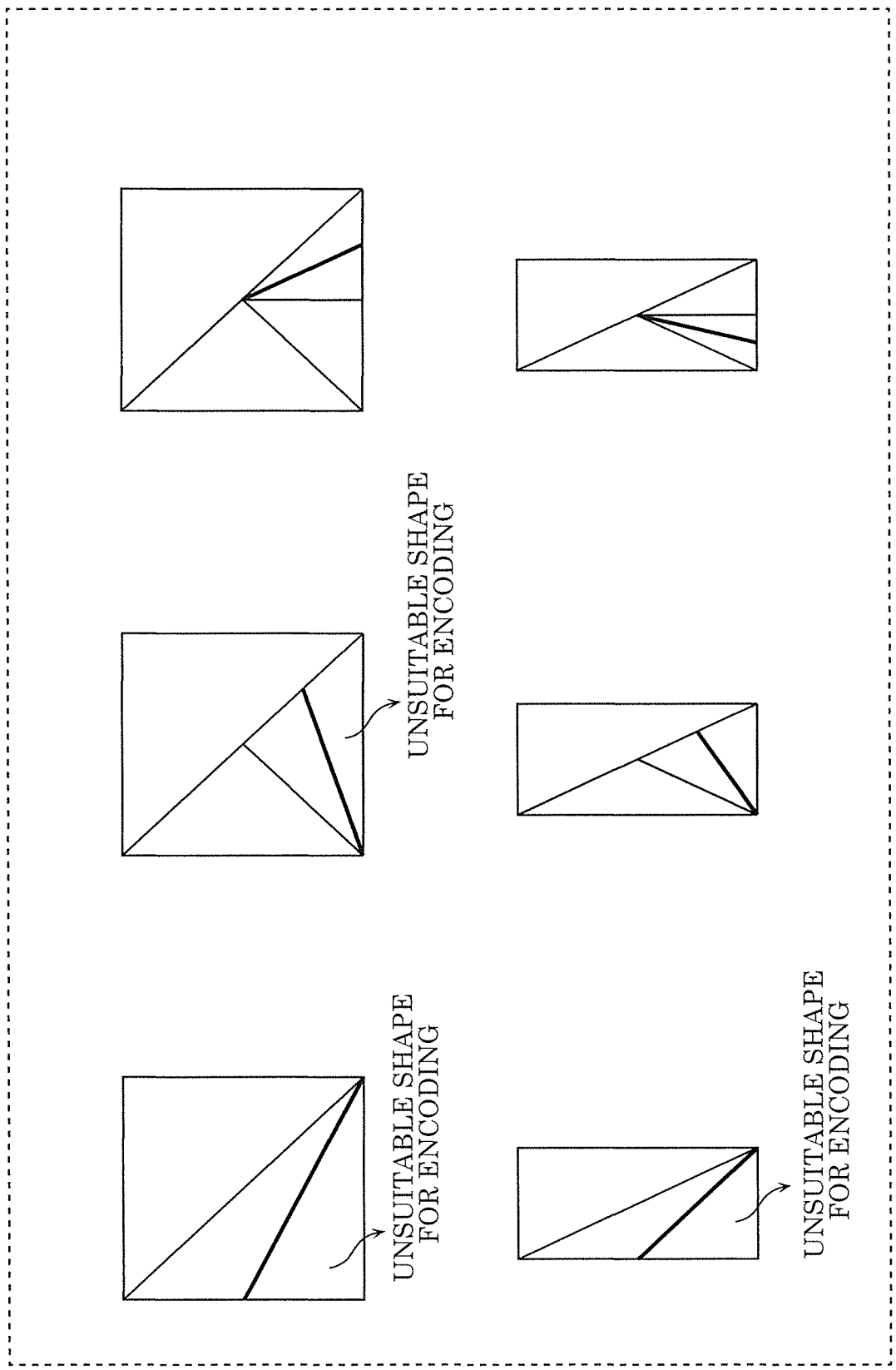
FIG. 38 is a diagram indicating unsuitable shapes for encoding in triangular partitions.

FIG. 38 is a diagram indicating unsuitable shapes for encoding in triangular partitions. The long triangular partitions as illustrated in FIG. 38 are not suitable shapes for prediction and encoding.

Figure 39:
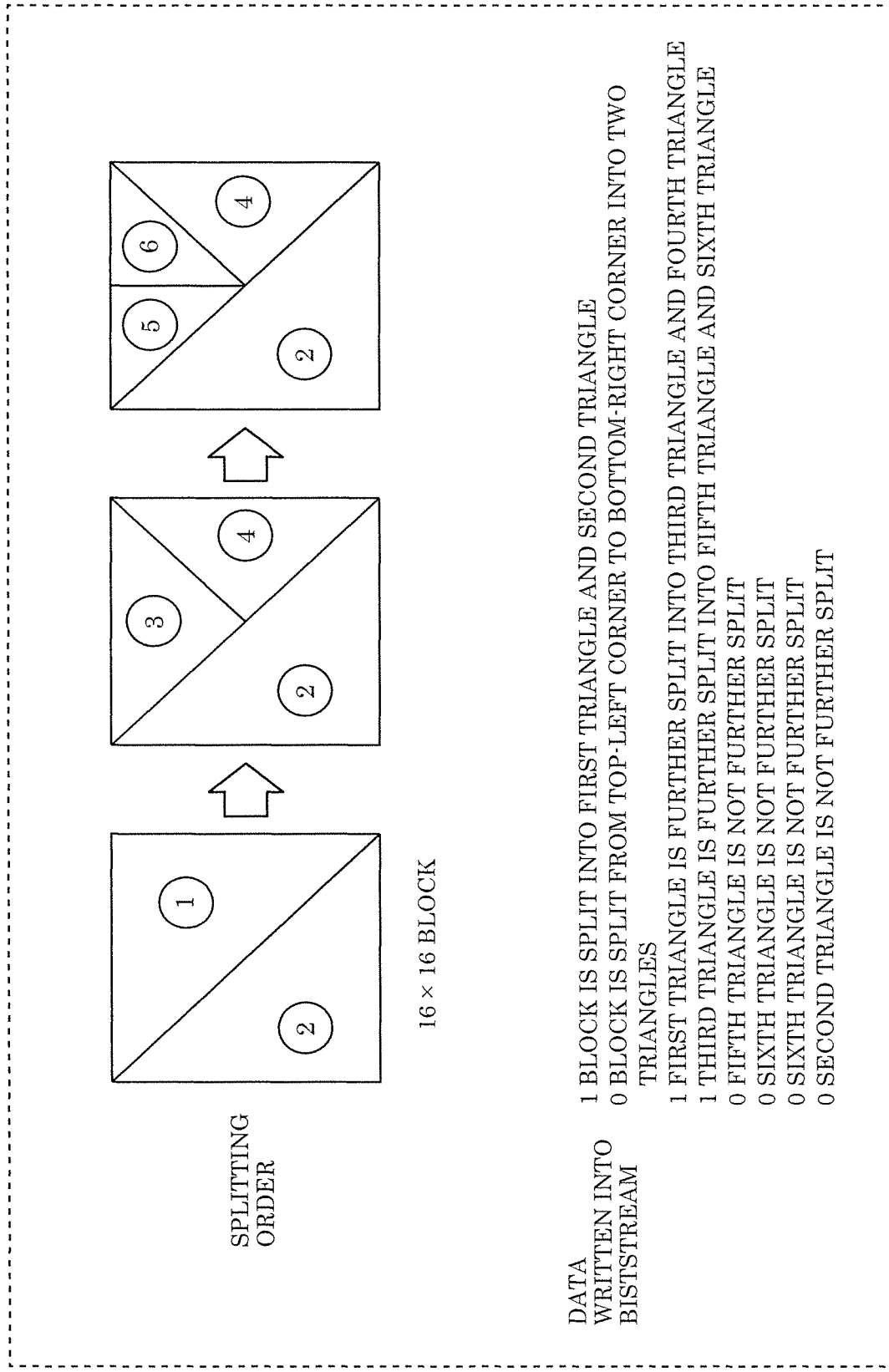
FIG. 39 is a diagram indicating an example of writing parameters into a bitstream.
Figure 40:
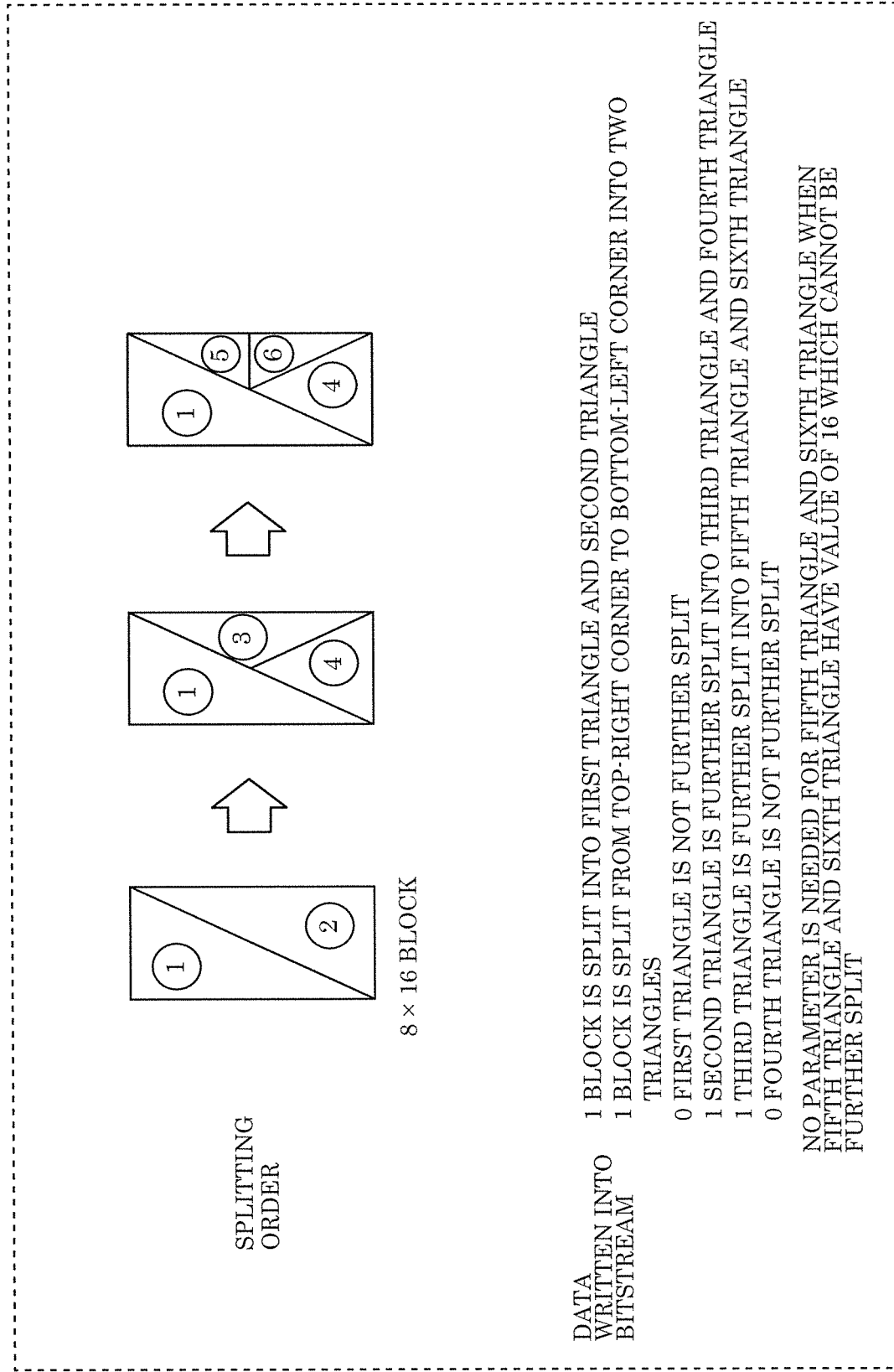
FIG. 40 is a diagram indicating another example of writing parameters to a bitstream.

FIG. 39 is a diagram indicating an example of writing parameters into a bitstream. FIG. 40 is a diagram indicating another example of writing parameters into a bitstream.

Figure 41:
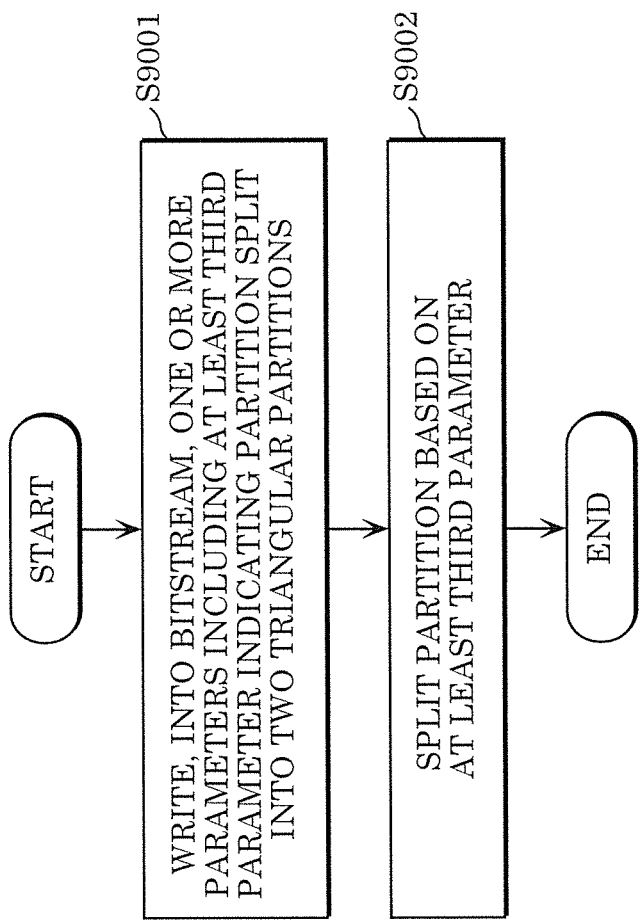
FIG. 41 is a diagram indicating an example of an encoding method and an encoding procedure performed by the encoder according to encoding of a partition.

FIG. 41 is a diagram indicating another example of an encoding method and an encoding procedure performed by the encoder according to encoding of a partition. The decoding method and the decoding procedure performed by decoder 200 are the same as the encoding method and the encoding procedure performed by encoder 100.

Encoder 100 writes, into a bitstream, one or more parameters including at least a third parameter indicating a partition to be split into two triangular partitions (Step S9001).

For example, the third parameter is a flag. When the value of the flag equals 0, the block is not to be split into two triangular partitions. When the value of the flag equals 1, the block is to be split into two triangular partitions.

In addition, for example, when a current partition is a rectangular partition, one or more parameters may include a third parameter indicating that the partition is split into two triangular partitions and the direction in which the partition is split into the two triangular partitions.

In addition, for example, when a current partition is a rectangular partition, one or more parameters may include a third parameter indicating that the partition is split into two triangular partitions and a fourth parameter indicating the direction in which the partition is split into the two triangular partitions.

In addition, for example, when a current partition is a rectangular partition, one or more parameters may include a third parameter indicating that the partition is split into two triangular partitions and may not include a fourth parameter indicating the direction in which the partition is split into the two triangular partitions.

Encoder 100 splits a partition based on at least a first parameter (Step S9002).

Figure 42:
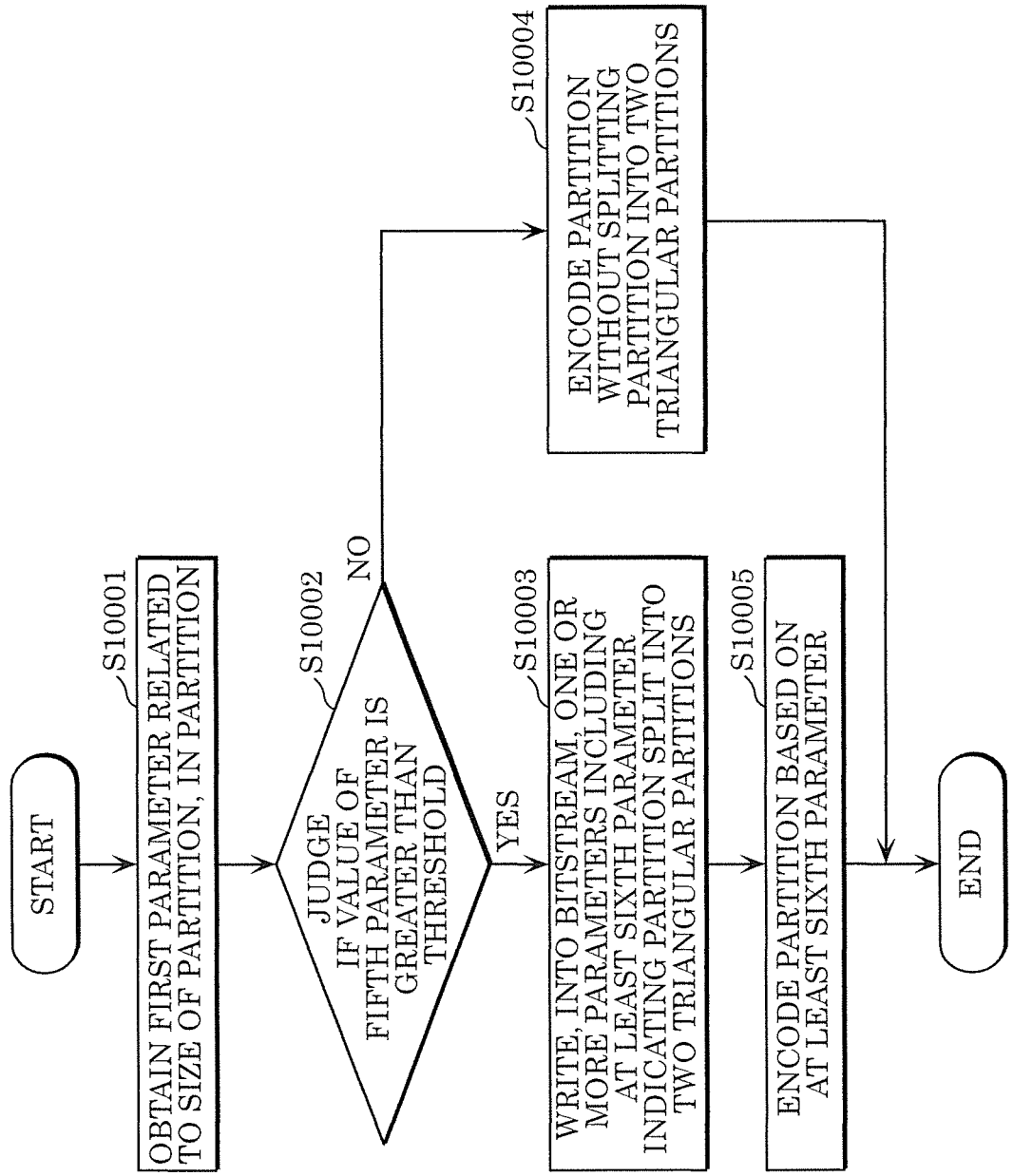
FIG. 42 is a diagram indicating another example of an encoding method and an encoding procedure performed by the encoder according to encoding of a partition.

FIG. 42 is a diagram indicating another example of an encoding method and an encoding procedure performed by the encoder according to encoding of a partition. The decoding method and the decoding procedure performed by decoder 200 are the same as the encoding method and the encoding procedure performed by encoder 100.

Encoder 100 obtains a fifth parameter relating to the size of the partition (Step S10001).

For example, the fifth parameter may be the number of samples in the partition.

In addition, for example, the fifth parameter may be the width and height of the partition, when the partition is a rectangle.

In addition, for example, the fifth parameter may be the ratio of the width of the partition with respect to the height of the partition, when the partition is a rectangle.

In addition, for example, the fifth parameter may be the ratio of the height of the partition with respect to the width of the partition, when the partition is a rectangle.

Encoder 100 determines whether the value of the fifth parameter is larger than a threshold value (Step S10002).

When encoder 100 determines that the value of the first parameter is not larger than the threshold value (No in Step S10002), encoder 100 encodes the partition without splitting the partition into two triangles (Step S10003). Here, the parameter indicating that the partition is split into two triangular partitions is not written into a bitstream.

When encoder 100 determines that the value of the first parameter is larger than the threshold value (Yes in Step S10002), encoder 100 writes, into the bitstream, one or more parameters including a sixth parameter indicating that the partition is split into two triangular partitions (Step S10004). Next, encoder 100 encodes the partition based on the sixth parameter (Step S10005). Here, the threshold value is a positive value. Step S10004 and Step S10005 are the same as Step S9001 and Step S9002 in FIG. 39.

For example, the fifth parameter may be the number of samples in the partition. When encoder 100 determines that the number of samples in the partition is not larger than 16, encoder 100 performs Step S10003. When encoder 100 determines that the number of samples in the partition is larger than or equal to 16, encoder 100 performs Step S10004 and Step S10005.

As another example, a fifth parameter indicates the width or the height of a partition. When encoder 100 determines that the width or the height of the partition is not larger than 4, encoder 100 performs Step S10003. When encoder 100 determines that the width or the height of the partition is larger than or equal to 4, encoder 100 performs Step S10004 and Step S10005.

As still another example, a fifth parameter is either the ratio of the width of the partition with respect to the height of the partition, or the ratio of the height of the partition with respect to the width of the partition. When encoder 100 determines that the value of the fifth parameter is not larger than ¼, encoder 100 performs Step S10003. When encoder 100 determines that the value of the fifth parameter is larger than or equal to ¼, encoder 100 performs Step S10004 and Step S10005.

Figure 43:
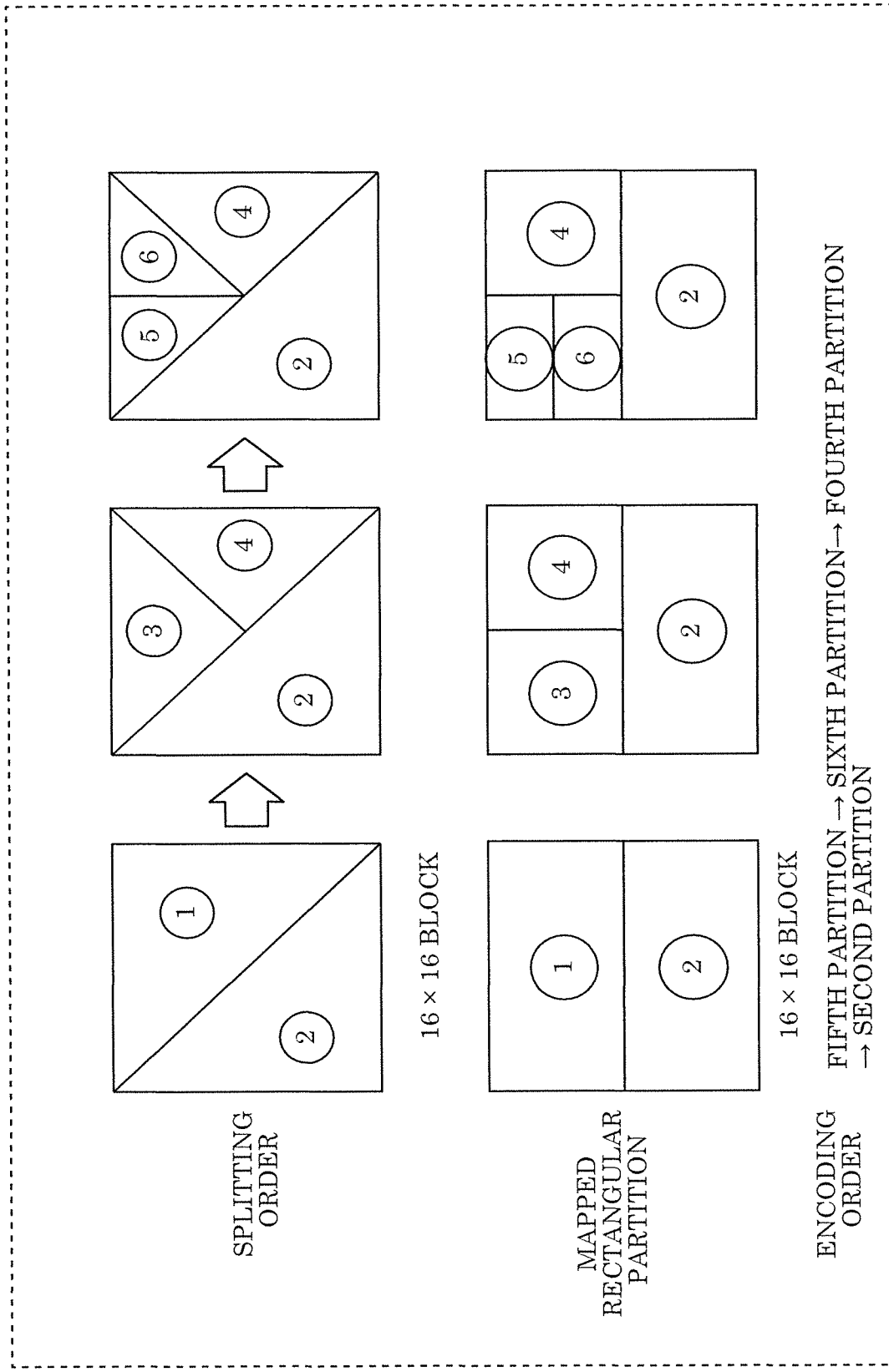
FIG. 43 is a diagram indicating an example of a coding order of triangular partitions in a block.

FIG. 43 is a diagram indicating an example of a coding order of triangular partitions in a block. An order of encoding triangular partitions in a block is determined based on the order of encoding mapped rectangular partitions obtained through a mapping procedure described with reference to FIGS. 17, 18, and 19. The order of encoding the rectangular partitions is the same as the block coding order using a binary tree splitting method.

Figure 44:
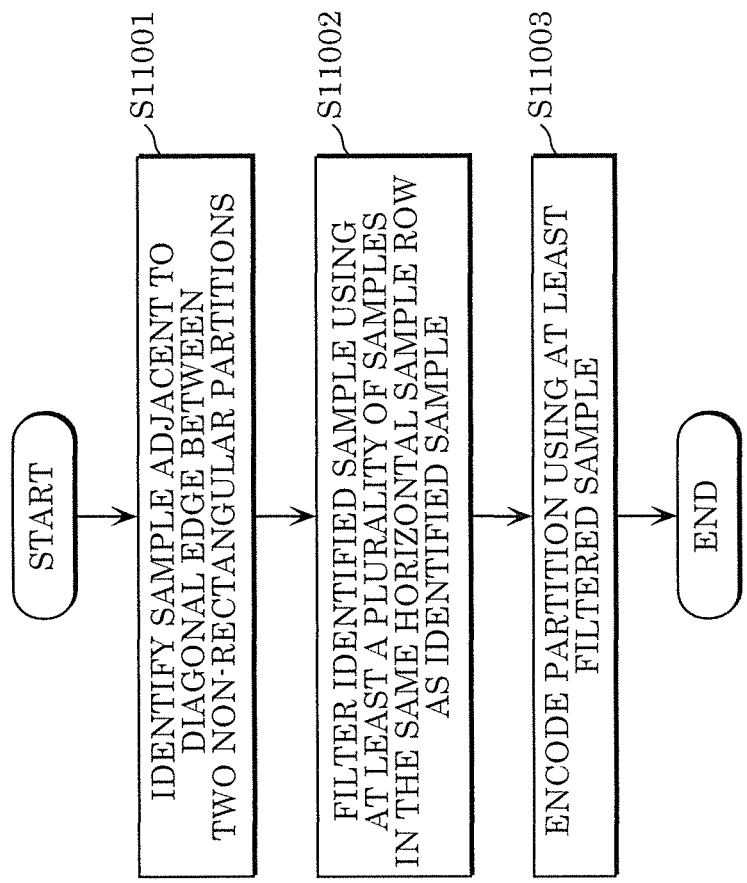
FIG. 44 is a diagram indicating an example of an encoding method and an encoding procedure performed by the encoder according to a procedure of a loop filter.

FIG. 44 is a diagram indicating an example of an encoding method and an encoding procedure performed by the encoder according to a procedure of a loop filter. The decoding method and the decoding procedure performed by decoder 200 are the same as the encoding method and the encoding procedure performed by encoder 100.

Figure 45:
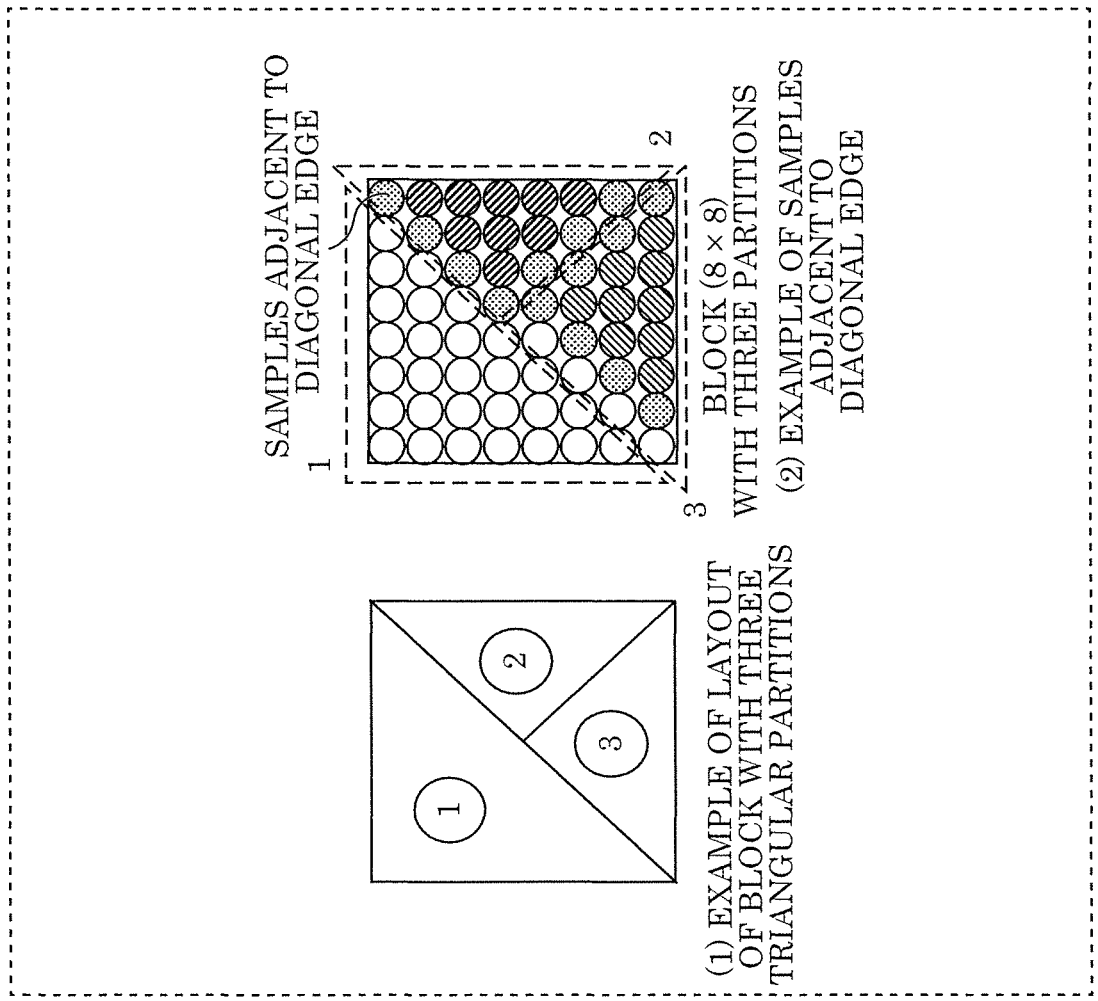
FIG. 45 is a diagram indicating an example of samples adjacent to a diagonal edge.

Encoder 100 identifies a sample adjacent to a diagonal edge located between non-rectangular partitions (Step S11001). FIG. 45 is a diagram indicating an example of samples adjacent to a diagonal edge.

Figure 46A:
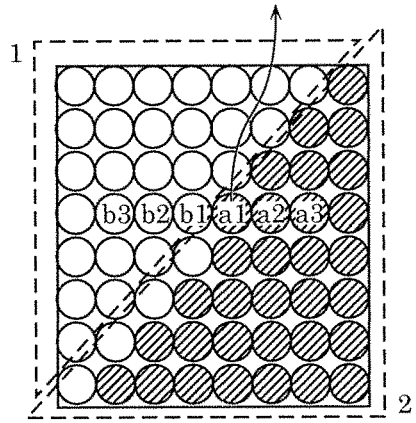
FIG. 46A indicates an example of samples (b3, b2, b1, a2, and a3) located in the same horizontal sample row that are used in a 6-tap filter for identifying sample a1.
Figure 46B:
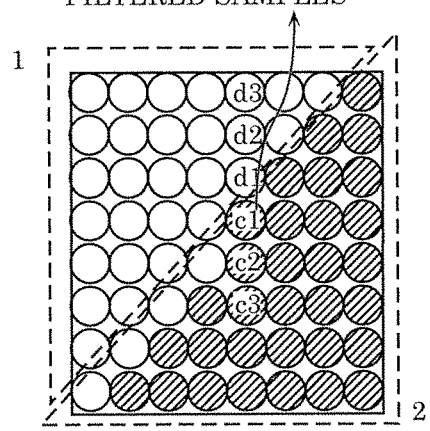
FIG. 46B indicates an example of samples (d3, d2, d1, c2, and c3) located in the same horizontal sample column that are used in a 6-tap filter for identifying sample c1.
Figure 46C:
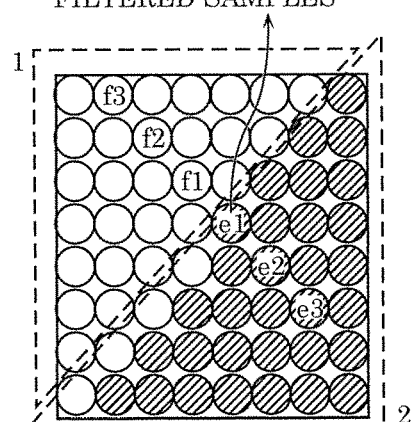
FIG. 46C indicates an example of samples (f3, f2, f1, e2, and e3) located in the same diagonal sample direction that are used in a 6-tap filter for identifying sample e1.
Figure 47A:
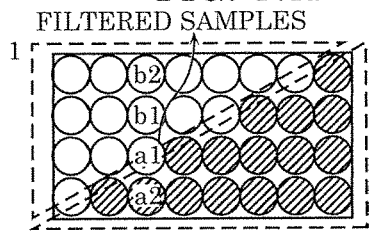
FIG. 47A indicates an example of filtering identified sample a1 using samples (b2, b1, and a2) located in the same vertical column.
Figure 47B:
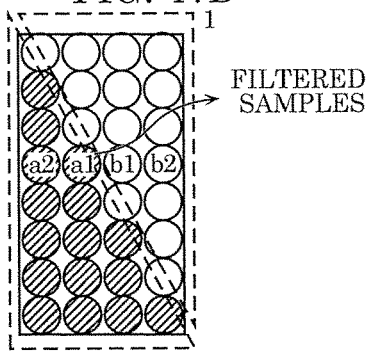
FIG. 47B indicates an example of filtering identified sample a1 using samples (b2, b1, and a2) located in the same horizontal row.
Figure 47C:
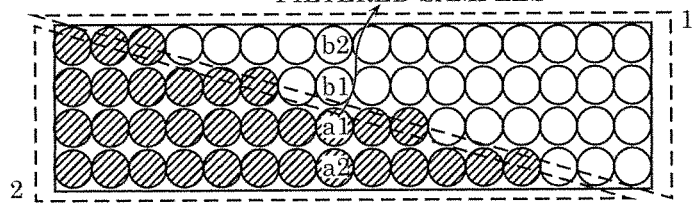
FIG. 47C indicates an example of filtering identified sample a1 using samples (b2, b1, and a2) located in the same vertical column.
Figure 47D:
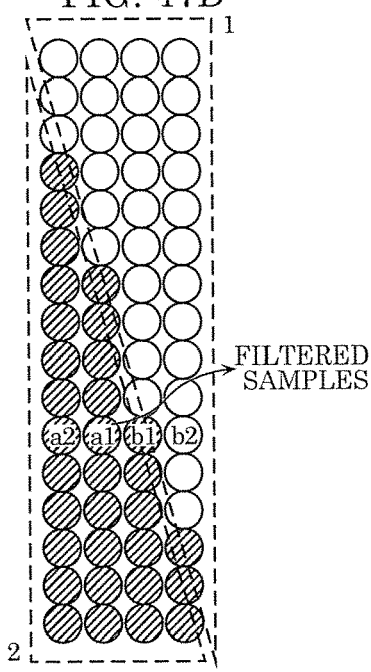
FIG. 47D indicates an example of filtering identified sample a1 using samples (b2, b1, and a2) located in the same horizontal row.

The identified sample may be filtered using at least a plurality of samples in the same horizontal sample row as the identified sample (Step S11002). The identified sample may be filtered using at least a plurality of samples in the same vertical sample column as the identified sample. The identified sample may be filtered using at least a plurality of samples in the same diagonal sample direction as the identified sample. FIG. 46A indicates an example of samples (b3, b2, b1, a2, and a3) located in the same horizontal sample row that are used in a 6-tap filter for identifying sample a1. FIG. 46B indicates an example of samples (b3, b2, b1, c2, and c3) located in the same horizontal sample row that are used in a 6-tap filter for identifying sample c1. FIG. 46C indicates an example of samples (f3, f2, f1, e2, and e3) located in the same diagonal sample direction that are used in a 6-tap filter for identifying sample e1. In addition, FIG. 47A is a diagram indicating an example of filtering identified sample a1 using samples (b2, b1, and a2) located in the same vertical column. In addition, FIG. 47B indicates an example of filtering identified sample a1 using samples (b2, b1, and a2) located in the same horizontal row. In addition, FIG. 47C indicates an example of filtering identified sample a1 using samples (b2, b1, and a2) located in the same vertical column. In addition, FIG. 47D indicates an example of filtering identified sample a1 using samples (b2, b1, and a2) located in the same horizontal row. Here, for example, horizontal filtering is applied to a vertical long block having triangular partitions.

Figure 48A:
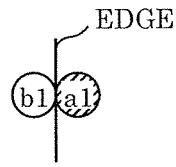
FIG. 48A is a diagram indicating an example of samples which are used by a 2-tap filter in order to apply a filter based on the position of the identified sample.
Figure 48B:
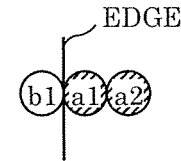
FIG. 48B is a diagram indicating an example of samples which are used by a 3-tap filter in order to apply a filter based on the position of the identified sample.
Figure 48C:
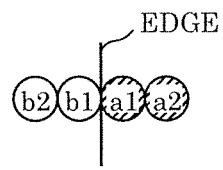
FIG. 48C is a diagram indicating an example of samples which are used by a 4-tap filter in order to apply a filter based on the position of the identified sample.
Figure 48D:
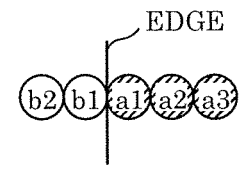
FIG. 48D is a diagram indicating an example of samples which are used by a 5-tap filter in order to apply a filter based on the position of the identified sample.
Figure 48E:
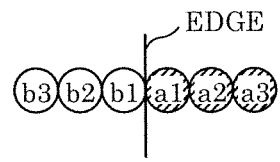
FIG. 48E is a diagram indicating examples of samples which are used by a 6-tap filter in order to apply a filter based on the position of the identified sample.
Figure 48F:
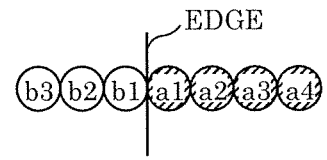
FIG. 48F is a diagram indicating an example of samples which are used by a 7-tap filter in order to apply a filter based on the position of the identified sample.
Figure 48G:
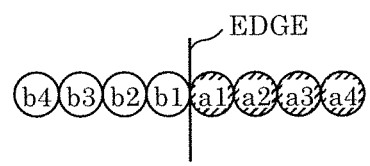
FIG. 48G is a diagram indicating an example of samples which are used by an 8-tap filter in order to apply a filter based on the position of the identified sample.
Figure 49A:
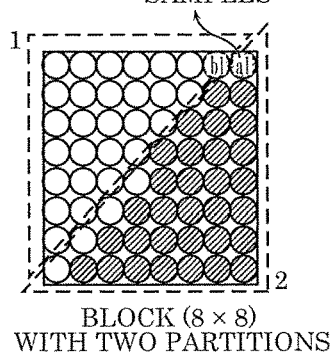
FIG. 49A is a diagram indicating an example in which a 2-tap filter is applied to a block in order to apply a filter based on the position of the identified sample.
Figure 49B:
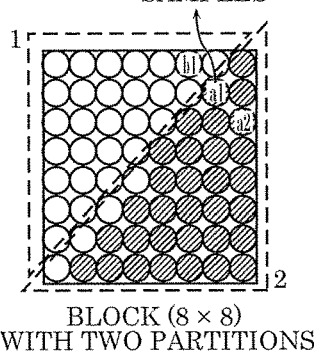
FIG. 49B is a diagram indicating an example in which a 3-tap filter is applied to a block in order to apply a filter based on the position of the identified sample.
Figure 49C:
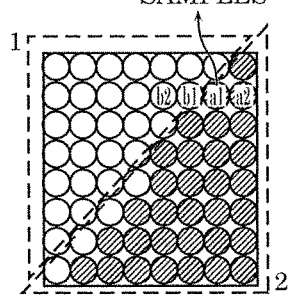
FIG. 49C is a diagram indicating an example in which a 4-tap filter is applied to a block in order to apply a filter based on the position of the identified sample.
Figure 49D:
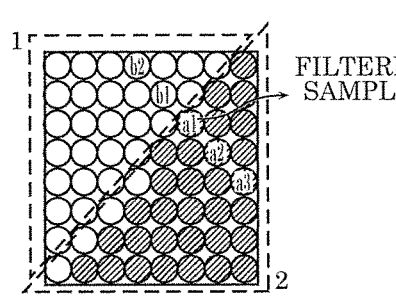
FIG. 49D is a diagram indicating an example in which a 5-tap filter is applied to a block in order to apply a filter based on the position of the identified sample.
Figure 49E:
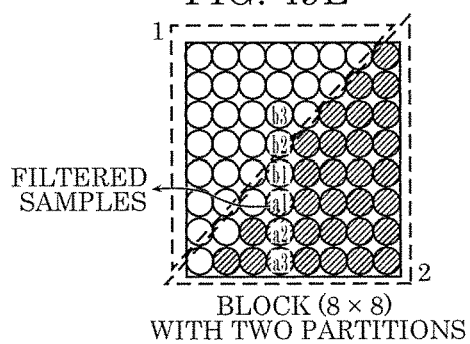
FIG. 49E is a diagram indicating an example in which a 6-tap filter is applied to a block in order to apply a filter based on the position of the identified sample.
Figure 49F:
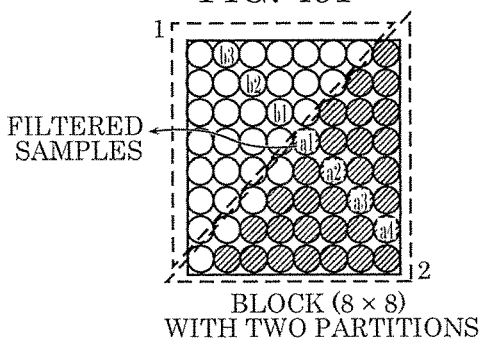
FIG. 49F is a diagram indicating an example in which a 7-tap filter is applied to a block in order to apply a filter based on the position of the identified sample.
Figure 49G:
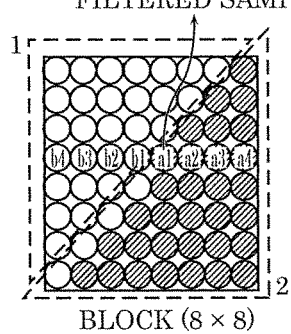
FIG. 49G is a diagram indicating an example in which an 8-tap filter is applied to a block in order to apply a filter based on the position of the identified sample.
Figure 50A:
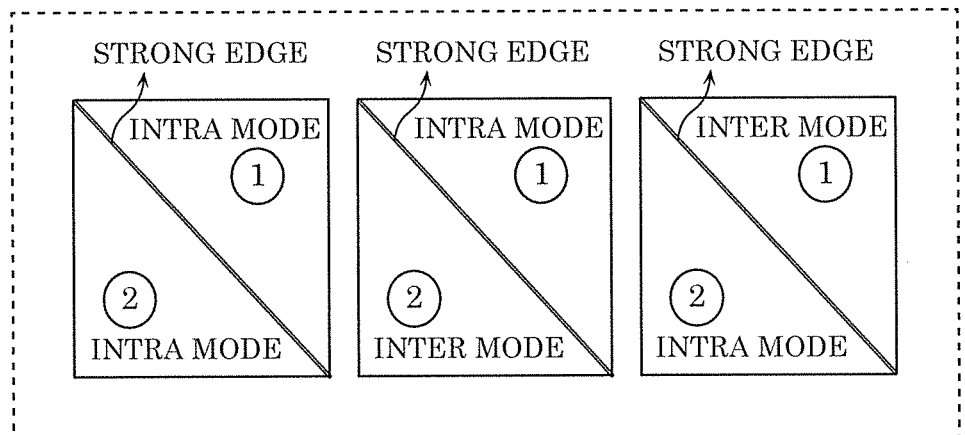
FIG. 50A is a diagram indicating an example in which a diagonal edge is a strong edge when samples located on either side of the diagonal edges are encoded in intra mode.
Figure 50B:
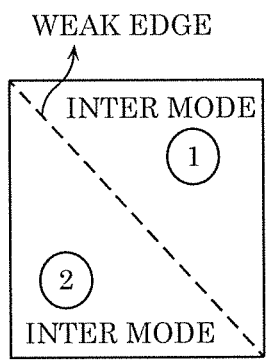
FIG. 50B is a diagram indicating an example in which a diagonal edge is a weak edge when samples on both sides of the diagonal edges are encoded in inter prediction mode.

FIG. 48A is a diagram indicating an example of samples which are used by a 2-tap filter in order to apply a filter based on the position of the identified sample. FIG. 48B is a diagram indicating an example of samples which are used by a 3-tap filter in order to apply a filter based on the position of the identified sample. FIG. 48C is a diagram indicating an example of samples which are used by a 4-tap filter in order to apply a filter based on the position of the identified sample. FIG. 48D is a diagram indicating an example of samples which are used by a 5-tap filter in order to apply a filter based on the position of the identified sample. FIG. 48E is a diagram indicating an example of samples which are used by a 6-tap filter in order to apply a filter based on the position of the identified sample. FIG. 48F is a diagram indicating an example of samples which are used by a 7-tap filter in order to apply a filter based on the position of the identified sample. FIG. 48G is a diagram indicating an example of samples which are used by an 8-tap filter in order to apply a filter based on the position of the identified sample. FIG. 49A is a diagram indicating an example in which a 2-tap filter is applied to a block in order to apply a filter based on the position of the identified sample. FIG. 49B is a diagram indicating an example in which a 3-tap filter is applied to a block in order to apply a filter based on the position of the identified sample. FIG. 49C is a diagram indicating an example in which a 4-tap filter is applied to a block in order to apply a filter based on the position of the identified sample. In addition, FIG. 49D is a diagram indicating an example in which a 5-tap filter is applied to a block in order to apply a filter based on the position of the identified sample. In addition, FIG. 49E is a diagram indicating an example in which a 6-tap filter is applied to a block in order to apply a filter based on the position of the identified sample. In addition, FIG. 49F is a diagram indicating an example in which a 7-tap filter is applied to a block in order to apply a filter based on the position of the identified sample. In addition, FIG. 49G is a diagram indicating an example in which an 8-tap filter is applied to a block in order to apply a filter based on the position of the identified sample. Determination of a filtering tap for the diagonal direction is made, for example, by checking whether a target edge is a strong diagonal edge or a weak diagonal edge, based on an encoding mode of a triangular partition. Encoder 100 is capable of using a longer filter tap in order to filter the identified sample for the strong diagonal edge. Encoder 100 is capable of using a shorter filter tap in order to filter the identified sample for the weak diagonal edge. FIG. 50A is a diagram indicating an example in which a diagonal edge is a strong edge when samples located on either side of the diagonal edges are encoded in intra mode. FIG. 50B is a diagram indicating an example in which a diagonal edge is a weak edge when samples on both sides of the diagonal edges are encoded in inter prediction mode.

Figure 50C:
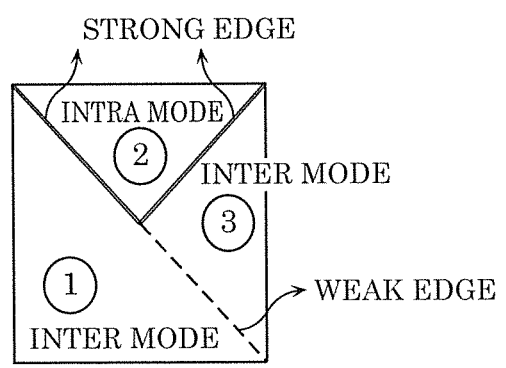
FIG. 50C is a diagram indicating an example of a block with strong and weak diagonal edges.

FIG. 50C is a diagram indicating an example of a block with strong and weak diagonal edges.

Figure 51A:
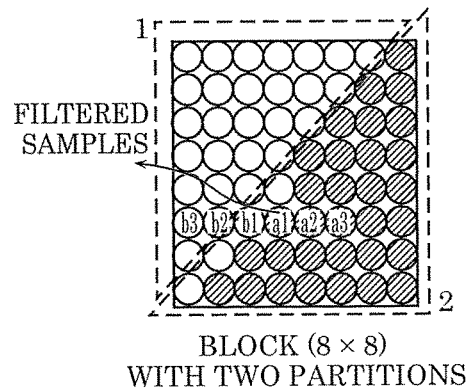
FIG. 51A is a diagram indicating an example in which a 6-tap filter is applied to a block.
Figure 51B:
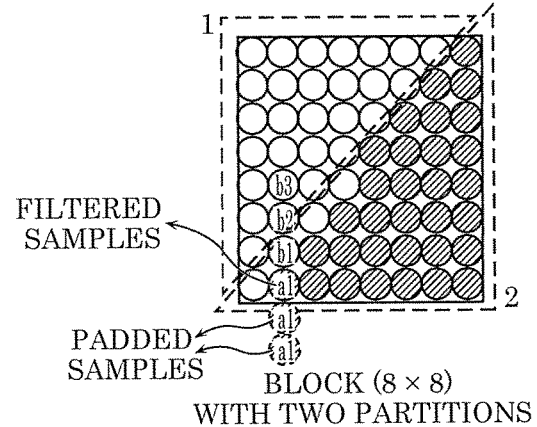
FIG. 51B is a diagram indicating an example in which a 6-tap filter is applied to a block, using a vertically padded sample (a1).
Figure 51C:
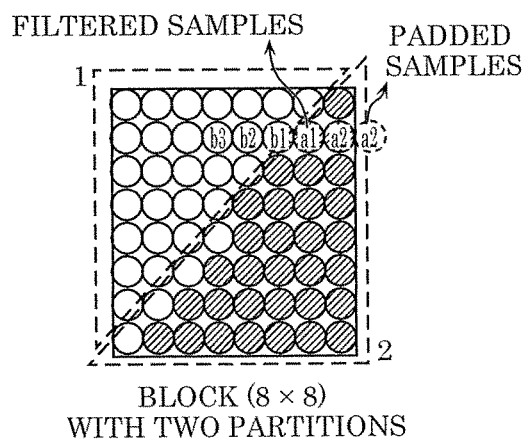
FIG. 51C is a diagram indicating an example in which a 6-tap filter is applied to a block, using a horizontally padded sample (b2).
Figure 51D:
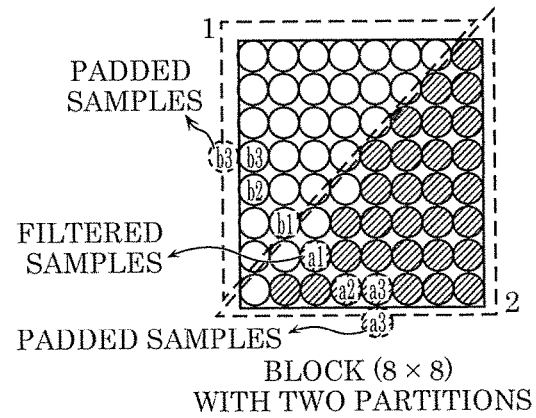
FIG. 51D is a diagram indicating an example in which a 6-tap filter is applied to a block, using diagonally padded samples (a3, b2, and b3).

FIG. 51A is a diagram indicating an example in which a 6-tap filter is applied to a block. FIG. 51B is a diagram indicating an example in which a 6-tap filter is applied to a block, using a vertically padded sample (a1). FIG. 51C is a diagram indicating an example in which a 6-tap filter is applied to a block, using a horizontally padded sample (b2). FIG. 51D is a diagram indicating an example in which a 6-tap filter is applied to a block, using diagonally padded samples (a3, b3, and b3). In this example, the same filter tap length is used for filtering all the identified samples at the diagonal edge on the diagonal edge with the use of padded samples, when necessary.

In another example, the combination of the examples indicated in FIGS. 46A, 46B, and 46C, FIGS. 47A, 47B, 47C, and 47D, FIGS. 48A, 48B, 48C, 48D, 48E, 48F, and 48G, FIGS. 49A, 49B, 49C, 49D, 49E, 49F, and 49G, and FIGS. 50A, 50B, and 50C is applied to the identified sample. In another example, a deblocking filter for use in HEVC is applied to an identified sample. In still another example, (i) the combination of the examples indicated in FIGS. 46A, 46B, and 46C, FIGS. 47A, 47B, 47C, and 47D, FIGS. 48A, 48B, 48C, 48D, 48E, 48F, and 48G, FIGS. 49A, 49B, 49C, 49D, 49E, 49F, and 49G, and FIGS. 50A, 50B, and 50C, and (ii) a deblocking filter for use in HEVC are applied to the identified sample.

Encoder 100 encodes the target partition using the filtered sample (Step S11003).

It is to be noted that the term "encoding" (encoding or coding) used in this embodiment for the encoding method and the encoding procedure performed by encoder 100 may be replaced with "decoding" in this embodiment for the decoding method and the decoding procedure performed by decoder 200.

It is to be noted that the term "writing a parameter into a bitstream" used in this embodiment for the encoding method and the encoding procedure performed by encoder 100 may be replaced with "parsing a parameter from a bitstream" in this embodiment for the decoding method and the decoding procedure performed by decoder 200.

Figure 52:
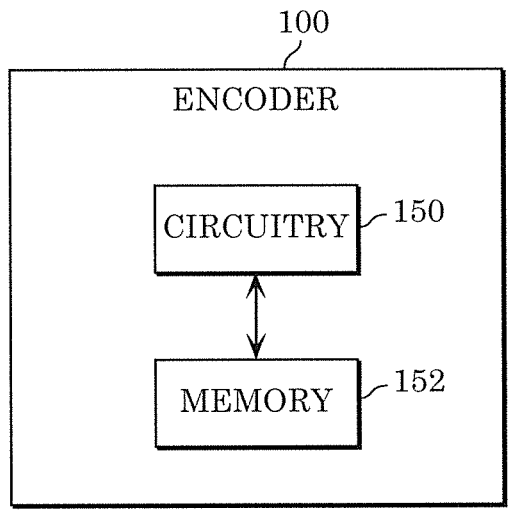
FIG. 52 is a block diagram indicating a mounting example of the encoder.

FIG. 52 is a block diagram indicating a mounting example of the encoder. Encoder 100 includes circuitry 150 and memory 152. For example, the plurality of constituent elements of encoder 100 illustrated in FIG. 1 are mounted on circuitry 150 and memory 152 illustrated in FIG. 52.

Circuitry 150 is electronic circuitry accessible to memory 152, and performs information processing. For example, circuitry 150 is an exclusive or general processor which encodes a moving picture using memory 152. Circuitry 150 may be a processor such as a CPU. In addition, circuitry 150 may be an aggregate of a plurality of electronic circuits.

In addition, for example, circuitry 150 may take the roles of two or more constituent elements other than a constituent element for storing information out of the plurality of constituent elements of encoder 100 illustrated in FIG. 1. In other words, circuitry 150 may perform the above-described operations as operations of the two or more constituent elements.

Memory 152 is an exclusive or general memory for storing information that is used by circuitry 150 to encode a moving picture. Memory 152 may be an electronic circuit, may be connected to circuitry 150, or may be included in circuitry 150.

In addition, memory 152 may be an aggregate of electronic circuits, or may be configured with a plurality of sub-memories. In addition, memory 152 may be a magnetic disc or an optical disc, or the like, or may be represented as a storage, a recording medium, or the like. In addition, memory 152 may be a non-volatile memory or a volatile memory.

For example, memory 152 may take the role of a constituent element for storing information out of the plurality of constituent elements of encoder 100 illustrated in FIG. 1.

In addition, memory 152 may store a moving picture to be encoded or a bitstream corresponding to the moving picture to be encoded. In addition, memory 152 may store a program for causing circuitry 150 to encode a moving picture.

It is to be noted that, in encoder 100, all of the plurality of constituent elements illustrated in FIG. 1 may not be implemented, and all of the processes described above may not be performed. Part of the constituent elements illustrated in FIG. 1 may be included in another device, or part of the processes described above may be performed by another device. In this case, the part of the constituent elements illustrated in FIG. 1 are implemented in encoder 100, and the part of the processes described above may be performed by encoder 100, which makes it possible to appropriately set information relating to encoding of a moving picture.

Figure 53:
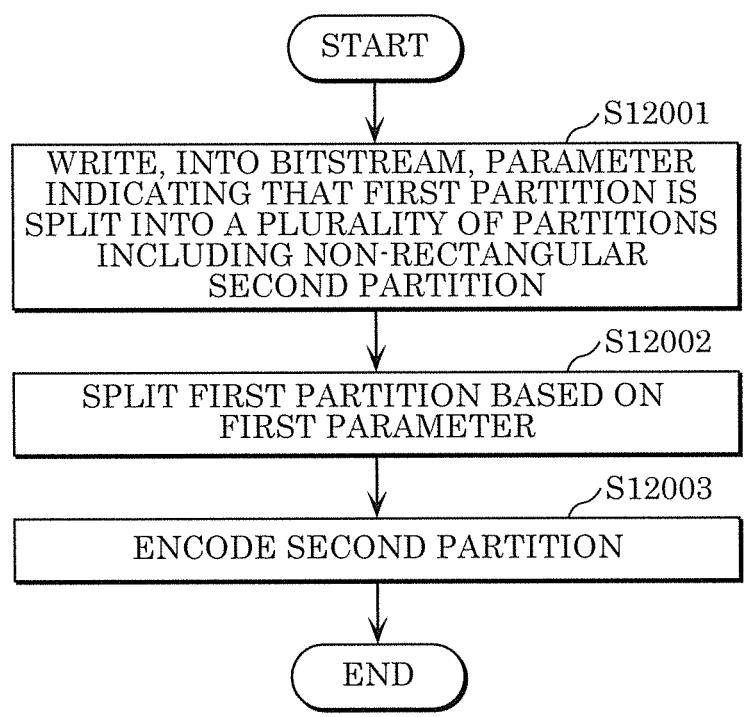
FIG. 53 is a flowchart indicating an operation example of the encoder.

FIG. 53 is a flowchart indicating an operation example of encoder 100. For example, encoder 100 illustrated in FIG. 52 performs an operation illustrated in FIG. 53 when splitting a block of an image. More specifically, circuitry 150 performs, using memory 152, the operations indicated below.

First, circuitry 250 writes, into a bitstream, a parameter indicating that a first partition is split into a plurality of partitions including a second partition which is not rectangular (S12001). Next, circuitry 250 splits the first partition based on a first parameter (S12002). The circuitry then encodes a second partition (S12003).

In this way, encoder 100 is capable of splitting the first partition included in the block of the image into non-rectangular partitions. Accordingly, encoder 100 is capable of performing more appropriate prediction in image prediction.

In addition, the non-rectangular partition may be a triangular partition.

In addition, the first partition may be a rectangular partition.

In addition, the first partition may be a rectangular partition.

In addition, the first partition may be a triangular partition.

In addition, the one or more parameters may include a second parameter when the first partition is a rectangular partition, the second parameter indicating one direction selected from a plurality of directions in which the first partition can be split into at least the second partition.

In addition, the first parameter and the second parameter may be the same parameters indicating the non-rectangular partition and the one direction selected.

In addition, the first partition may be split based on the first parameter and the second parameter, when the first partition is a rectangular partition.

In addition, the one or more parameters: may include a parameter indicating a direction selected from a plurality of directions in which the first partition can be split into at least the second partition, when the first partition is a rectangular partition; and may not include a parameter indicating a direction in which the first partition is to be split into at least the second partition, when the first partition is a non-rectangular partition.

In addition, the circuitry may determine whether a size of the first partition is larger than a first threshold value when writing the one or more parameters into the bitstream.

In addition, for example, the circuitry may write at least the first parameter into the bitstream when the circuitry determines that the size of the first partition is larger than the first threshold value.

In addition, the circuitry may not write the first parameter into the bitstream and may split the first partition into at least the second partition, when the circuitry determines that the size of the first partition is larger than the first threshold value.

In addition, the threshold value may be larger than 0.

In addition, the threshold value may indicate a minimum size of the first partition for splitting the first partition into at least the second partition.

In addition, the size of the first partition may be represented as the number of samples in the first partition.

In addition, the size of the first partition may be represented as a width of the first partition, when the first partition is a rectangular partition.

In addition, the size of the first partition may be represented as a height of the first partition, when the first partition is a rectangular partition.

In addition, the size of the first partition may be represented as a ratio between a width and a height of the first partition, when the first partition is a rectangular partition.

Figure 54:
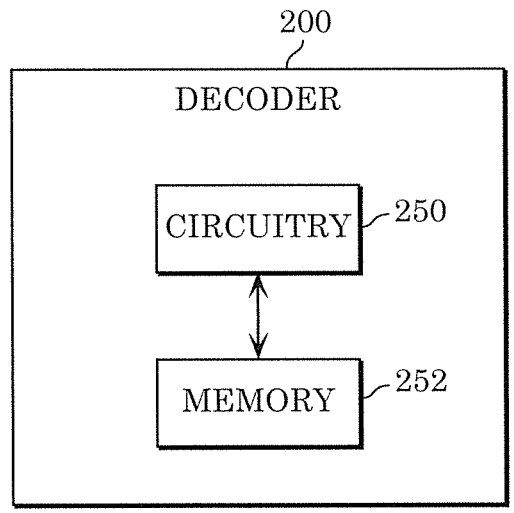
FIG. 54 is a block diagram indicating a mounting example of the decoder.

FIG. 54 is a block diagram indicating a mounting example of the decoder. Decoder 200 includes circuitry 250 and memory 252. For example, the plurality of constituent elements of decoder 200 illustrated in FIG. 10 are mounted on circuitry 250 and memory 252 illustrated in FIG. 54.

Circuitry 250 is electronic circuitry accessible to memory 252, and performs information processing. For example, circuitry 250 is an exclusive or general processor which decodes a moving picture using memory 252. Circuitry 250 may be a processor such as a CPU. In addition, circuitry 250 may be an aggregate of a plurality of electronic circuits.

In addition, for example, circuitry 250 may take the roles of two or more constituent elements other than a constituent element for storing information out of the plurality of constituent elements of decoder 200 illustrated in FIG. 10. In other words, circuitry 250 may perform the above-described operations as operations of the two or more constituent elements.

Memory 252 is an exclusive or general memory for storing information that is used by circuitry 250 to decode a moving picture. Memory 252 may be an electronic circuit, may be connected to circuitry 250, or may be included in circuitry 250.

In addition, memory 252 may be an aggregate of electronic circuits, or may be configured with a plurality of sub-memories. In addition, memory 252 may be a magnetic disc or an optical disc, or the like, or may be represented as a storage, a recording medium, or the like. In addition, memory 252 may be a non-volatile memory or a volatile memory.

For example, memory 252 may take the role of a constituent element for storing information out of the plurality of constituent elements of decoder 200 illustrated in FIG. 10.

In addition, memory 252 may store a bitstream corresponding to an encoded moving picture, or a decoded moving picture. In addition, memory 252 may store a program for causing circuitry 250 to decode a moving picture.

It is to be noted that, in decoder 200, all of the plurality of constituent elements illustrated in FIG. 10 may not be implemented, and all of the processes described above may not be performed. Part of the constituent elements illustrated in FIG. 10 may be included in another device, or part of the processes described above may be performed by another device. In this case, the part of the constituent elements illustrated in FIG. 10 are implemented in decoder 200, and the part of the processes described above may be performed by decoder 200, which makes it possible to appropriately set information relating to decoding of a moving picture.

Figure 55:
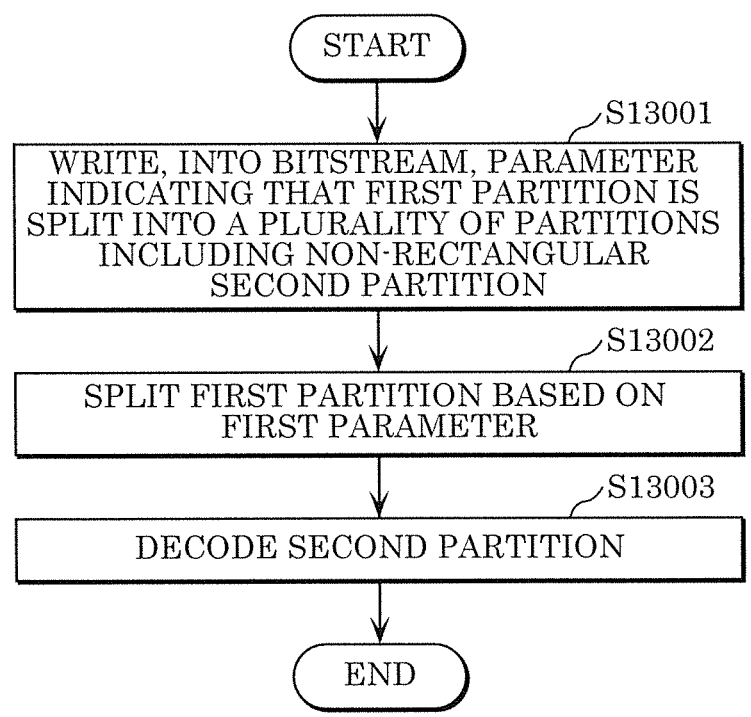
FIG. 55 is a flowchart indicating an operation example of the decoder.

FIG. 55 is a flowchart indicating an operation example of the decoder. For example, decoder 200 illustrated in FIG. 54 performs the operation illustrated in FIG. 55 when decoding a moving picture composed of a plurality of pictures. More specifically, circuitry 250 performs, using memory 252, the operations indicated below.

First, circuitry 250 writes, into a bitstream, a parameter indicating that a first partition is split into a plurality of partitions including a second partition which is not rectangular (S13001). Next, circuitry 250 splits the first partition based on a first parameter (S13002). The circuitry then decodes a second partition (S13003).

In this way, decoder 200 is capable of splitting the first partition included in the block of the image into non-rectangular partitions. Accordingly, decoder 200 is capable of performing more appropriate prediction in image prediction.

In addition, the non-rectangular partition may be a triangular partition.

In addition, the first partition may be a rectangular partition.

In addition, the first partition may be a non-rectangular partition.

In addition, the first partition may be a triangular partition.

In addition, the one or more parameters may include a second parameter when the first partition is a rectangular partition, the second parameter indicating one direction selected from a plurality of directions in which the first partition can be split into at least the second partition.

In addition, the first parameter and the second parameter may be the same parameters indicating the non-rectangular partition and the one direction selected.

In addition, the first partition may be split based on the first parameter and the second parameter, when the first partition is a rectangular partition.

In addition, the one or more parameters: may include a parameter indicating a direction selected from a plurality of directions in which the first partition can be split into at least the second partition, when the first partition is a rectangular partition; and may not include a parameter indicating a direction in which the first partition is to be split into at least the second partition, when the first partition is a non-rectangular partition.

In addition, the circuitry may determine whether a size of the first partition is larger than a first threshold value when writing the one or more parameters into the bitstream.

In addition, for example, the circuitry may write at least the first parameter into the bitstream when the circuitry determines that the size of the first partition is larger than the first threshold value.

In addition, the circuitry may not write the first parameter into the bitstream and may split the first partition into at least the second partition, when the circuitry determines that the size of the first partition is larger than the first threshold value.

In addition, the threshold value is larger than 0.

In addition, the threshold value may indicate a minimum size of the first partition for splitting the first partition into a plurality of partitions including at least the second partition.

In addition, the size of the first partition may be represented as the number of samples in the first partition.

In addition, the size of the first partition may be represented as a width of the first partition, when the first partition is a rectangular partition.

In addition, the size of the first partition may be represented as a height of the first partition, when the first partition is a rectangular partition.

In addition, the size of the first partition may be represented as a ratio between a width and a height of the first partition, when the first partition is a rectangular partition.

In addition, encoder 100 may include: a block partitioner which splits a first image into blocks; an intra predictor which predicts a block included in the first image using a reference picture; an inter predictor which predicts a block included in the first image using a reference block included in a second image different from the first image; a loop filter which applies a filter to a block included in the first image; a transformer which transforms prediction errors between prediction signals generated by the intra predictor or the inter predictor and original signals, to generate transform coefficients; a quantizer which quantizes the transform coefficients to generate quantized coefficients; and an entropy encoder which variable-encodes the quantized coefficients to generate an encoded bitstream. The entropy encoder may perform: writing one or more parameters into a bitstream, the one or more parameters including at least one first parameter indicating that a first partition included in the first block is split into at least one second partition, the at least one second partition having a non-rectangular shape; splitting the first partition based on the first parameter; and encoding the at least one second partition.

In addition, decoder 200 may include: a decoder which decodes an encoded bitstream to output quantized coefficients; an inverse quantizer which inverse-quantizes the quantized coefficients to output transform coefficients; an inverse transformer which inverse-transforms the transform coefficients to output prediction errors; an intra predictor which predicts a block included in a first image using a reference picture included in the first image; an inter predictor which predicts a block included in the first image using a reference block included in a second image different from the first image; and a loop filter which applies a filter to a block included in the first image. The decoder may perform: writing, into a bitstream, one or more parameters including at least one first parameter indicating that a first partition included in a block of an image is split into a plurality of partitions including at least one second partition having a non-rectangular shape; splitting the first partition based on the first parameter; and decoding the at least one second partition.

In addition, encoder 100 includes circuitry and memory. The circuitry, using the memory, performs: splitting a block into at least one non-rectangular partition; deriving a plurality of reference samples for the block by projecting at least a sample adjacent to the non-rectangular partitions into the position adjacent to the block; performing intra prediction for predicting samples in the partition using at least the reference samples, wherein the intra prediction for predicting the samples in one or more positions in the partition is the same as the intra prediction for predicting the samples in the same one or more positions in the block; and encoding the partition using the result of the intra prediction.

In addition, encoder 100 may include: a block partitioner which splits a first image into blocks; an intra predictor which predicts a block included in the first image using a reference picture; an inter predictor which predicts a block included in the first image using a reference block included in a second image different from the first image; a loop filter which applies a filter to a block included in the first image; a transformer which transforms prediction errors between prediction signals generated by the intra predictor or the inter predictor and original signals, to generate transform coefficients; a quantizer which quantizes the transform coefficients to generate quantized coefficients; and an entropy encoder which variable-encodes the quantized coefficients to generate an encoded bitstream. The intra predictor may perform: splitting a block of the first image into at least one non-rectangular partition; deriving a plurality of reference samples for the block by projecting at least one sample adjacent to the non-rectangular partition into the position adjacent to the block; intra prediction for predicting samples in the partition using at least the reference samples, wherein the intra prediction for predicting samples in one or more positions in the partition is the same as the intra prediction for predicting the samples in the same one or more positions in the block; and encoding the partition using at least the result of the intra prediction.

In addition, the non-rectangular partition may be a triangular partition.

In addition, the at least one sample adjacent to the non-rectangular partition may not be a sample adjacent to the block.

In addition, deriving reference samples for the block may include projecting at least one or more of reference samples from at least one sample adjacent to the non-rectangular partition based on the position of the at least one sample adjacent to the partition.

In addition, deriving the plurality of reference samples for the block may include projecting at least one or more of reference samples from at least one sample adjacent to the non-rectangular partition based on a function, when the function is at least one of a cosine function, a sine function, a trigonometric function and a polynomial function.

In addition, deriving a plurality of reference samples for the block may include projecting at least one or more of reference samples from at least a sample adjacent to the non-rectangular partition based on an intra prediction direction, when the intra prediction direction is used for predicting samples in the partition.

In addition, encoder 100 includes circuitry and memory. Using the memory, the circuitry: determines transform coefficients for a non-rectangular partition; applies rectangular inverse transformation to the transform coefficients to output residual samples; reorders the residual samples into a non-rectangular shape according to an order; and encodes the non-rectangular partition using the reordered residual samples.

In addition, encoder 100 may include: a block partitioner which splits a first image into blocks; an intra predictor which predicts a block included in the first image using a reference picture; an inter predictor which predicts a block included in the first image using a reference block included in a second image different from the first image; a loop filter which applies a filter to a block included in the first image; a transformer which transforms prediction errors between prediction signals generated by the intra predictor or the inter predictor and original signals, to generate transform coefficients; a quantizer which quantizes the transform coefficients to generate quantized coefficients; and an entropy encoder which variable-encodes the quantized coefficients to generate an encoded bitstream. In encoder 100: transform coefficients for a non-rectangular partition may be determined; rectangular shape inverse transformation may be applied to the transform coefficients to output residual samples; residual samples may be reordered into a non-rectangular shape according to an order; and the non-rectangular partition may be encoded using the reordered residual samples.

In addition, the non-rectangular partition may be a triangular partition.

In addition, the residual samples may be stored in a rectangular shape prior to the reordering into the non-rectangular shape.

In addition, the residual samples may be stored in a one-dimensional array prior to the reordering into the non-rectangular shape.

In addition, the order may be a z-scan order.

In addition, the order may be a horizontal scan order.

In addition, the order may be a vertical scan order.

In addition, the order may be an up-right diagonal scan order.

In addition, the order may be a down-left diagonal scan order.

In addition, the order may be a horizontal traverse scan order.

In addition, the order may be a vertical traverse scan order.

In addition, the order may be a zig zag scan order.

In addition, the transform coefficients for the non-rectangular partition may be obtained from padding and rectangular transformation in which residual samples of the non-rectangular partition are padded into a rectangular shape.

In addition, the padding may include duplicating the residual samples of the non-rectangular partition to form the rectangular shape.

In addition, the padding may include mirroring the residual samples of the non-rectangular partition to form the rectangular shape.

In addition, in encoder 100, the padding may include padding a first value to the residual samples of the non-rectangular partition from the rectangular shape. The first value may be 0, 128, a positive integer, the mean value of the residual samples of the non-rectangular partition, or the median value of the residual samples of the non-rectangular partition.

In addition, in encoder 100, the padding may include performing a function to the residual samples of the non-rectangular partition to form a rectangular shape.

In addition, the transform coefficients for a non-rectangular partition may be obtained from an up-sampling process and rectangular transformation. The up-sampling process may apply an up-sampling filter to residual samples of the non-rectangular partition to be formed into a rectangular shape.

In addition, reordering the residual samples into a non-rectangular shape may include judging if the output residual samples are larger than the non-rectangular partition.

In addition, when it is judged that the output residual samples are larger than the rectangular partition, residual samples for the non-rectangular partition may be obtained from the residual samples output without reordering.

In addition, when it is judged that the residual samples output are not larger than the rectangular partition, residual samples may be reordered into a non-rectangular shape according to the order.

In addition, encoder 100 may include circuitry and memory. Using the memory, the circuitry may: identify a sample adjacent to a diagonal edge between two non-rectangular partitions; filter the identified sample using at least a plurality of samples in the same horizontal sample row as the identified sample; and encode a partition using at least the filtered sample.

In addition, encoder 100 may include: a block partitioner which splits a first image into blocks; an intra predictor which predicts a block included in the first image using a reference picture; an inter predictor which predicts a block included in the first image using a reference block included in a second image different from the first image; a loop filter which applies a filter to a block included in the first image; a transformer which transforms prediction errors between prediction signals generated by the intra predictor or the inter predictor and original signals, to generate transform coefficients; a quantizer which quantizes the transform coefficients to generate quantized coefficients; and an entropy encoder which variable-encodes the quantized coefficients to generate an encoded bitstream. In encoder 100: a sample adjacent to a diagonal edge between two non-rectangular partitions may be identified; the identified sample may be filtered using at least a plurality of samples in the same horizontal sample row as the identified sample; and a partition may be encoded using at least the filtered sample.

In addition, the non-rectangular partition may be a triangular partition.

In addition, filtering the sample may include using a plurality of samples in the same vertical sample column as the identified sample.

In addition, filtering the sample may include using a plurality of samples in the same diagonal sample line as the identified sample.

In addition, decoder 200 may include circuitry and memory. Using the memory, the circuitry may: split a block into at least one non-rectangular partition; derive a plurality of reference samples for the block by projecting at least one sample adjacent to the non-rectangular partition into the position adjacent to the block; perform intra prediction for predicting samples in the partition using at least the reference samples. The intra prediction for predicting samples in one or more positions in the partition is the same as the intra prediction for predicting the samples in the same one or more positions in the block; and decode the partition using the result of the intra prediction.

In addition, decoder 200 may include: a decoder which decodes an encoded bitstream to obtain quantized coefficients; an inverse quantizer which inverse-quantizes the quantized coefficients to output transform coefficients; an inverse transformer which inverse-transforms the transform coefficients to output prediction errors; an intra predictor which predicts a block included in a first image using a reference picture included in the first image; an inter predictor which predicts a block included in the first image using a reference block included in a second image different from the first image; and a loop filter which applies a filter to a block included in the first image. The intra predictor may perform: splitting a block into a non-rectangular partition; deriving reference samples for the block by projecting at least one sample adjacent to the non-rectangular partition into the position adjacent to the block; performing intra prediction for predicting samples in the partition using at least the reference samples, wherein the intra prediction for predicting samples in one or more positions in the partition is the same as the intra prediction for predicting the samples in the same one or more positions in the block; and decoding the partition using the result of the intra prediction.

In addition, in decoder 200, the non-rectangular partition may be a triangular partition.

In addition, in decoder 200, the sample adjacent to the non-rectangular partition may not be a sample adjacent to the block.

In addition, in decoder 200, deriving a plurality of reference samples for the block may include projecting at least one or more of reference samples from at least one sample adjacent to the non-rectangular partition, based on the position of the at least one sample adjacent to the non-rectangular partition.

In addition, in decoder 200, deriving a plurality of reference samples for the block may include projecting at least one or more of reference samples from at least one sample adjacent to the non-rectangular partition based on a function. The function may be at least one of a cosine function, a sine function, a trigonometric function, and a polynomial function.

In addition, in decoder 200, deriving a plurality of reference samples for the block may include projecting at least one or more of reference samples from at least one sample adjacent to the non-rectangular partition based on an intra prediction direction. The intra prediction direction is used for predicting samples in the partition.

In addition, decoder 200 may include circuitry and memory. Using the memory, the circuitry may: determine transform coefficients for a non-rectangular partition; apply rectangular inverse transformation to the transform coefficients to output residual samples; reorder the residual samples into a non-rectangular shape according to an order; and decode the non-rectangular partition using the reordered residual samples.

In addition, decoder 200 may include: a decoder which decodes an encoded bitstream to output quantized coefficients; an inverse quantizer which inverse-quantizes the quantized coefficients to output transform coefficients; an inverse transformer which inverse-transforms the transform coefficients to output prediction errors; an intra predictor which predicts a block included in a first image using a reference picture included in the first image; an inter predictor which predicts a block included in the first image using a reference block included in a second image different from the first image; and a loop filter which applies a filter to a block included in the first image. The inverse transformer may perform: determining transform coefficients for a non-rectangular partition; applying rectangular shape inverse transformation to the transform coefficients to output residual samples; reordering the residual samples into a non-rectangular shape according to an order; and decoding the non-rectangular partition using the reordered residual samples.

In addition, the non-rectangular partition may be a triangular partition.

In addition, the residual samples may be stored in a rectangular shape prior to reordering into a non-rectangular shape.

In addition, the residual samples may be stored in a one-dimensional array prior to reordering into the non-rectangular shape.

In addition, the order may be a z-scan order.

In addition, the order may be a horizontal scan order.

In addition, the order may be a vertical scan order.

In addition, the order may be an up-right diagonal scan order.

In addition, the order may be a down-left diagonal scan order.

In addition, the order may be a horizontal traverse scan order.

In addition, the order may be a vertical traverse scan order.

In addition, the order may be a zig zag scan order.

In addition, the transform coefficients for a non-rectangular partition may be obtained from padding and rectangular transformation in which residual samples of the non-rectangular partition are padded into a rectangular shape.

In addition, the padding may include duplicating the residual samples of the non-rectangular partition to form a rectangular shape.

In addition, the padding may include mirroring the residual samples of the non-rectangular partition to form a rectangular shape.

In addition, the padding may include padding a first value to the residual samples of the non-rectangular partition from the rectangular shape. The first value may be 0, 128, a positive integer, the mean value of the residual samples of the non-rectangular partition, or the median value of the residual samples of the non-rectangular partition.

In addition, the padding may include performing a function to the residual samples of the non-rectangular partition to form a rectangular shape.

In addition, the transform coefficients for the non-rectangular partition may be obtained from an up-sampling process and rectangular transformation.

The up-sampling process may apply an up-sampling filter to the residual samples of the non-rectangular partition to form the rectangular shape.

In addition, reordering residual samples into a non-rectangular shape may include judging if the output residual samples are larger than the non-rectangular partition.

In addition, when it is judged that the output residual samples are larger than the non-rectangular partition, residual samples for the non-rectangular partition may be obtained from the residual samples output without reordering.

In addition, when it is judged that the residual samples output are not larger than the non-rectangular partition, the residual samples may be reordered into a non-rectangular shape according to the order.

In addition, encoder 100 may include circuitry and memory. Using the memory, the circuitry may: identify a sample adjacent to a diagonal edge between two non-rectangular partitions; filter the identified sample using at least a plurality of samples in the same horizontal sample row as the identified sample; and encode a partition using at least the filtered sample.

In addition, encoder 100 may include: a block partitioner which splits a first image into blocks; an intra predictor which predicts a block included in the first image using a reference picture; an inter predictor which predicts a block included in the first image using a reference block included in a second image different from the first image; a loop filter which applies a filter to a block included in the first image; a transformer which transforms prediction errors between prediction signals generated by the intra predictor or the inter predictor and original signals, to generate transform coefficients; a quantizer which quantizes the transform coefficients to generate quantized coefficients; and an entropy encoder which variable-encodes the quantized coefficients to generate an encoded bitstream. In encoder 100: a sample adjacent to a diagonal edge between two non-rectangular partitions may be identified; the identified sample may be filtered using at least a plurality of samples in the same horizontal sample row as the identified sample; and a partition may be encoded using at least the filtered sample.

In addition, the non-rectangular partition may be a triangular partition.

In addition, filtering the sample may include using a plurality of samples in the same vertical sample column as the identified sample.

In addition, filtering the sample may include using a plurality of samples in the same diagonal sample line as the identified sample.

[Technical Advantages]

The present disclosure introduces intra prediction, transformation, and a syntax design of a triangular partition. The intra prediction includes projecting reference samples from a neighboring sample in the triangular partition and predicting samples in the triangular partition using the same intra prediction as performed for the block. This may improve the prediction accuracy without designing a new intra prediction method for the triangular partition. The transformation includes reordering transform coefficients into a rectangular partition and performing rectangular transformation to transform coefficients. The syntax design supports splitting a block into a plurality of triangular partitions. The triangular partitions may split the block along a target edge which improves the coding efficiency of the block. A de-edge filter is capable of reducing artifacts at diagonal edges which may appear after encoding of the block having triangular partitions.

[Supplement]

Encoder 100 and decoder 200 according to this embodiment may be used as an image encoder and an image decoder, or may be used as a moving picture encoder and a moving picture decoder.

In addition, in this embodiment, each of the constituent elements may be configured with exclusive hardware, or may be implemented by executing a software program suitable for each constituent element. Each constituent element may be implemented by means of a program executer such as a CPU and a processor reading and executing a software program stored in a recording medium such as a hard disc or a semiconductor memory.

More specifically, each of encoder 100 and decoder 200 may include processing circuitry and storage electrically connected to the processing circuitry and accessible from the processing circuitry. For example, the processing circuitry corresponds to one of processors 150 and 250, and the storage corresponds to one of memories 152 and 252.

The processing circuitry includes at least one of the exclusive hardware and the program executer. In addition, when the processing circuitry includes the program executer, the storage stores a software program that is executed by the program executer.

Here, the software which implements encoder 100, decoder 200, etc., according to this embodiment includes programs as indicated below.

Specifically, the program may cause a computer to execute an encoding method, including: writing, into a bitstream, one or more parameters including a first parameter indicating that a first partition of an image is to be split into a plurality of partitions including at least a second partition which is a non-rectangular partition; splitting the first partition, based on the first parameter; and encoding at least the second partition.

Alternatively, the program may cause a computer to execute a decoding method, including: writing, into a bitstream, one or more parameters including a first parameter indicating that a first partition of an image is to be split into a plurality of partitions including at least a second partition which is a non-rectangular partition; splitting the first partition, based on the first parameter; and decoding at least the second partition.

Alternatively, the program may cause a computer to execute: an encoding method including: splitting a block into at least one non-rectangular partition; deriving a plurality of reference samples for the block by projecting at least one sample adjacent to the non-rectangular partition into the position adjacent to the block; performing intra prediction for predicting samples in the partition using at least the reference samples, wherein the intra prediction for predicting samples in one or more positions in the partition is the same as the intra prediction for predicting the samples in the same one or more positions in the block; and encoding the partition using at least the result of the intra prediction.

Alternatively, the program may cause a computer to execute: a decoding method including: splitting a block into at least one non-rectangular partition; deriving reference samples for the block by projecting at least one sample adjacent to the non-rectangular partition into the position adjacent to the block; performing intra prediction for predicting samples in the partition using at least the reference samples, wherein the intra prediction for predicting samples in one or more positions in the partition is the same as the intra prediction for predicting the samples in the same one or more position in the block; and decoding the partition using at least the result of the intra prediction.

Alternatively, the program may cause a computer to execute: an encoding method including: determining transform coefficients for a non-rectangular partition; applying rectangular shape inverse transformation to the transform coefficients to output residual samples; reordering the residual samples into a non-rectangular shape according to an order; and encoding the non-rectangular partition using at least the reordered residual samples.

Alternatively, the program may cause a computer to execute: a decoding method including: determining transform coefficients for a non-rectangular partition; applying rectangular inverse transformation to the transform coefficients to output residual samples; reordering the residual samples into a non-rectangular shape according to an order; and decoding the non-rectangular partition using at least the reordered residual samples.

Alternatively, the program may cause a computer to execute: an encoding method including: identifying a sample adjacent to a diagonal edge between two non-rectangular partitions; filtering the identified sample using at least a plurality of samples in the same horizontal sample row as the identified sample; and encoding a partition using at least the filtered sample.

Alternatively, the program may cause a computer to execute: a decoding method including: identifying a sample adjacent to a diagonal edge between two non-rectangular partitions; filtering the identified sample using at least a plurality of samples in the same horizontal sample row as the identified sample; and decoding a partition using at least the filtered sample.

In addition, each constituent element may be circuitry as described above. Circuits may compose circuitry as a whole, or may be separate circuits. Alternatively, each constituent element may be implemented as a general processor, or may be implemented as an exclusive processor.

In addition, the processing that is executed by a particular constituent element may be executed by another constituent element. In addition, the processing execution order may be modified, or a plurality of processes may be executed in parallel. In addition, an encoder and decoder may include encoder 100 and decoder 200.

In addition, the ordinal numbers such as "first" and "second" used for explanation may be arbitrarily changed. A new ordinal number may be attached to a constituent element, or an ordinal number attached to a constituent element may be removed.

Although some aspects of encoder 100 and decoder 200 have been explained based on the above embodiments, aspects of encoder 100 and decoder 200 are not limited to these embodiments. The scope of the aspects of encoder 100 and decoder 200 may encompass embodiments obtainable by adding, to any of these embodiments, various kinds of modifications that a person skilled in the art would arrive at without deviating from the scope of the present disclosure and embodiments configurable by arbitrarily combining constituent elements in different embodiments.

One of the aspects may be performed by combining at least part of the other aspects in the present disclosure. In addition, one of the aspects may be performed by combining part of the processing indicated in any of the flowcharts according to one of the aspects, part of the configuration of any of the devices, part of syntaxes, etc.

Embodiment 2

As described in each of the above embodiments, each functional block can typically be realized as an MPU and memory, for example. Moreover, processes performed by each of the functional blocks are typically realized by a program execution unit, such as a processor, reading and executing software (a program) recorded on a recording medium such as ROM. The software may be distributed via, for example, downloading, and may be recorded on a recording medium such as semiconductor memory and distributed. Note that each functional block can, of course, also be realized as hardware (dedicated circuit).

Moreover, the processing described in each of the embodiments may be realized via integrated processing using a single apparatus (system), and, alternatively, may be realized via decentralized processing using a plurality of apparatuses. Moreover, the processor that executes the above-described program may be a single processor or a plurality of processors. In other words, integrated processing may be performed, and, alternatively, decentralized processing may be performed.

Embodiments of the present disclosure are not limited to the above exemplary embodiments; various modifications may be made to the exemplary embodiments, the results of which are also included within the scope of the embodiments of the present disclosure.

Next, application examples of the moving picture encoding method (image encoding method) and the moving picture decoding method (image decoding method) described in each of the above embodiments and a system that employs the same will be described. The system is characterized as including an image encoder that employs the image encoding method, an image decoder that employs the image decoding method, and an image encoder/decoder that includes both the image encoder and the image decoder. Other configurations included in the system may be modified on a case-by-case basis.

Usage Examples

Figure 56:
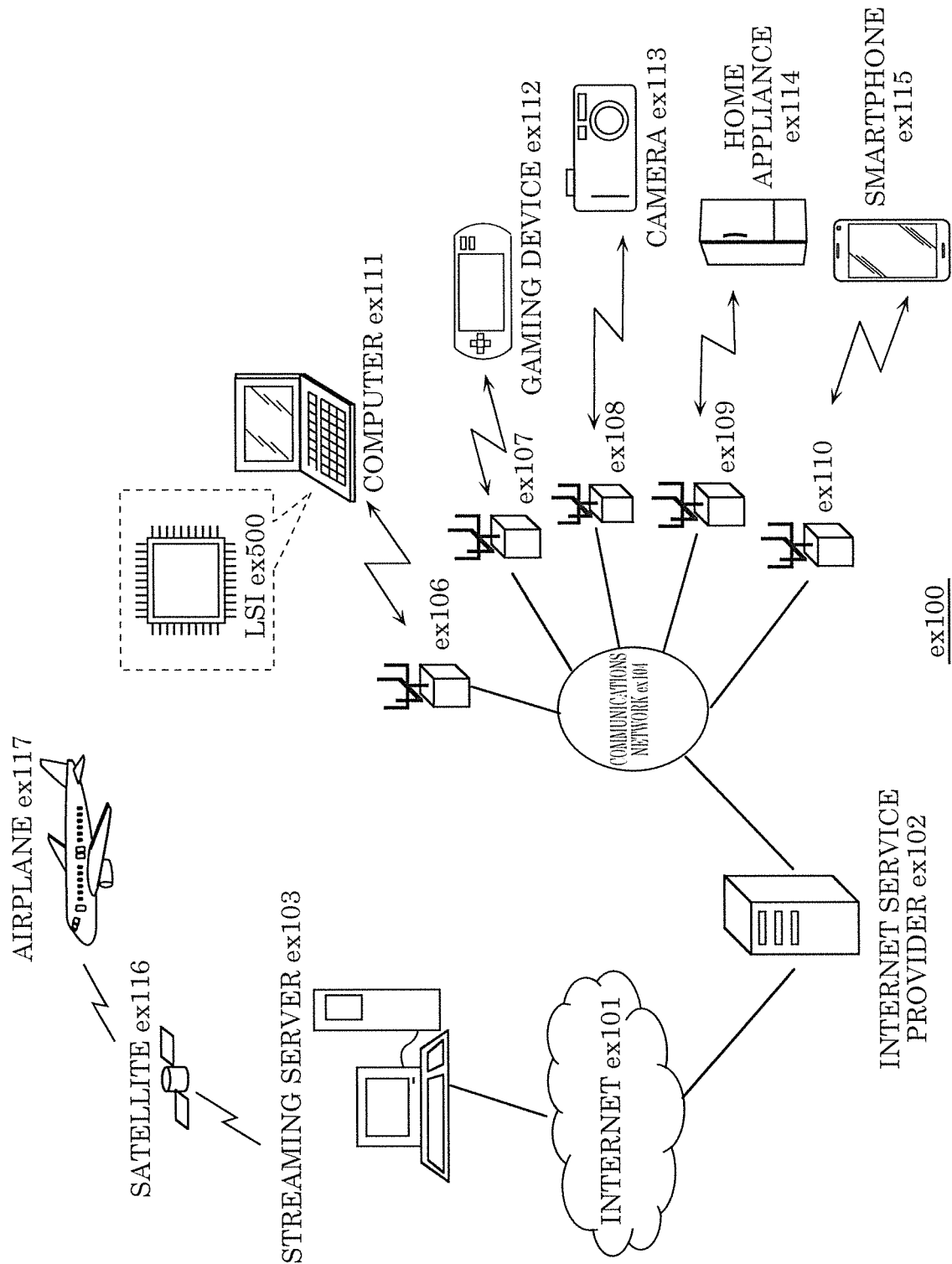
FIG. 56 illustrates an overall configuration of a content providing system for implementing a content distribution service.

FIG. 56 illustrates an overall configuration of content providing system ex100 for implementing a content distribution service. The area in which the communication service is provided is divided into cells of desired sizes, and base stations ex106, ex107, ex108, ex109, and ex110, which are fixed wireless stations, are located in respective cells.

In content providing system ex100, devices including computer ex111, gaming device ex112, camera ex113, home appliance ex114, and smartphone ex115 are connected to internet ex101 via internet service provider ex102 or communications network ex104 and base stations ex106 through ex110.

Content providing system ex100 may combine and connect any combination of the above elements. The devices may be directly or indirectly connected together via a telephone network or near field communication rather than via base stations ex106 through ex110, which are fixed wireless stations. Moreover, streaming server ex103 is connected to devices including computer ex111, gaming device ex112, camera ex113, home appliance ex114, and smartphone ex115 via, for example, internet ex101. Streaming server ex103 is also connected to, for example, a terminal in a hotspot in airplane ex117 via satellite ex116.

Note that instead of base stations ex106 through ex110, wireless access points or hotspots may be used. Streaming server ex103 may be connected to communications network ex104 directly instead of via internet ex101 or internet service provider ex102, and may be connected to airplane ex17 directly instead of via satellite ex116.

Camera ex113 is a device capable of capturing still images and video, such as a digital camera. Smartphone ex115 is a smartphone device, cellular phone, or personal handyphone system (PHS) phone that can operate under the mobile communications system standards of the typical 2G, 3G, 3.9G, and 4G systems, as well as the next-generation 5G system.

Home appliance ex118 is, for example, a refrigerator or a device included in a home fuel cell cogeneration system.

In content providing system ex100, a terminal including an image and/or video capturing function is capable of, for example, live streaming by connecting to streaming server ex103 via, for example, base station ex106. When live streaming, a terminal (e.g., computer ex11/, gaming device ex112, camera ex113, home appliance ex114, smartphone ex115, or airplane ex117) performs the encoding processing described in the above embodiments on still-image or video content captured by a user via the terminal, multiplexes video data obtained via the encoding and audio data obtained by encoding audio corresponding to the video, and transmits the obtained data to streaming server ex103. In other words, the terminal functions as the image encoder according to one aspect of the present disclosure.

Streaming server ex103 streams transmitted content data to clients that request the stream. Client examples include computer ex111, gaming device ex112, camera ex113, home appliance ex114, smartphone ex115, and terminals inside airplane ex117, which are capable of decoding the above-described encoded data. Devices that receive the streamed data decode and reproduce the received data. In other words, the devices each function as the image decoder according to one aspect of the present disclosure.

[Decentralized Processing]

Streaming server ex103 may be realized as a plurality of servers or computers between which tasks such as the processing, recording, and streaming of data are divided. For example, streaming server ex103 may be realized as a content delivery network (CDN) that streams content via a network connecting multiple edge servers located throughout the world. In a CDN, an edge server physically near the client is dynamically assigned to the client. Content is cached and streamed to the edge server to reduce load times. In the event of, for example, some kind of an error or a change in connectivity due to, for example, a spike in traffic, it is possible to stream data stably at high speeds since it is possible to avoid affected parts of the network by, for example, dividing the processing between a plurality of edge servers or switching the streaming duties to a different edge server, and continuing streaming.

Decentralization is not limited to just the division of processing for streaming; the encoding of the captured data may be divided between and performed by the terminals, on the server side, or both. In one example, in typical encoding, the processing is performed in two loops. The first loop is for detecting how complicated the image is on a frame-by-frame or scene-by-scene basis, or detecting the encoding load. The second loop is for processing that maintains image quality and improves encoding efficiency. For example, it is possible to reduce the processing load of the terminals and improve the quality and encoding efficiency of the content by having the terminals perform the first loop of the encoding and having the server side that received the content perform the second loop of the encoding. In such a case, upon receipt of a decoding request, it is possible for the encoded data resulting from the first loop performed by one terminal to be received and reproduced on another terminal in approximately real time. This makes it possible to realize smooth, real-time streaming.

In another example, camera ex113 or the like extracts a feature amount from an image, compresses data related to the feature amount as metadata, and transmits the compressed metadata to a server. For example, the server determines the significance of an object based on the feature amount and changes the quantization accuracy accordingly to perform compression suitable for the meaning of the image. Feature amount data is particularly effective in improving the precision and efficiency of motion vector prediction during the second compression pass performed by the server. Moreover, encoding that has a relatively low processing load, such as variable length coding (VLC), may be handled by the terminal, and encoding that has a relatively high processing load, such as context-adaptive binary arithmetic coding (CABAC), may be handled by the server.

In yet another example, there are instances in which a plurality of videos of approximately the same scene are captured by a plurality of terminals in, for example, a stadium, shopping mall, or factory. In such a case, for example, the encoding may be decentralized by dividing processing tasks between the plurality of terminals that captured the videos and, if necessary, other terminals that did not capture the videos and the server, on a per-unit basis. The units may be, for example, groups of pictures (GOP), pictures, or tiles resulting from dividing a picture. This makes it possible to reduce load times and achieve streaming that is closer to real-time.

Moreover, since the videos are of approximately the same scene, management and/or instruction may be carried out by the server so that the videos captured by the terminals can be cross-referenced. Moreover, the server may receive encoded data from the terminals, change reference relationship between items of data or correct or replace pictures themselves, and then perform the encoding. This makes it possible to generate a stream with increased quality and efficiency for the individual items of data.

Moreover, the server may stream video data after performing transcoding to convert the encoding format of the video data. For example, the server may convert the encoding format from MPEG to VP, and may convert H.264 to H.265.

In this way, encoding can be performed by a terminal or one or more servers. Accordingly, although the device that performs the encoding is referred to as a "server" or "terminal" in the following description, some or all of the processes performed by the server may be performed by the terminal, and likewise some or all of the processes performed by the terminal may be performed by the server. This also applies to decoding processes.

[3D, Multi-Angle]

In recent years, usage of images or videos combined from images or videos of different scenes concurrently captured or the same scene captured from different angles by a plurality of terminals such as camera ex113 and/or smartphone ex115 has increased. Videos captured by the terminals are combined based on, for example, the separately-obtained relative positional relationship between the terminals, or regions in a video having matching feature points.

In addition to the encoding of two-dimensional moving pictures, the server may encode a still image based on scene analysis of a moving picture either automatically or at a point in time specified by the user, and transmit the encoded still image to a reception terminal. Furthermore, when the server can obtain the relative positional relationship between the video capturing terminals, in addition to two-dimensional moving pictures, the server can generate three-dimensional geometry of a scene based on video of the same scene captured from different angles. Note that the server may separately encode three-dimensional data generated from, for example, a point cloud, and may, based on a result of recognizing or tracking a person or object using three-dimensional data, select or reconstruct and generate a video to be transmitted to a reception terminal from videos captured by a plurality of terminals.

This allows the user to enjoy a scene by freely selecting videos corresponding to the video capturing terminals, and allows the user to enjoy the content obtained by extracting, from three-dimensional data reconstructed from a plurality of images or videos, a video from a selected viewpoint. Furthermore, similar to with video, sound may be recorded from relatively different angles, and the server may multiplex, with the video, audio from a specific angle or space in accordance with the video, and transmit the result.

In recent years, content that is a composite of the real world and a virtual world, such as virtual reality (VR) and augmented reality (AR) content, has also become popular. In the case of VR images, the server may create images from the viewpoints of both the left and right eyes and perform encoding that tolerates reference between the two viewpoint images, such as multi-view coding (MVC), and, alternatively, may encode the images as separate streams without referencing. When the images are decoded as separate streams, the streams may be synchronized when reproduced so as to recreate a virtual three-dimensional space in accordance with the viewpoint of the user.

In the case of AR images, the server superimposes virtual object information existing in a virtual space onto camera information representing a real-world space, based on a three-dimensional position or movement from the perspective of the user. The decoder may obtain or store virtual object information and three-dimensional data, generate two-dimensional images based on movement from the perspective of the user, and then generate superimposed data by seamlessly connecting the images. Alternatively, the decoder may transmit, to the server, motion from the perspective of the user in addition to a request for virtual object information, and the server may generate superimposed data based on three-dimensional data stored in the server in accordance with the received motion, and encode and stream the generated superimposed data to the decoder. Note that superimposed data includes, in addition to RGB values, an α value indicating transparency, and the server sets the α value for sections other than the object generated from three-dimensional data to, for example, 0, and may perform the encoding while those sections are transparent. Alternatively, the server may set the background to a predetermined RGB value, such as a chroma key, and generate data in which areas other than the object are set as the background.

Decoding of similarly streamed data may be performed by the client (i.e., the terminals), on the server side, or divided therebetween. In one example, one terminal may transmit a reception request to a server, the requested content may be received and decoded by another terminal, and a decoded signal may be transmitted to a device having a display. It is possible to reproduce high image quality data by decentralizing processing and appropriately selecting content regardless of the processing ability of the communications terminal itself. In yet another example, while a TV, for example, is receiving image data that is large in size, a region of a picture, such as a tile obtained by dividing the picture, may be decoded and displayed on a personal terminal or terminals of a viewer or viewers of the TV. This makes it possible for the viewers to share a big-picture view as well as for each viewer to check his or her assigned area or inspect a region in further detail up close.

In the future, both indoors and outdoors, in situations in which a plurality of wireless connections are possible over near, mid, and far distances, it is expected to be able to seamlessly receive content even when switching to data appropriate for the current connection, using a streaming system standard such as MPEG-DASH. With this, the user can switch between data in real time while freely selecting a decoder or display apparatus including not only his or her own terminal, but also, for example, displays disposed indoors or outdoors. Moreover, based on, for example, information on the position of the user, decoding can be performed while switching which terminal handles decoding and which terminal handles the displaying of content. This makes it possible to, while in route to a destination, display, on the wall of a nearby building in which a device capable of displaying content is embedded or on part of the ground, map information while on the move. Moreover, it is also possible to switch the bit rate of the received data based on the accessibility to the encoded data on a network, such as when encoded data is cached on a server quickly accessible from the reception terminal or when encoded data is copied to an edge server in a content delivery service.

[Scalable Encoding]

Figure 57:
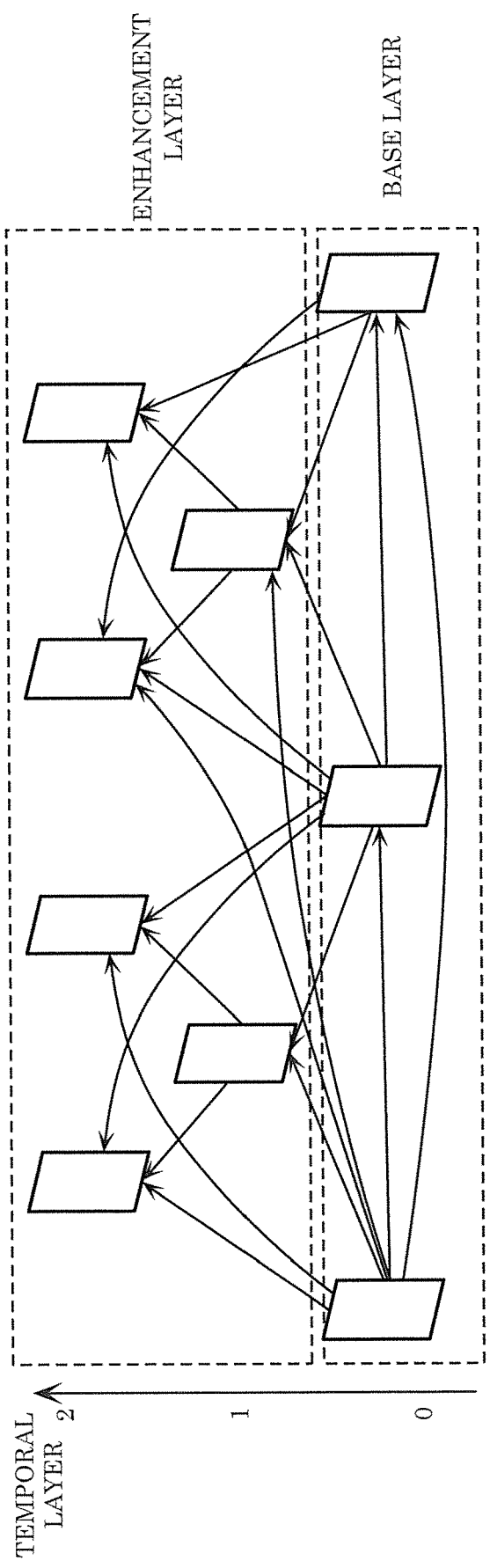
FIG. 57 illustrates one example of an encoding structure in scalable encoding.

The switching of content will be described with reference to a scalable stream, illustrated in FIG. 57, that is compression coded via implementation of the moving picture encoding method described in the above embodiments. The server may have a configuration in which content is switched while making use of the temporal and/or spatial scalability of a stream, which is achieved by division into and encoding of layers, as illustrated in FIG. 57. Note that there may be a plurality of individual streams that are of the same content but different quality. In other words, by determining which layer to decode up to based on internal factors, such as the processing ability on the decoder side, and external factors, such as communication bandwidth, the decoder side can freely switch between low resolution content and high resolution content while decoding. For example, in a case in which the user wants to continue watching, at home on a device such as a TV connected to the internet, a video that he or she had been previously watching on smartphone ex115 while on the move, the device can simply decode the same stream up to a different layer, which reduces server side load.

Furthermore, in addition to the configuration described above in which scalability is achieved as a result of the pictures being encoded per layer and the enhancement layer is above the base layer, the enhancement layer may include metadata based on, for example, statistical information on the image, and the decoder side may generate high image quality content by performing super-resolution imaging on a picture in the base layer based on the metadata. Super-resolution imaging may be improving the SN ratio while maintaining resolution and/or increasing resolution. Metadata includes information for identifying a linear or a non-linear filter coefficient used in super-resolution processing, or information identifying a parameter value in filter processing, machine learning, or least squares method used in super-resolution processing.

Figure 58:
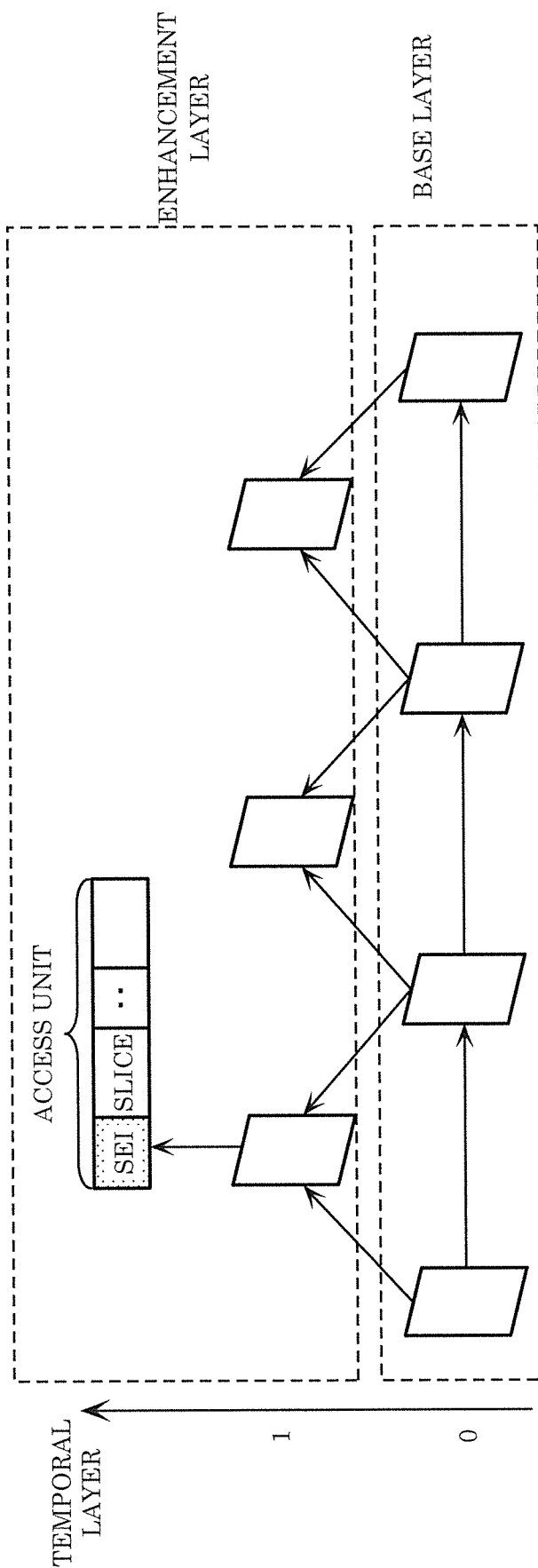
FIG. 58 illustrates one example of an encoding structure in scalable encoding.

Alternatively, a configuration in which a picture is divided into, for example, tiles in accordance with the meaning of, for example, an object in the image, and on the decoder side, only a partial region is decoded by selecting a tile to decode, is also acceptable. Moreover, by storing an attribute about the object (person, car, ball, etc.) and a position of the object in the video (coordinates in identical images) as metadata, the decoder side can identify the position of a desired object based on the metadata and determine which tile or tiles include that object. For example, as illustrated in FIG. 58, metadata is stored using a data storage structure different from pixel data such as an SEI message in HEVC. This metadata indicates, for example, the position, size, or color of the main object.

Moreover, metadata may be stored in units of a plurality of pictures, such as stream, sequence, or random access units. With this, the decoder side can obtain, for example, the time at which a specific person appears in the video, and by fitting that with picture unit information, can identify a picture in which the object is present and the position of the object in the picture.

[Web Page Optimization]

Figure 59:
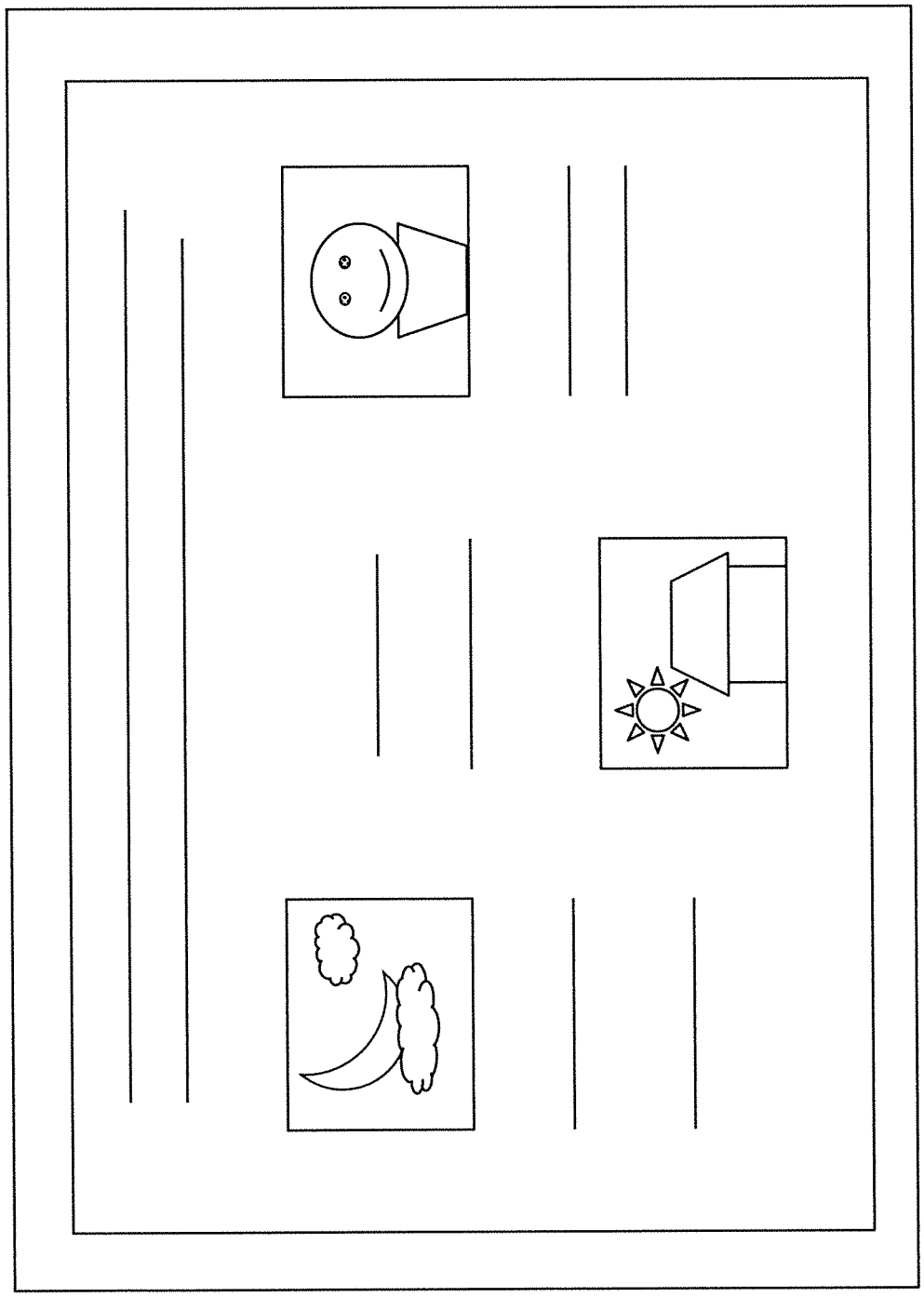
FIG. 59 illustrates an example of a display screen of a web page.
Figure 60:
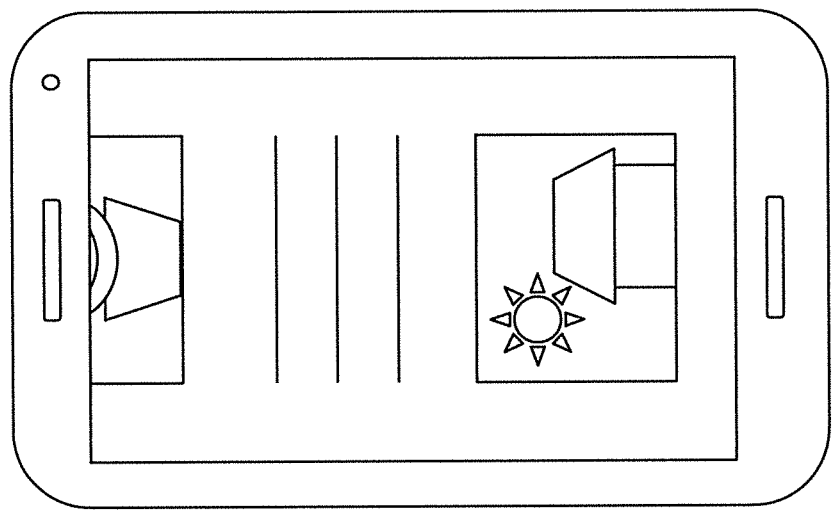
FIG. 60 illustrates an example of a display screen of a web page.
Figure 61:
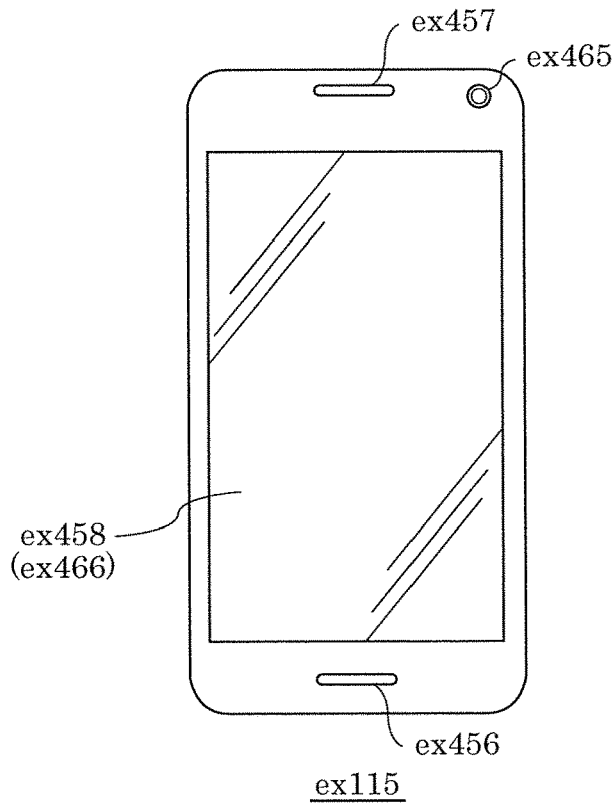
FIG. 61 illustrates one example of a smartphone.

FIG. 60 illustrates an example of a display screen of a web page on, for example, computer ex111. FIG. 61 illustrates an example of a display screen of a web page on, for example, smartphone ex115. As illustrated in FIG. 59 and FIG. 60, a web page may include a plurality of image links which are links to image content, and the appearance of the web page differs depending on the device used to view the web page. When a plurality of image links are viewable on the screen, until the user explicitly selects an image link, or until the image link is in the approximate center of the screen or the entire image link fits in the screen, the display apparatus (decoder) displays, as the image links, still images included in the content or I pictures, displays video such as an animated gif using a plurality of still images or I pictures, for example, or receives only the base layer and decodes and displays the video.

When an image link is selected by the user, the display apparatus decodes giving the highest priority to the base layer. Note that if there is information in the HTML code of the web page indicating that the content is scalable, the display apparatus may decode up to the enhancement layer. Moreover, in order to guarantee real time reproduction, before a selection is made or when the bandwidth is severely limited, the display apparatus can reduce delay between the point in time at which the leading picture is decoded and the point in time at which the decoded picture is displayed (that is, the delay between the start of the decoding of the content to the displaying of the content) by decoding and displaying only forward reference pictures (I picture, P picture, forward reference B picture). Moreover, the display apparatus may purposely ignore the reference relationship between pictures and coarsely decode all B and P pictures as forward reference pictures, and then perform normal decoding as the number of pictures received over time increases.

[Autonomous Driving]

When transmitting and receiving still image or video data such two- or three-dimensional map information for autonomous driving or assisted driving of an automobile, the reception terminal may receive, in addition to image data belonging to one or more layers, information on, for example, the weather or road construction as metadata, and associate the metadata with the image data upon decoding. Note that metadata may be assigned per layer and, alternatively, may simply be multiplexed with the image data.

In such a case, since the automobile, drone, airplane, etc., including the reception terminal is mobile, the reception terminal can seamlessly receive and decode while switching between base stations among base stations ex106 through ex110 by transmitting information indicating the position of the reception terminal upon reception request. Moreover, in accordance with the selection made by the user, the situation of the user, or the bandwidth of the connection, the reception terminal can dynamically select to what extent the metadata is received or to what extent the map information, for example, is updated.

With this, in content providing system ex100, the client can receive, decode, and reproduce, in real time, encoded information transmitted by the user.

[Streaming of Individual Content]

In content providing system ex100, in addition to high image quality, long content distributed by a video distribution entity, unicast or multicast streaming of low image quality, short content from an individual is also possible. Moreover, such content from individuals is likely to further increase in popularity. The server may first perform editing processing on the content before the encoding processing in order to refine the individual content. This may be achieved with, for example, the following configuration.

In real-time while capturing video or image content or after the content has been captured and accumulated, the server performs recognition processing based on the raw or encoded data, such as capture error processing, scene search processing, meaning analysis, and/or object detection processing. Then, based on the result of the recognition processing, the server-either when prompted or automatically-edits the content, examples of which include: correction such as focus and/or motion blur correction; removing low-priority scenes such as scenes that are low in brightness compared to other pictures or out of focus; object edge adjustment; and color tone adjustment. The server encodes the edited data based on the result of the editing. It is known that excessively long videos tend to receive fewer views. Accordingly, in order to keep the content within a specific length that scales with the length of the original video, the server may, in addition to the low-priority scenes described above, automatically clip out scenes with low movement based on an image processing result. Alternatively, the server may generate and encode a video digest based on a result of an analysis of the meaning of a scene.

Note that there are instances in which individual content may include content that infringes a copyright, moral right, portrait rights, etc. Such an instance may lead to an unfavorable situation for the creator, such as when content is shared beyond the scope intended by the creator. Accordingly, before encoding, the server may, for example, edit images so as to blur faces of people in the periphery of the screen or blur the inside of a house, for example. Moreover, the server may be configured to recognize the faces of people other than a registered person in images to be encoded, and when such faces appear in an image, for example, apply a mosaic filter to the face of the person. Alternatively, as pre- or post-processing for encoding, the user may specify, for copyright reasons, a region of an image including a person or a region of the background be processed, and the server may process the specified region by, for example, replacing the region with a different image or blurring the region. If the region includes a person, the person may be tracked in the moving picture the head region may be replaced with another image as the person moves.

Moreover, since there is a demand for real-time viewing of content produced by individuals, which tends to be small in data size, the decoder first receives the base layer as the highest priority and performs decoding and reproduction, although this may differ depending on bandwidth. When the content is reproduced two or more times, such as when the decoder receives the enhancement layer during decoding and reproduction of the base layer and loops the reproduction, the decoder may reproduce a high image quality video including the enhancement layer. If the stream is encoded using such scalable encoding, the video may be low quality when in an unselected state or at the start of the video, but it can offer an experience in which the image quality of the stream progressively increases in an intelligent manner. This is not limited to just scalable encoding; the same experience can be offered by configuring a single stream from a low quality stream reproduced for the first time and a second stream encoded using the first stream as a reference.

Other Usage Examples

The encoding and decoding may be performed by LSI ex500, which is typically included in each terminal. LSI ex500 may be configured of a single chip or a plurality of chips. Software for encoding and decoding moving pictures may be integrated into some type of a recording medium (such as a CD-ROM, a flexible disk, or a hard disk) that is readable by, for example, computer ex111, and the encoding and decoding may be performed using the software. Furthermore, when smartphone ex115 is equipped with a camera, the video data obtained by the camera may be transmitted. In this case, the video data is coded by LSI ex500 included in smartphone ex115.

Note that LSI ex500 may be configured to download and activate an application. In such a case, the terminal first determines whether it is compatible with the scheme used to encode the content or whether it is capable of executing a specific service. When the terminal is not compatible with the encoding scheme of the content or when the terminal is not capable of executing a specific service, the terminal first downloads a codec or application software then obtains and reproduces the content.

Aside from the example of content providing system ex100 that uses internet ex101, at least the moving picture encoder (image encoder) or the moving picture decoder (image decoder) described in the above embodiments may be implemented in a digital broadcasting system. The same encoding processing and decoding processing may be applied to transmit and receive broadcast radio waves superimposed with multiplexed audio and video data using, for example, a satellite, even though this is geared toward multicast whereas unicast is easier with content providing system ex100.

[Hardware Configuration]

Figure 62:
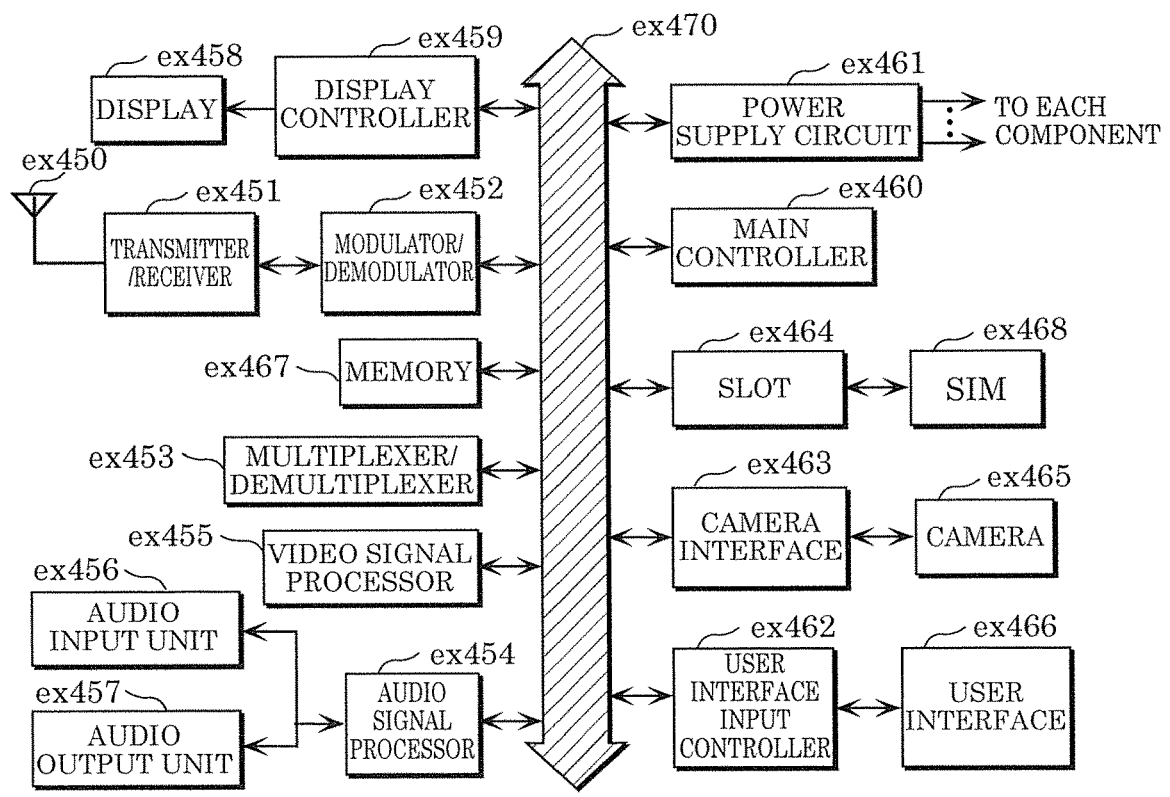
FIG. 62 is a block diagram illustrating a configuration example of a smartphone.

FIG. 61 illustrates smartphone ex115. FIG. 62 illustrates a configuration example of smartphone ex115. Smartphone ex115 includes antenna ex450 for transmitting and receiving radio waves to and from base station ex110, camera ex465 capable of capturing video and still images, and display ex458 that displays decoded data, such as video captured by camera ex465 and video received by antenna ex450. Smartphone ex115 further includes user interface ex466 such as a touch panel, audio output unit ex457 such as a speaker for outputting speech or other audio, audio input unit ex456 such as a microphone for audio input, memory ex467 capable of storing decoded data such as captured video or still images, recorded audio, received video or still images, and mail, as well as decoded data, and slot ex464 which is an interface for SIM ex468 for authorizing access to a network and various data. Note that external memory may be used instead of memory ex467.

Moreover, main controller ex460 which comprehensively controls display ex458 and user interface ex466, power supply circuit ex461, user interface input controller ex462, video signal processor ex455, camera interface ex463, display controller ex459, modulator/demodulator ex452, multiplexer/demultiplexer ex453, audio signal processor ex454, slot ex464, and memory ex467 are connected via bus ex470.

When the user turns the power button of power supply circuit ex461 on, smartphone ex115 is powered on into an operable state by each component being supplied with power from a battery pack.

Smartphone ex115 performs processing for, for example, calling and data transmission, based on control performed by main controller ex460, which includes a CPU, ROM, and RAM. When making calls, an audio signal recorded by audio input unit ex456 is converted into a digital audio signal by audio signal processor ex454, and this is applied with spread spectrum processing by modulator/demodulator ex452 and digital-analog conversion and frequency conversion processing by transmitter/receiver ex451, and then transmitted via antenna ex450. The received data is amplified, frequency converted, and analog-digital converted, inverse spread spectrum processed by modulator/demodulator ex452, converted into an analog audio signal by audio signal processor ex454, and then output from audio output unit ex457. In data transmission mode, text, still-image, or video data is transmitted by main controller ex460 via user interface input controller ex462 as a result of operation of, for example, user interface ex466 of the main body, and similar transmission and reception processing is performed. In data transmission mode, when sending a video, still image, or video and audio, video signal processor ex455 compression encodes, via the moving picture encoding method described in the above embodiments, a video signal stored in memory ex467 or a video signal input from camera ex465, and transmits the encoded video data to multiplexer/demultiplexer ex453. Moreover, audio signal processor ex454 encodes an audio signal recorded by audio input unit ex456 while camera ex465 is capturing, for example, a video or still image, and transmits the encoded audio data to multiplexer/demultiplexer ex453. Multiplexer/demultiplexer ex453 multiplexes the encoded video data and encoded audio data using a predetermined scheme, modulates and converts the data using modulator/demodulator (modulator/demodulator circuit) ex452 and transmitter/receiver ex451, and transmits the result via antenna ex450.

When video appended in an email or a chat, or a video linked from a web page, for example, is received, in order to decode the multiplexed data received via antenna ex450, multiplexer/demultiplexer ex453 demultiplexes the multiplexed data to divide the multiplexed data into a bitstream of video data and a bitstream of audio data, supplies the encoded video data to video signal processor ex455 via synchronous bus ex470, and supplies the encoded audio data to audio signal processor ex454 via synchronous bus ex470. Video signal processor ex455 decodes the video signal using a moving picture decoding method corresponding to the moving picture encoding method described in the above embodiments, and video or a still image included in the linked moving picture file is displayed on display ex458 via display controller ex459. Moreover, audio signal processor ex454 decodes the audio signal and outputs audio from audio output unit ex457. Note that since real-time streaming is becoming more and more popular, there are instances in which reproduction of the audio may be socially inappropriate depending on the user's environment. Accordingly, as an initial value, a configuration in which only video data is reproduced, i.e., the audio signal is not reproduced, is preferable. Audio may be synchronized and reproduced only when an input, such as when the user clicks video data, is received.

Although smartphone ex115 was used in the above example, three implementations are conceivable: a transceiver terminal including both an encoder and a decoder; a transmitter terminal including only an encoder; and a receiver terminal including only a decoder. Further, in the description of the digital broadcasting system, an example is given in which multiplexed data obtained as a result of video data being multiplexed with, for example, audio data, is received or transmitted, but the multiplexed data may be video data multiplexed with data other than audio data, such as text data related to the video. Moreover, the video data itself rather than multiplexed data maybe received or transmitted.

Although main controller ex460 including a CPU is described as controlling the encoding or decoding processes, terminals often include GPUs. Accordingly, a configuration is acceptable in which a large area is processed at once by making use of the performance ability of the GPU via memory shared by the CPU and GPU or memory including an address that is managed so as to allow common usage by the CPU and GPU. This makes it possible to shorten encoding time, maintain the real-time nature of the stream, and reduce delay. In particular, processing relating to motion estimation, deblocking filtering, sample adaptive offset (SAO), and transformation/quantization can be effectively carried out by the GPU instead of the CPU in units of, for example pictures, all at once.

INDUSTRIAL APPLICABILITY

The present disclosure is applicable to, for example, television receivers, digital video recorders, car navigation systems, mobile phones, digital cameras, digital video cameras, teleconferencing systems, electronic mirrors, etc.

The invention claimed is:

1. An encoder, comprising:
circuitry; and
memory,
wherein the circuitry, using the memory:
writes, into a bitstream, a first parameter indicating that a first partition of an image is to be split into a plurality of partitions including at least a second partition which is a non-rectangular partition;
writes, into the bitstream, a second parameter indicating a direction selected from a plurality of directions in which the first partition can be split into at least the second partition, when the first partition is a rectangular partition;
does not write, into the bitstream, the second parameter, when the first partition is a non-rectangular partition different from the rectangular partition;
splits the first partition, based on the first parameter; and
encodes at least the second partition,
wherein the rectangular partition includes a square.

2. The encoder according to claim 1,
wherein the non-rectangular partition is a triangular partition.

3. The encoder according to claim 1,
wherein the first partition is a rectangular partition.

4. The encoder according to claim 1,
wherein the first partition is a non-rectangular partition.

5. The encoder according to claim 1,
wherein the first partition is a triangular partition.

6. The encoder according to claim 1,
wherein the first parameter and the second parameter are the same parameters indicating the non-rectangular partition and the direction selected.

7. The encoder according to claim 1,
wherein the first partition is split based on the first parameter and the second parameter, when the first partition is a rectangular partition.

8. The encoder according to claim 1,
wherein the circuitry determines whether a size of the first partition is larger than a first threshold value when writing at least the first parameter into the bitstream.

9. The encoder according to claim 8,
wherein the circuitry writes at least the first parameter into the bitstream when the circuitry determines that the size of the first partition is larger than the first threshold value.

10. The encoder according to claim 8,
wherein the circuitry:
writes, into the bitstream, at least the first parameter indicating that the first partition of the image is to be split into the plurality of partitions including the second partition which is the non-rectangular partition, when the circuitry determines that the size of the first partition is not larger than the first threshold value;
splits the first partition, based on the first parameter, and
does not write the first parameter into the bitstream and does not split the first partition into at least the second partition, when the circuitry determines that the size of the first partition is larger than the first threshold value.

11. The encoder according to claim 8,
wherein the threshold value is larger than 0.

12. The encoder according to claim 8,
wherein the threshold value indicates a minimum size of the first partition for splitting the first partition into at least the second partition.

13. The encoder according to claim 8,
wherein the size of the first partition is represented as the number of samples in the first partition.

14. The encoder according to claim 8,
wherein the size of the first partition is represented as a width of the first partition, when the first partition is a rectangular partition.

15. The encoder according to claim 8,
wherein the size of the first partition is represented as a height of the first partition, when the first partition is a rectangular partition.

16. The encoder according to claim 8,
wherein the size of the first partition is represented as a ratio between a width and a height of the first partition, when the first partition is a rectangular partition.

17. A decoder, comprising:
circuitry; and
memory,
wherein the circuitry, using the memory:
parses, from a bitstream, a first parameter indicating that a first partition of an image is to be split into a plurality of partitions including at least a second partition which is a non-rectangular partition;
parses, from the bitstream, a second parameter indicating a direction selected from a plurality of directions in which the first partition can be split into at least the second partition, when the first partition is a rectangular partition;
does not parse, from the bitstream, the second parameter, when the first partition is a non-rectangular partition different from the rectangular partition;
splits the first partition, based on the first parameter; and
decodes at least the second partition,
wherein the rectangular partition includes a square.

18. The decoder according to claim 17,
wherein the non-rectangular partition is a triangular partition.

19. The decoder according to claim 17,
wherein the first partition is a rectangular partition.

20. The decoder according to claim 17,
wherein the first partition is a non-rectangular partition.

21. The decoder according to claim 17,
wherein the first partition is a triangular partition.

22. The decoder according to claim 17,
wherein the first parameter and the second parameter are the same parameters indicating the non-rectangular partition and the direction selected.

23. The decoder according to claim 17,
wherein the first partition is split based on the first parameter and the second parameter, when the first partition is a rectangular partition.

24. The decoder according to claim 17,
wherein the circuitry determines whether a size of the first partition is larger than a first threshold value when parsing at least the first parameter from the bitstream.

25. The decoder according to claim 24,
wherein the circuitry parses at least the first parameter from the bitstream when the circuitry determines that the size of the first partition is larger than the first threshold value.

26. The decoder according to claim 24,
wherein the circuitry:
parses, from the bitstream, at least the first parameter indicating that the first partition of the image is to be split into the plurality of partitions including the second partition which is the non-rectangular partition, when the circuitry determines that the size of the first partition is not larger than the first threshold value;
splits the first partition, based on the first parameter, and
does not parse the first parameter from the bitstream and does not split the first partition into at least the second partition, when the circuitry determines that the size of the first partition is larger than the first threshold value.

27. The decoder according to claim 24,
wherein the threshold value is larger than 0.

28. The decoder according to claim 24,
wherein the threshold value indicates a minimum size of the first partition for splitting the first partition into a plurality of partitions including at least the second partition.

29. The decoder according to claim 24,
wherein the size of the first partition is represented as the number of samples in the first partition.

30. The decoder according to claim 24,
wherein the size of the first partition is represented as a width of the first partition, when the first partition is a rectangular partition.

31. The decoder according to claim 24,
wherein the size of the first partition is represented as a height of the first partition, when the first partition is a rectangular partition.

32. The decoder according to claim 24,
wherein the size of the first partition is represented as a ratio between a width and a height of the first partition, when the first partition is a rectangular partition.

33. An encoding method, comprising:
writing, into a bitstream, a first parameter indicating that a first partition of an image is to be split into a plurality of partitions including at least a second partition which is a non-rectangular partition;
writing, into the bitstream, a second parameter indicating a direction selected from a plurality of directions in which the first partition can be split into at least the second partition, when the first partition is a rectangular partition;
splitting the first partition, based on the first parameter; and
encoding at least the second partition,
wherein the second parameter is not written into the bitstream when the first partition is a non-rectangular partition different from the rectangular partition, and
wherein the rectangular partition includes a square.

34. A decoding method, comprising:
parsing, from a bitstream, a first parameter indicating that a first partition of an image is to be split into a plurality of partitions including at least a second partition which is a non-rectangular partition;
parsing, from the bitstream, a second parameter indicating a direction selected from a plurality of directions in which the first partition can be split into at least the second partition, when the first partition is a rectangular partition;
splitting the first partition, based on the first parameter; and
decoding at least the second partition,
wherein the second parameter is not parsed from the bitstream when the first partition is a non-rectangular partition different from the rectangular partition, and
wherein the rectangular partition includes a square.

* * * * *